(12) United States Patent
Ode et al.

(10) Patent No.: US 10,893,459 B2
(45) Date of Patent: Jan. 12, 2021

(54) WIRELESS BASE STATION, FIRST WIRELESS CONTROL APPARATUS, SECOND WIRELESS CONTROL APPARATUS, AND WIRELESS APPARATUS

(71) Applicant: FUJITSU LIMITED, Kawasaki (JP)

(72) Inventors: Takayoshi Ode, Yokohama (JP); Yuki Shinada, Saitama (JP); Yoshiaki Ohta, Yokohama (JP); Shinichiro Aikawa, Yokohama (JP); Yoshihiro Kawasaki, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 5 days.

(21) Appl. No.: 16/233,997

(22) Filed: Dec. 27, 2018

(65) Prior Publication Data

US 2019/0174391 A1 Jun. 6, 2019

Related U.S. Application Data

(63) Continuation of application No. PCT/JP2017/029180, filed on Aug. 10, 2017.

(30) Foreign Application Priority Data

Aug. 12, 2016 (WO) .................. PCT/JP2016/073760

(51) Int. Cl.
*H04W 40/24* (2009.01)
*H04W 88/12* (2009.01)
(Continued)

(52) U.S. Cl.
CPC ........... *H04W 40/24* (2013.01); *H04L 1/1812* (2013.01); *H04W 76/27* (2018.02); *H04W 80/02* (2013.01);
(Continued)

(58) Field of Classification Search
CPC ..... H04W 40/24; H04W 76/27; H04W 76/20; H04W 88/08–12
See application file for complete search history.

(56) References Cited

U.S. PATENT DOCUMENTS

2012/0213123 A1  8/2012  Futaki
2015/0029965 A1  1/2015  Aminaka et al.
(Continued)

FOREIGN PATENT DOCUMENTS

JP  2008-193558 A  8/2008
JP  2012-10273 A   1/2012
(Continued)

OTHER PUBLICATIONS

CMCC, "NR RAN functional description", May 27, 2016, 3GPP TSG RAN WG3 #92, R3-161267, pp. 1-6 (Year: 2016).*
(Continued)

*Primary Examiner* — Paul H Masur
(74) *Attorney, Agent, or Firm* — Myers Wolin, LLC.

(57) ABSTRACT

A wireless base station for wireless communication includes: a wireless apparatus configured to perform first signal processing that is a part of signal processing in the wireless communication; a first wireless control apparatus configured to perform a user plane (U-plane) processing of the wireless communication; and a second wireless control apparatus configured to perform a control plane (C-plane) processing of the wireless communication.

21 Claims, 33 Drawing Sheets

(51) Int. Cl.
*H04W 92/12* (2009.01)
*H04W 88/08* (2009.01)
*H04W 76/27* (2018.01)
*H04L 1/18* (2006.01)
*H04W 80/02* (2009.01)
*H04W 80/08* (2009.01)

(52) U.S. Cl.
CPC .......... *H04W 80/08* (2013.01); *H04W 88/08* (2013.01); *H04W 88/12* (2013.01); *H04W 92/12* (2013.01)

(56) References Cited

U.S. PATENT DOCUMENTS

| 2016/0150530 | A1 | 5/2016 | Fujisaki | |
|---|---|---|---|---|
| 2017/0070908 | A1 | 3/2017 | Ogura | |
| 2017/0331577 | A1* | 11/2017 | Parkvall | H04J 11/0079 |
| 2017/0331670 | A1* | 11/2017 | Parkvall | H04W 52/0274 |
| 2018/0368109 | A1* | 12/2018 | Kim | H04W 72/04 |
| 2019/0082367 | A1* | 3/2019 | Lin | H04W 12/04 |
| 2020/0092733 | A1* | 3/2020 | Myhre | H04W 88/085 |

FOREIGN PATENT DOCUMENTS

| JP | 2016-36083 | A | | 3/2016 | |
|---|---|---|---|---|---|
| JP | 2016-100852 | A | | 5/2016 | |
| JP | 2017-63469 | A | | 3/2017 | |
| WO | 2013/076900 | A1 | | 5/2013 | |
| WO | 2015/136875 | A1 | | 9/2015 | |
| WO | WO-2018009340 | A1 | * | 1/2018 | ............ H04W 88/08 |

OTHER PUBLICATIONS

Intel Corporation, "General principles of separation of CP and UP for high level functional split", Jun. 28, 2017, 3GPP TSG RAN WG3 Meeting NR#2, R3-172285, pp. 1-5 (Year: 2016).*
ZTE, "The capacity requirement for the interface between CU and DU", Apr. 15, 2016, 3GPP TSG RAN WG2 #93bis, R2-162625, pp. 1-5 (Year: 2016).*
Intel Corporation, "C-plane and U-plane separation in the next generation radio access network", Apr. 27, 2016, 3GPP TSG RAN WG3 Meeting #92,R3-161075, pp. 1-3 (Year: 2016).*
3GPP, "3GPP TR 38.806 V1.0.0", Dec. 2017, Release 15, pp. 1-23 (Year: 2017).*
International Search Report issued by the Japan Patent Office for corresponding International Patent Application No. PCT/JP2016/073760, dated Nov. 1, 2016, with an English translation.
Written Opinion of the International Searching Authority issued by the Japan Patent Office for corresponding International Patent Application No. PCT/JP2016/073760, dated Nov. 1, 2016, with an English translation.
Ericsson et al, "Common Public Radio Interface, CPRI overview Input requirements for CPRI", Mar. 11, 2015.
ZTE: "Discussion on the protocol architecture for standalone NR", 3GPP Draft; R2-162623 Discussion on the Protocol Architecture for Standalone NR, 3rd Generation Partnership Project (3GPP), Mobile Competence Centre; 650, Route Des Lucioles; F-06921 Sophia-Antipolis Cedex; France, vol. RAN WG2, No. Dubrovnik, Croatia; Apr. 11, 2016-Apr. 15, 2016 Apr. 1, 2016 (Apr. 1, 2016), XP051082188. (Cited in the EESR dated Dec. 4, 2019).
ZTE: "Clarification of CP and UP Separation from 38.913", 3GPP Draft; R3-160819 Clarification of CP and UP Separation From 38.913 V2, 3rd Generation Partnership Project (3GPP), Mobile Competence Centre; 650, Route Deslucioles; F-06921 Sophia-Antipolis Cedex; France, vol. RAN WG3, No. Bangalore, India; Apr. 11, 2016-Apr. 15, 2016 Apr. 1, 2016 (Apr. 1, 2016), XP051082956. (Cited in the EESR dated Dec. 4, 2019).
Nokia et al: "Flexibility of RAN functions through configuration and deployment", 3GPP Draft; R3-161099 Flexilbility of RAN Functions in Fronthaul, 3rd Generation Partnership Project (3GPP), Mobile Competence Centre; 650, Route Des Lucioles; F-06921 Sophia-Antipolis Cedex; France, vol. RAN WG3, No. Nanjing, China; May 23, 2016-May 27, 2016 May 22, 2016 (May 22, 2016), XP051105907. (Cited in the EESR dated Dec. 4, 2019).
CMCC: "Additional function split option for CU/DU", 3GPP Draft; R3-161269 Additional Function Split Option for CU&DU, 3rd Generation Partnership Project (3GPP), Mobile Competence Centre; 350, Route Des Lucioles; F-06921 Sophia-Antipolis Cedex; France, vol. RAN WG3, No. Nanjing, China; May 23, 2016-May 27, 2016 May 14, 2016 (2016-85-14), XP051094635. (Cited in the EESR dated Dec. 4, 2019).
Extended European search report issued for corresponding European Patent Application No. 17839593.5 dated Dec. 4, 2019.

* cited by examiner

FIG. 10

| DU CATEGORIES (1 TO 8) | SPLIT POINTS (1 TO 8) | TRANSFER DATA TYPE | PROTOCOL | FUNCTION | | | | | |
|---|---|---|---|---|---|---|---|---|---|
| | | | | RF | Phy | BB | MAC | RLC | PDCP |
| 1 | 8 | ANALOG IQ DATA | CPRI | O | | | | | |
| 2 | 7 | DIGITAL IQ DATA | P1 | O | O | | | | |
| 3 | 6 | MAC PDU | P2 | O | O | O | | | |
| 4 | 5 | MAC SDU | P3 | O | O | O | O (ONE PORTION) | | |
| 5 | 4 | RLC PDU | P4 | O | O | O | O | | |
| 6 | 3 | RLC SDU | P5 | O | O | O | O | O (ONE PORTION) | |
| 7 | 2 | PDCP PDU | P6 | O | O | O | O | O | |
| 8 | 1 | PDCP SDU | P7 | O | O | O | O | O | O (ONE PORTION) |

| CU CATEGORIES (0 TO 8) | SPLIT POINTS (1 TO 8) | TRANSFER DATA TYPE (BETWEEN CU-C AND CU-U) | TRANSFER DATA TYPE (BETWEEN CU-C AND DU) | TRANSFER DATA TYPE (BETWEEN CU-U AND DU) | PROTOCOL (BETWEEN CU-C AND CU-U) | PROTOCOL (BETWEEN CU-C AND DU) | PROTOCOL (BETWEEN CU-U AND DU) |
|---|---|---|---|---|---|---|---|
| 0 | - | - | - | - | - | - | - |
| 1 | 8 | RRC, DCI/UCI | - | ANALOG IQ DATA | PU1 | - | CPRI |
| 2 | 7 | RRC, DCI/UCI | - | DIGITAL IQ DATA | PU2 | - | P1 |
| 3 | 6 | RRC, MAC CE | DCI/UCI | MAC PDU | PU3 | PD1 | P2 |
| 4 | 5 | RRC | MAC CE | MAC SDU | PU4 | PD2 | P3 |
| 5 | 4 | RRC | RRC | RLC PDU | PU5 | PD3 | P4 |
| 6 | 3 | RRC | RRC | RLC SDU | PU6 | - | P5 |
| 7 | 2 | RRC | RRC | PDCP PDU | PU7 | PD4 | P6 |
| 8 | 1 | RRC | RRC | PDCP SDU | PU8 | PD5 | P7 |

| TYPE 0: CU 1: CU-C 2: CU-U 3: DU | IDENTIFIER (0~1023) | CELL ID (0~503) | DOWNLINK FREQUENCY [MHz] | CATEGORY |
|---|---|---|---|---|
| 0 | 1 | 11 | 2140 | 0 |
| 1 | 1 | 119 | 3700 | 2 |
| 1 | 2 | 210 | 3500 | 4 |
| 2 | 1 | 35 | 2140 | 3 |
| 3 | 2 | 100 | 2140 | 5 |
| 3 | 1 | 21 | 3500 | 1 |

| CATEGORY | HLS | LLS | CPRI |
|---|---|---|---|
| 0 | 1 | 0 | 0 |
| 1 | 1 | 1 | 0 |
| 2 | 1 | 0 | 1 |
| 3 | 1 | 1 | 1 |
| 4 | 0 | 1 | 0 |
| 5 | 0 | 1 | 1 |
| 6 | 0 | 0 | 1 |

| CATEGORY | eMBB | URLLC | mMTC |
|---|---|---|---|
| a | 1 | 0 | 0 |
| b | 1 | 0 | 1 |
| c | 1 | 1 | 0 |
| d | 1 | 1 | 1 |
| e | 0 | 1 | 0 |
| f | 0 | 1 | 1 |
| g | 0 | 0 | 1 |

FIG. 31

| CATEGORY | CP AND CU SPLIT BY CU | CP AND CU SPLIT BY DU |
|---|---|---|
| A | 0 | 0 |
| B | 1 | 0 |
| C | 0 | 1 |
| D | 1 | 1 |

3100

WIRELESS BASE STATION, FIRST WIRELESS CONTROL APPARATUS, SECOND WIRELESS CONTROL APPARATUS, AND WIRELESS APPARATUS

CROSS-REFERENCE TO RELATED APPLICATION

This application is a continuation application of International Application PCT/JP2017/029180 filed on Aug. 10, 2017 and designated the U.S., the entire contents of which are incorporated herein by reference, which is based upon and claims the benefit of priority from the prior International Application PCT/JP2016/073760 filed on Aug. 12, 2016, the entire contents of which are incorporated herein by reference.

FIELD

The present invention relates to a wireless base station (for example, an eNB), a first wireless control apparatus, a second wireless control apparatus, and a wireless apparatus.

BACKGROUND

In the related art, mobile communication systems are known such as a 3rd generation mobile communication system (3G), LTE that corresponds to a 3.9th generation mobile communication system, and LTE-Advanced that corresponds to a 4th generation mobile communication system. LTE is short for Long Term Evolution. Furthermore, a study on technologies relating to a 5th mobile communication system (5G) has started. Furthermore, a study on the split of signal processing (a signal processing function or a function) in a wireless base station in 5G into a Center Unit or Centralized Unit (CU) and a Distributed Unit (DU) has been conducted. Furthermore, a study on the split of the CU into a CU-C that transfers data (control data or control information) in a control plane (C-Plane) and a CU-U that transfers data (user data or user information) in a user plane (U-Plane) has been conducted.

Furthermore, a technology is known in which each wireless apparatus on an ad hoc network manages local link information, and performs formation and transmission of the local link information using a Hello message. Furthermore, a technology is known in which, based on traffic control information, traffic control that includes priority control and route split is performed on a reception packet and thus the reception packet is output as an output packet.

Examples of the related art include Japanese Laid-open Patent Publication No. 2008-193558, International Publication Pamphlet No. WO 2015/136875.

SUMMARY

According to an aspect of the invention, a wireless base station for wireless communication includes: a wireless apparatus configured to perform first signal processing that is a part of signal processing in the wireless communication; a first wireless control apparatus configured to perform a user plane (U-plane) processing of the wireless communication; and a second wireless control apparatus configured to perform a control plane (C-plane) processing of the wireless communication.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 10 is a diagram illustrating an example of a DU category in accordance with every split point of the base station signal processing according to the first embodiment.

FIG. 11 is a diagram illustrating an example of a CU category in accordance with every split point of the base station signal processing according to the first embodiment.

FIG. 16 is a diagram illustrating an example of a CU/DU list according to the second embodiment.

FIG. 29 is a diagram illustrating an example of F1 capability information that is transmitted and received in each apparatus according to the eighth embodiment.

FIG. 30 is a diagram illustrating another example of the F1 capability information that is transmitted and received in each apparatus according to the eighth embodiment.

FIG. 31 is a diagram illustrating a further example of the F1 capability information that is transmitted and received in each apparatus according to the eighth embodiment.

DESCRIPTION OF EMBODIMENTS

However, in the related art described above, it is recommended that, on a network or within the wireless base station, there may be a plurality of split points of signal processing in the wireless base station, wherein for example the plurality of split points includes a function split point (Function Split) or the like at which the signal processing in the CU may be divided into signal processing of the CU-C and signal processing of the CU-U.

One aspect of the present invention is to serve the purpose of providing a wireless base station, a wireless apparatus, a wireless control apparatus, a wireless communication system, a communication method, and a wireless terminal, which are capable of making possible the mixture presence of a plurality of split points of signal processing in the wireless base station.

A wireless base station, a wireless apparatus, a wireless control apparatus, a wireless control apparatus, a wireless communication system, a communication method, and a wireless terminal according to the present invention will be described in detail with reference to the drawings.

First Embodiment (Wireless Base Station According to a First Embodiment)

Figure 1:
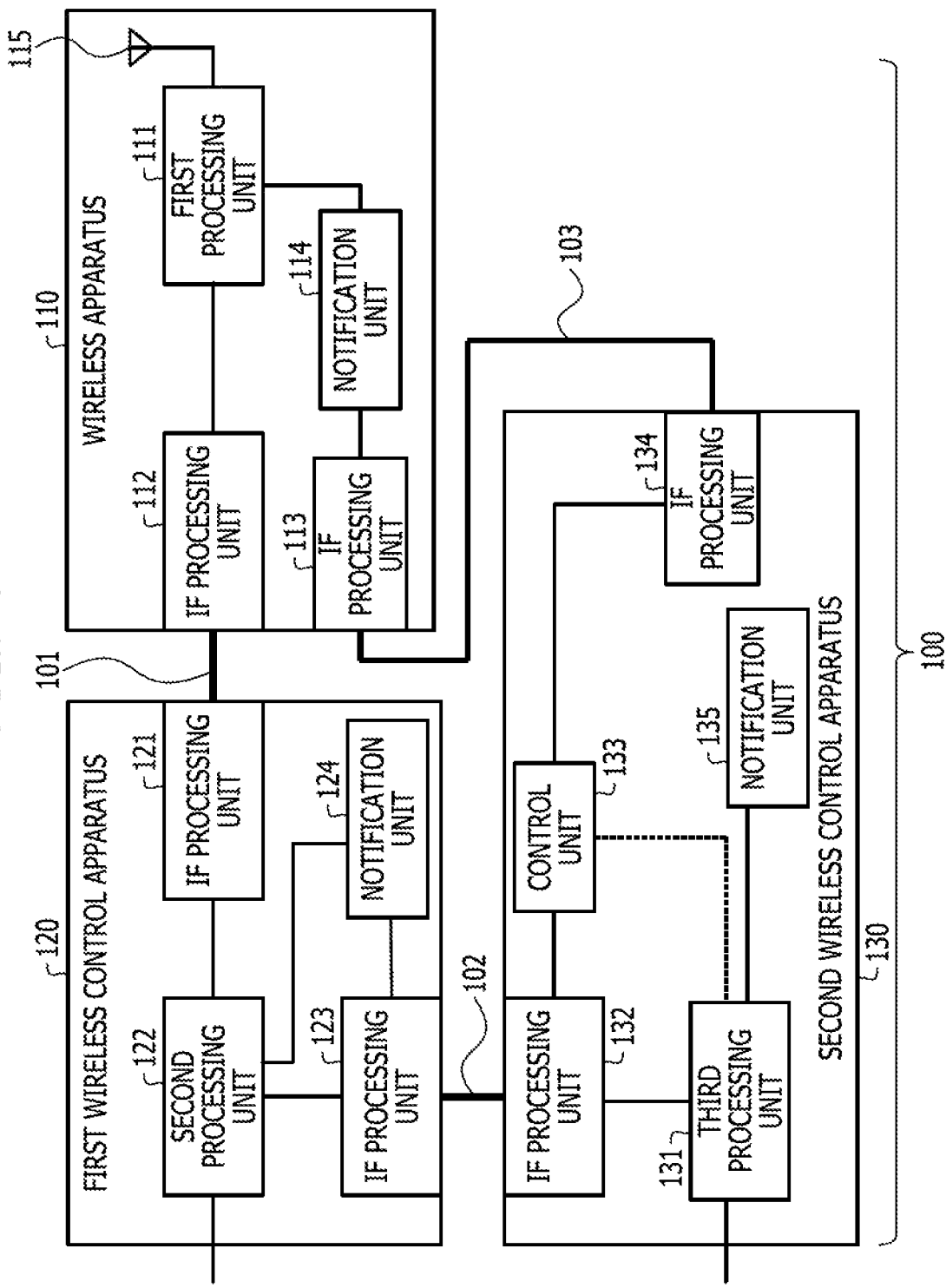
FIG. 1 is a diagram illustrating an example of a wireless base station according to a first embodiment.

FIG. 1 is a diagram illustrating an example of a wireless base station according to a first embodiment. As illustrated in FIG. 1, a wireless base station 100 according to the first embodiment includes a wireless apparatus 110, a first wireless control apparatus 120, and a second wireless control apparatus 130. Furthermore, the wireless base station 100 may perform wireless communication with the wireless terminal. Wireless communications of a signal with the wireless terminal, for example, include at least one of transmission of a downlink signal from the wireless base station 100 to the wireless terminal and the transmission of an uplink signal from the wireless terminal to the wireless base station 100.

A transfer path 101 connects between the wireless apparatus 110 and the first wireless control apparatus 120. The transfer path 101, for example, is a wired transfer path that connects between the wireless apparatus 110 and the first wireless control apparatus 120. For example, in a case where bidirectional signal transfer along the transfer path 101 is performed, the bidirectional signal transfer is performed with Wavelength Division Multiplexing (WDM) that is a technology which uses wavelengths that are different from each other. It is noted that a scheme other than the WDM may be used.

A transfer path 102 connects between the first wireless control apparatus 120 and the second wireless control apparatus 130. The transfer path 102, for example, is a wired transfer path that connects between the first wireless control apparatus 120 and the second wireless control apparatus 130. For example, in a case where the bidirectional signal transfer along the transfer path 102 is performed, the bidirectional signal transfer is performed with the WDM that is a technology which uses wavelengths that are different from each other.

A transfer path 103 connects between the wireless apparatus 110 and the second wireless control apparatus 130. The transfer path 103, for example, is a wired transfer path that connects between the wireless apparatus 110 and the second wireless control apparatus 130. For example, in a case where the bidirectional signal transfer along the transfer path 103 is performed, the bidirectional signal transfer is performed with the WDM that uses wavelengths that are different from each other. It is noted that a scheme other than the WDM may be used.

As transfer of a signal along the transfer paths 101 to 103, transfer of an electrical signal or transfer of an optical signal may be used. For example, for the transfer of the signal along the transfer paths 101 to 103, a CPRI or an OBSAI may be used. CPRI is short for Common Public Radio Interface. OBSAI is short for Open Base Station Architecture Initiative. As an example, the CPRI is specified by the Institute of Electrical and Electronics Engineers (IEEE) 803. However, for the transfer of the signal along the transfer paths 101 to 103, which is not limited to these, various transfer methods may be used.

The wireless apparatus 110 may perform wireless signal transmission and reception to and from the wireless terminal, using an antenna 115. As an example, the wireless apparatus 110 may be applicable as a DU that is studied in 5G. For example, the wireless apparatus 110 includes a first processing unit 111, an IF processing unit 112, an IF processing unit 113, a notification unit 114, and an antenna 115. It is noted that the first processing unit may be referred to as a first signal processing unit.

The first processing unit 111 performs first signal processing on a signal that is to be transferred by the wireless base station 100 to the wireless terminal. The first signal processing includes, for example, wireless signal processing among various processing performed in the wireless base station 100, wherein the various processing performed in the wireless base station 100 may be referred to as "base station signal processing". The wireless signal processing may include, for example, the wireless signal transmission and reception of the signal via the antenna 115, signal amplification processing, undesirable-signal removal by using a filter, and the like. The signal transmission and reception may be at least one of signal transmission and signal reception.

For example, the first processing unit 111 performs reception processing that is included in the first signal processing, on a signal that is wirelessly transmitted from the wireless terminal, and outputs the signal on which the reception processing that is included in the first signal processing is performed, to the IF processing unit 112. The reception processing which is included in the first signal processing may include reception of a signal through the antenna 115. Furthermore, the first processing unit 111 performs transmission processing that is included in the first signal processing, on a signal that is output from the IF processing unit 112. The transmission processing that is included in the first signal processing may include wireless transmission of a signal to the wireless terminal through the antenna 115.

The IF processing unit 112 is an interface (IF) processing unit configured to perform communication with the first wireless control apparatus 120 via the transfer path 101. For example, the IF processing unit 112 may transmit a signal that is output from the first processing unit 111, to the first wireless control apparatus 120 via the transfer path 101. Furthermore, the IF processing unit 112 may receive the signal that is transmitted from the first wireless control apparatus 120 via the transfer path 101, and output the received signal to the first processing unit 111.

The IF processing unit 113 is an interface processing unit configured to perform communication with the second wireless control apparatus 130 via the transfer path 103. For example, the IF processing unit 113 may transmit configuration information that is output from the notification unit 114, to the second wireless control apparatus 130 via the transfer path 103. Furthermore, the IF processing unit 113 may receive a configuration information request signal that is transmitted from the second wireless control apparatus 130 via the transfer path 103, and may output the received configuration information to the notification unit 114.

The notification unit 114 may output the configuration information relating to the first signal processing that is in the base station signal processing, which is performed by the first processing unit 111, to the IF processing unit 113. Accordingly, the configuration information may be transmitted to the second wireless control apparatus 130 along the transfer path 103. The configuration information will be described below.

For example, in a case where the wireless apparatus 110 and the second wireless control apparatus 130 are connected to each other, the notification unit 114 may output the configuration information to the IF processing unit 113. Furthermore, in a case where the configuration information request signal is output from the IF processing unit 113, the notification unit 114 may output the configuration information to the IF processing unit 113. Furthermore, in a state where the wireless apparatus 110 and the second wireless control apparatus 130 are connected to each other, in a case where an instruction to output the configuration information is received from a manager of the wireless apparatus 110, the notification unit 114 may output the configuration information to the IF processing unit 113.

Furthermore, for example, the configuration information relating to the first signal processing by the first processing unit 111 is stored in a memory of the wireless apparatus 110 (for example, a nonvolatile memory). In this case, the notification unit 114 reads the configuration information that is stored in the memory of the wireless apparatus 110, and outputs the configuration information that is read, to the IF processing unit 113.

Alternatively, the memory (for example, the nonvolatile memory) of the wireless apparatus 110 may store information for generating the configuration information, the information being information corresponding to the first signal processing in the first processing unit 111. In this case, the notification unit 114 may read the information that is stored in the memory of the wireless apparatus 110, and generate the configuration information based on the information that is read. Then, the notification unit 114 may output the generated configuration information to the IF processing unit 113. Alternatively, the notification unit 114 may acquire the configuration information relating to the first signal processing by the first processing unit 111 from the first processing unit 111.

The first wireless control apparatus 120 is provided to perform processing between the wireless apparatus 110 and a higher layer apparatus that is a node at a higher layer than the wireless apparatus 110. The first wireless control apparatus 120 may control, along with the second wireless control apparatus 130, the wireless signal transmission and reception by the wireless apparatus 110.

The higher layer apparatus for the wireless apparatus 110 is, for example, a communication apparatus in a core network of a mobile communication network (a wireless communication system) in which the wireless apparatus 110 is provided. Furthermore, the higher layer apparatus may be an apparatus that operates a higher layer protocol than the base station. That is, the higher layer apparatus may be an apparatus that is a node at a higher layer than the base station. Examples of the higher layer apparatus include a Serving Gateway (SGW), a Mobility Management Entity (MME), and the like. It is noted that the above-described SGW or MME is an apparatus in an LTE system that is a 4G mobile communication system, which is studied in 3GPP. The LTE system will be described below as an example, but application to any other wireless communication system is also possible unless otherwise specified.

As an example, the first wireless control apparatus 120 may correspond to a CU-U that is included in a CU which is studied in 5G. The CU-U is an apparatus configured to perform user plane (may be referred to as "U-plane") processing among the base station signal processing. For example, the first wireless control apparatus 120 includes IF processing units 121 and 123, a second processing unit 122, and a notification unit 124. It is noted that the second processing unit may be referred to as a second signal processing unit.

The IF processing unit 121 is an interface processing unit configured to receive a signal which is transmitted from the wireless apparatus 110 via the transfer path 101, wherein the IF processing unit 121 may output the received signal to the second processing unit 122. Furthermore, the IF processing unit 121 may transmit the signal that is output from the second processing unit 122, to the wireless apparatus 110 via the transfer path 101.

The second processing unit 122 is configured to perform a second signal processing among the base station signal processing. The second signal processing is, among the base station processing, different part from the first signal processing performed by the wireless apparatus 110. For example, the second signal processing may include processing that transmits a signal which is received by the wireless base station 100 from the wireless terminal, to a higher layer apparatus (for example, an SGW) for the wireless base station 100, and processing that receives a signal for the wireless terminal from the higher layer apparatus for the wireless base station 100. Furthermore, the second processing unit 122 may perform the second signal processing in accordance with a control signal received from the second wireless control apparatus 130 via the IF processing unit 123.

For example, the second processing unit 122 performs the reception processing in the second signal processing, on a signal received through the IF processing unit 121, and outputs the signal on which the reception processing is performed. The signal from the second processing unit 122 is, for example, transmitted to a higher layer apparatus for the wireless base station 100. Furthermore, the second processing unit 122 may perform the transmission processing in the second signal processing, on a signal that is input into the first wireless control apparatus 120 from a higher layer apparatus for the wireless base station 100, and may output the signal on which the transmission processing is performed, to the IF processing unit 121.

The IF processing unit 123 is an interface processing unit configured to receive a signal from the second wireless control apparatus 130 via the transfer path 102 and output the received signal to the second processing unit 122. Furthermore, the IF processing unit 123 may transmit the signal that is output from the second processing unit 122, to the second wireless control apparatus 130 via the transfer path 102.

Furthermore, the IF processing unit 123 may transmit the configuration information that is output from the notification unit 124, to the first wireless control apparatus 120 via the transfer path 102. Furthermore, in a case where the configuration information request signal that requests transmission of the configuration information is received from the first wireless control apparatus 120, the IF processing unit 123 may output the received configuration information request signal to the notification unit 124.

The notification unit 124 may output the configuration information relating to the second signal processing performed by the second processing unit 122 among the base station signal processing, to the IF processing unit 123. Accordingly, the configuration information may be transmitted to the second wireless control apparatus 130 along the transfer path 102. The configuration information will be described below.

For example, in a case where the first wireless control apparatus 120 and the second wireless control apparatus 130 are connected to each other, the notification unit 124 outputs the configuration information to the IF processing unit 123. Furthermore, in a case where the configuration information request signal is output from the IF processing unit 123, the notification unit 124 may output the configuration information to the IF processing unit 123. Furthermore, in a state where the first wireless control apparatus 120 and the second wireless control apparatus 130 are connected to each other, in a case where the instruction to output the configuration information is received from a manager of the first wireless control apparatus 120, the notification unit 124 may output the configuration information to the IF processing unit 123.

Furthermore, for example, the configuration information relating to the second signal processing performed by the second processing unit 122 may be stored in a memory of the first wireless control apparatus 120 (for example, a nonvolatile memory). In this case, the notification unit 124 reads the configuration information that is stored in the memory of the first wireless control apparatus 120, and outputs the configuration information that is read, to the IF processing unit 123.

Alternatively, the memory (for example, the nonvolatile memory) of the first wireless control apparatus 120 stores the information for generating the configuration information, the information being information corresponding to the second signal processing in the second processing unit 122. In this case, the notification unit 124 reads information that is stored in the memory of the first wireless control apparatus 120, and generates the configuration information based on the information that is read. Then, the notification unit 124 outputs the generated configuration information to the IF processing unit 123. Alternatively, the configuration information relating to the second signal processing by the second processing unit 122 may be acquired from the second processing unit 122.

The second wireless control apparatus 130 is provided to perform processing between the wireless apparatus 110 and the higher layer apparatus for the wireless apparatus 110. The second wireless control apparatus 130 may control, along with the first wireless control apparatus 120, the wireless signal transmission and reception by the wireless apparatus 110. The second wireless control apparatus 130 may be connected to the wireless apparatus 110 through the first wireless control apparatus 120, as in an example that is illustrated in FIG. 1, and may be connected directly to the wireless apparatus 110 along the transfer path.

As an example, the second wireless control apparatus 130 may correspond to the CU-C that is included in the CU which is studied as a function of 5G. The CU-C is an apparatus configured to perform control plane (C-plane) processing among the base station signal processing. For example, the second wireless control apparatus 130 includes a third processing unit 131, IF processing units 132 and 134, and a control unit 133. It is noted that the third processing unit may be referred to as a second signal processing unit. Furthermore, the second wireless control apparatus 130 may include a notification unit 135.

The third processing unit 131 is configured to perform third signal processing among the base station signal processing. The third signal processing is, among the base station processing, different part from the first signal processing by the wireless apparatus 110 and the second signal processing by the first wireless control apparatus 120. For example, the third signal processing include processing that transmits a control signal for controlling the second signal processing in the first wireless control apparatus 120, to the first wireless control apparatus 120. For example, the third processing unit 131 may output the control signal for controlling the second signal processing in the first wireless control apparatus 120, through the IF processing unit 132.

For example, the second processing unit 122 may perform the third signal processing by transmitting and receiving a C-Plane signal to and from a higher layer apparatus (for example, the MME) for the wireless base station 100.

The IF processing unit 132 is an interface processing unit configured to receive a signal from the first wireless control apparatus 120 via the transfer path 102 and output the received signal to the third processing unit 131. Furthermore, the IF processing unit 132 may transmit the signal (for example, the control information) that is output from the third processing unit 131, to the first wireless control apparatus 120 via the transfer path 102. Furthermore, the IF processing unit 132 may output the configuration information that is included in the signal which is received from the first wireless control apparatus 120, to the control unit 133.

The IF processing unit 134 is an interface processing unit configured to receive a signal from the wireless apparatus 110 via the transfer path 103 and output the received signal to the third processing unit 131. Furthermore, the IF processing unit 134 may transmit the signal that is output from the third processing unit 131, to the wireless apparatus 110 via the transfer path 103. Furthermore, the IF processing unit 134 may output the configuration information that is included in the signal which is received from the wireless apparatus 110, to the control unit 133.

Based on the configuration information that is output from the IF processing unit 132 or 134, the control unit 133 may control processing that is included in the third signal processing by the third processing unit 131. As an example, based on the configuration information, the control unit 133 specifies, among the base station signal processing, a part included in the first signal processing by the wireless apparatus 110 and a part included in the second signal processing by the first wireless control apparatus 120. Then, the control unit 133 sets processing other than the specified parts among the base station signal processing, to be the third signal processing by the third processing unit 131. Alternatively, based on the configuration information, the control unit 133 may specify, from the base station signal processing such as processing in CU, a part included in the second signal processing to be performed by the first wireless control apparatus 120. Then, the control unit 133 may set processing other than the specified part in the processing by the CU to be the third signal processing by the third processing unit 131.

Regarding an example of a distribution of the base station signal processing divided into the first signal processing, the second signal processing, and the third signal processing will be described. The base station signal processing in the wireless base station 100 is divided into the first signal processing by the first processing unit 111 of the wireless apparatus 110, the second signal processing by the second processing unit 122 of the first wireless control apparatus 120, and the third signal processing by the third processing unit 131 of the second wireless control apparatus 130. For example, when a plurality of wireless base stations 100 are provided to the mobile communication network, the way of dividing (may be referred to as "the division", "split point") in each of the plurality of wireless base stations 100 may be different from each other. Then, when the split point of the base station signal processing differs among the plurality of base stations, for example, an end point of processing to be included in the first signal processing, an end point of processing to be included in the second signal processing, and an end point of processing to be included in the third signal processing may be different, respectively. Also, a type of data of a signal, which is transferred along each transfer path between the wireless apparatus 110, the first wireless control apparatus 120, and the second wireless control apparatus 130, may be different among the plurality of base stations.

For example, in some cases, the third signal processing by the second wireless control apparatus 130 differs according to a combination of the first signal processing by the wireless apparatus 110 and the second signal processing by the first wireless control apparatus 120. In this case, the second wireless control apparatus 130 sets the processing that is included in the third signal processing, which is performed by the wireless base station 100 itself, according to the split points of the base station signal processing in the wireless apparatus 110 and the first wireless control apparatus 120. Furthermore, the second wireless control apparatus 130 sets a method for transferring a signal to and from the first wireless control apparatus 120 via the transfer path 102, according to the split point of the base station signal processing in the first wireless control apparatus 120 that is connected to the wireless base station 100 itself. Furthermore, in some cases, the second wireless control apparatus 130 sets a method for transferring a signal to and from the wireless apparatus 110 via the transfer path 103, according to the split point of the base station signal processing in the wireless apparatus 110 that is connected to the wireless base station 100 itself.

In contrast, the second wireless control apparatus 130 is configured to receive the configuration information relating to the first signal processing from the wireless apparatus 110, and receive the configuration information relating to the second signal processing from the first wireless control apparatus 120. Accordingly, it is possible that, based on each of the pieces of received configuration information, the second wireless control apparatus 130 sets the processing that is included in the third signal processing by the wireless base station 100 itself, and a method for transferring a signal to and from the wireless apparatus 110 or the first wireless control apparatus 120. For this reason, for example, in the mobile communication network in which the wireless base station 100 is applicable, it is possible that a combination of the wireless apparatus 110 and the first wireless control apparatus 120 that have different configurations (split points of the base station signal processing, or Function Splits) exists together.

Configuration information of the wireless apparatus 110, for example, is information that specifies the distribution (alternatively, function division) of the base station signal processing as the first signal processing, the second signal processing, and the third signal processing, according to processing that is included in the first signal processing. Alternatively, the configuration information of the wireless apparatus 110 may be information that specifies a transfer method for transferring a signal along the transfer path 103, according to the distribution of the base station signal processing as the first signal processing, the second signal processing, and the third signal processing.

As an example, the configuration information of the wireless apparatus 110 may be set to be information directly or indirectly indicating the split point of the base station signal processing to which the wireless apparatus 110 corresponds, or information (for example, the split point or a CU category that will be described below) relating to the split point. Alternatively, the configuration information of the wireless apparatus 110 may be set to be information indicating the processing that is included in the first signal processing, information indicating the processing that is included in the third signal processing, or information relating to processing according to the split point of the base station signal processing to which the wireless apparatus 110 corresponds. Alternatively, the configuration information of the wireless apparatus 110 may be information indicating a type of data of a signal that is transferred along the transfer path 103, or a method (for example, a protocol) for transferring a signal that has such a type of data of the signal, or may be information relating to the transfer method.

Configuration information of the first wireless control apparatus 120, for example, is information that specifies the distribution of the base station signal processing as the first signal processing, the second signal processing, and the third signal processing, according to the processing that is included in the second signal processing. Alternatively, the configuration information of the first wireless control apparatus 120 may be information that specifies a transfer method for transferring a signal along the transfer path 102, according to the distribution of the base station signal processing as the first signal processing, the second signal processing, and the third signal processing.

As an example, the configuration information of the first wireless control apparatus 120 may be set to be information (for example, the split point or the CU category that will be described below) directly or indirectly indicating the split point of the base station signal processing to which the first wireless control apparatus 120. Alternatively, the configuration information of the first wireless control apparatus 120 may be information indicating the processing that is included in the second signal processing or the information indicating the processing that is included in the third signal processing, according to the split point of the base station signal processing to which the first wireless control apparatus 120 corresponds. Alternatively, the configuration information of the first wireless control apparatus 120 may be information indicating a type of data of a signal that is transferred along the transfer path 102, or a method (for example, a protocol) for transferring a signal that has such a type of data of the signal.

Furthermore, a configuration is described in which each of the wireless apparatus 110 and the first wireless control apparatus 120 transmits the configuration information to the second wireless control apparatus 130, but a configuration may be employed in which any of the wireless apparatus 110 and the first wireless control apparatus 120 transmits the configuration information.

For example, in some cases, the first signal processing by the wireless apparatus 110 is fixed, and the third signal processing by the second wireless control apparatus 130 differs according to the second signal processing by the first wireless control apparatus 120. In this case, the second wireless control apparatus 130 sets the processing that is included in the third signal processing, which is performed by the wireless base station 100 itself, according to the split point of the base station signal processing, which corresponds to the first wireless control apparatus 120 that is connected to the wireless base station 100 itself. Furthermore, the second wireless control apparatus 130 sets the method for transferring a signal to and from the first wireless control apparatus 120 via the transfer path 102, according to the split point of the base station signal processing, which corresponds to the second wireless control apparatus 130 that is connected to the wireless base station 100 itself.

In contrast, the second wireless control apparatus 130 receives the configuration information relating to the second signal processing from the first wireless control apparatus 120. Accordingly, it is possible that, based on the received configuration information, the second wireless control apparatus 130 sets the processing that is included in the third signal processing by the wireless base station 100 itself, and the method for transferring a signal to and from the first wireless control apparatus 120. For this reason, for example, in the mobile communication network in which the wireless base station 100 is applicable, it is possible that the first wireless control apparatus 120 that has a different configuration (split point of the base station signal processing, or Function Split) exists together.

The configuration information, for example, is information that may specify the distribution of the base station signal processing as the first signal processing by the first processing unit 111, the second signal processing by the second processing unit 122, and the third signal processing by the third processing unit 131. Alternatively, the configuration information may be information that specifies a transfer method for transferring a signal along the transfer path 101 or 103 between the wireless apparatus 110 or the first wireless control apparatus 120 and the second wireless control apparatus 130, according to the distribution of the base station signal processing as the first signal processing by the first processing unit 111, the second signal processing by the second processing unit 122, and the third signal processing by the third processing unit 131.

As an example, the configuration information may be set to be information directly or indirectly indicating the split point of the base station signal processing to which the wireless apparatus 110 or the first wireless control apparatus 120 corresponds, or the information (for example, the split point or various CU categories that will be described below) relating to the split point. Alternatively, the configuration information may be set to be information indicating the processing that is included in the first signal processing, the processing that is included in the second signal processing, or the processing that is included in the third signal processing or any combination thereof, or information relating to the processing, according to the split point of the base station signal processing to which the wireless apparatus 110 or the first wireless control apparatus 120 corresponds. Alternatively, the configuration information may be information indicating a type of data of a signal that is transferred along the transfer path 101 or 103, or a method (for example, a protocol) for transferring a signal that has such a type of data of the signal, or may be information relating to the transfer method.

Furthermore, the notification unit 135 notifies at least one of the wireless apparatus 110 and the first wireless control apparatus 120 of the configuration information relating to the third signal processing by the second wireless control apparatus 130, which is in the base station signal processing, along a transfer path. However, the second wireless control apparatus 130 may employ a configuration in which the notification unit 135 is omitted.

(Each Split Example of the Base Station Signal Processing According to the First Embodiment)

Figure 2:
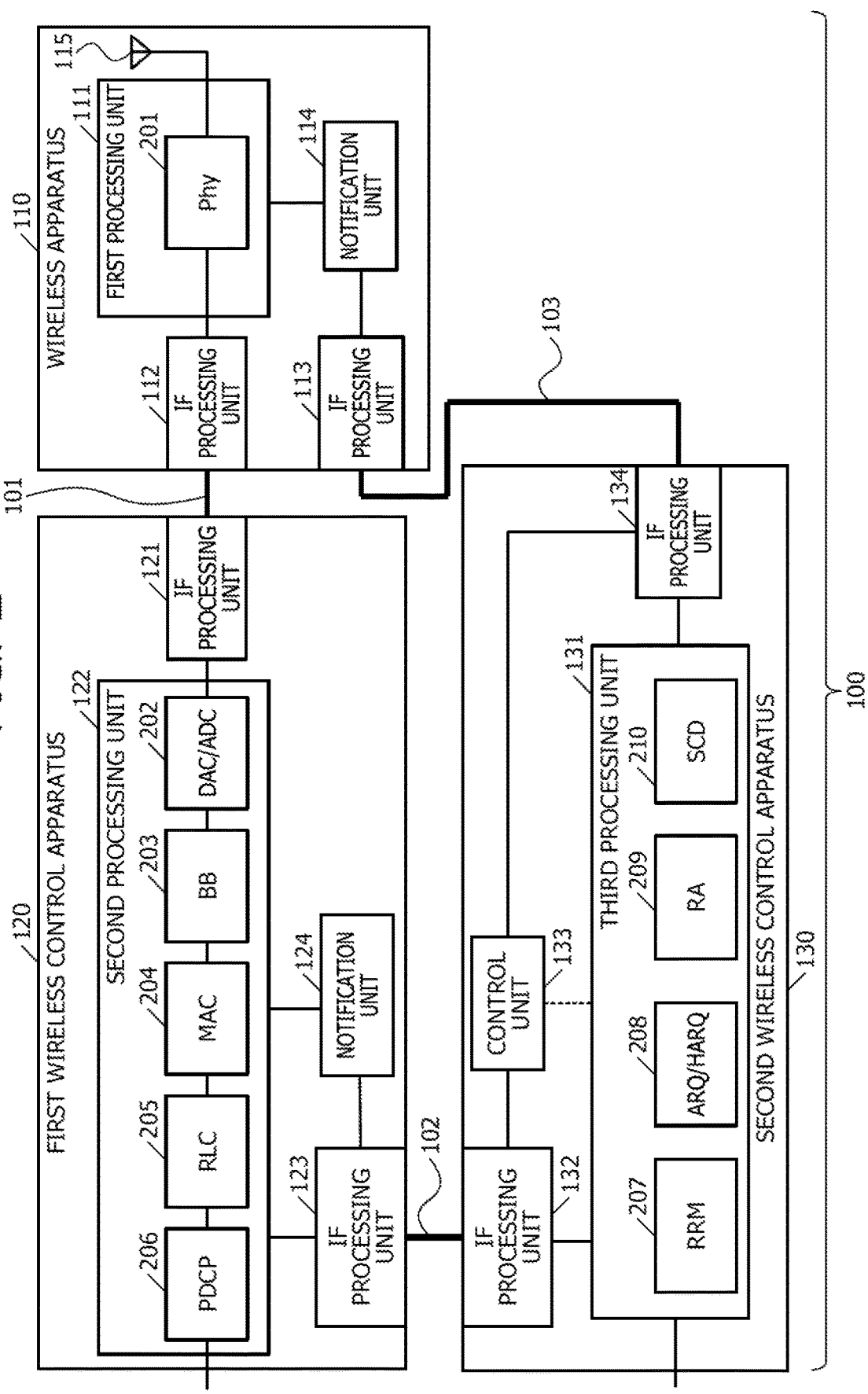
FIG. 2 is a diagram illustrating a first split example of base station signal processing according to the first embodiment.

FIG. 2 is a diagram illustrating a first split example of the base station signal processing according to the first embodiment. In FIG. 2, a portion that is the same as the portion that is illustrated in FIG. 1 is given the same reference numeral and a description thereof is omitted. It is noted that in FIG. 2, an illustration of the notification unit 135 is omitted. In an example that is illustrated in FIG. 2, the wireless base station 100 includes a physical layer processing unit 201 (Phy), a DAC and ADC 202, a BB processing unit 203 (BB), a MAC processing unit 204 (MAC), an RLC processing unit 205 (RLC), and a PDCP processing unit 206 (PDCP). Furthermore, the wireless base station 100 includes an RRM processing unit 207 (RRM), an ARQ and HARQ processing unit 208 (ARQ and HARQ), an RA processing unit 209 (RA), and an SCD processing unit 210 (SCD).

Each processing unit of, or each functional entity of these is a processing unit configured to perform processing that is included in the above-described base station signal processing. The split point of the base station signal processing described above, for example, is determined by which one of the first processing unit 111, the second processing unit 122, and the third processing unit 131 each processing unit, or each function of these is distributed to. Furthermore, the above-described MAC, RLC, and PDCP indicate a configuration (a function) of a base station apparatus in a W-CDMA or LTE system in the related art, and the description is provided here using these. W-CDMA is short for Wideband-Code Division Multiple Access. W-CDMA is a registered trademark. It is noted that there is a likelihood that the above-described function and a function of 5G mobile communication (commonly referred to as 5G) will be different from each other in name or function. However, the present embodiment is not limited to these.

DAC is short for Digital-to-Analog Converter. ADC is short for Analog-to-Digital Converter. BB is short for Baseband. MAC is short for Media Access Control. RLC is short for Radio Link Control. PDCP is short for Packet Data Convergence Protocol.

RRM is short for Radio Resource Management. ARQ is short for Automatic Repeat Request. HARQ is short for Hybrid Automatic Repeat Request. RA is short for Random Access. SCD is short for Scheduler.

In an example that is illustrated in FIG. 2, the physical layer processing unit 201 is included in the first processing unit 111. Furthermore, the DAC and ADC 202, the BB processing unit 203, the MAC processing unit 204, the RLC processing unit 205, and the PDCP processing unit 206 are included in the second processing unit 122. Furthermore, the RRM processing unit 207, the ARQ and HARQ processing unit 208, the RA processing unit 209, and the SCD processing unit 210 are included in the third processing unit 131.

That is, in the first split example that is illustrated in FIG. 2, as with a DU (for example, an RRH) in current LTE, a physical layer processing may be included in the wireless apparatus 110 (the DU). RRH is short for Remote Radio Head (a wireless unit). Furthermore, a function of each of the RA, the ARQ and HARQ, the SCD, and the RRM (RRC) that are included in a function of the MAC is included in the second wireless control apparatus 130 (the CU-C). Furthermore, the function of the ARQ that is included in a function of the RLC is included in the second wireless control apparatus 130 (the CU-C). Furthermore, a function of generating a signal such as a Synchronization Signal (SS) or a Reference Signal (RS) may be included in the second wireless control apparatus 130 (the CU-C). Furthermore, the function of generating a signal such as the SS or the RS may be included in the second wireless control apparatus 130 (the CU-U).

The physical layer processing unit 201 performs physical layer reception processing on a signal that is received using the antenna 115, and outputs the signal on which the reception processing is performed, to the IF processing unit 112. Furthermore, the physical layer processing unit 201 performs physical layer transmission processing on the signal that is output from the IF processing unit 112, and wirelessly transmits the signal on which the transmission processing is performed, through the antenna 115.

The IF processing unit 112 transmits a signal that is output from the physical layer processing unit 201 to the first wireless control apparatus 120 along the transfer path 101. Furthermore, the IF processing unit 112 outputs a signal that is transmitted from the first wireless control apparatus 120 along the transfer path 101, to the physical layer processing unit 201.

The IF processing unit 121 outputs a signal that is transmitted from the wireless apparatus 110 along the transfer path 101, to the DAC and ADC 202. Furthermore, the IF processing unit 121 transmits a signal that is output from the DAC and ADC 202, to the wireless apparatus 110 along the transfer path 101.

The DAC and ADC 202 converts the signal that is output from the IF processing unit 121, from an analog signal to a digital signal, and outputs a signal that results from the conversion, to the BB processing unit 203. Furthermore, the DAC and ADC 202 converts a signal that is output from the BB processing unit 203, from a digital signal to an analog signal, and outputs a signal that results from the conversion, to the IF processing unit 121. It is noted that the DAC and ADC 202 may be provided in the BB processing unit 203.

The BB processing unit 203 performs baseband reception processing on the signal that is output from the DAC and ADC 202, and outputs the signal on which the reception processing is performed, to the MAC processing unit 204. Furthermore, the BB processing unit 203 performs baseband transmission processing on a signal that is output from the MAC processing unit 204, and outputs the signal on which the transmission processing is performed, to the DAC and ADC 202. It is noted that the reception processing by the BB processing unit 203, for example, includes demodulation, decoding, de-scrambling, FFT, or IFFT, or any combination thereof. FFT is short for Fast Fourier Transform. IFFT is short for Inverse Fast Fourier Transform. Furthermore, the transmission processing by the BB processing unit 203 includes, for example, FFT, IFFT, coding, modulation, or scrambling, or any combination thereof. It is noted that the transmission processing by the BB processing unit 203, for example, is described in detail in TS 36.211, and is a technology that is well known to a person of ordinary skill in the art. It is noted that a limitation to the description, such as inclusion of one portion of the processing that is described in TS 36.211, is not imposed.

The MAC processing unit 204 performs MAC reception processing on the signal that is output from the BB processing unit 203, and outputs the signal on which the reception processing is performed, to the RLC processing unit 205. Furthermore, the MAC processing unit 204 performs MAC transmission processing on a signal that is output from the RLC processing unit 205, and outputs the signal on which the transmission processing is performed, to the BB processing unit 203. It is noted that the detailed processing as to the MAC processing is described in detail, for example, in TS 36.320, and is a technology that is well known to a person of ordinary skill in the art. For example, a limitation to the description, such as inclusion of one portion of the processing that is described in TS 36.320, is not imposed.

The RLC processing unit 205 performs RLC reception processing on the signal that is output from the MAC processing unit 204, and outputs the signal on which the reception processing is performed, to the PDCP processing unit 206. Furthermore, the RLC processing unit 205 performs RLC transmission processing on a signal that is output from the PDCP processing unit 206, and outputs the signal on which the transmission processing is performed, to the MAC processing unit 204. It is noted that the detailed processing as to the RLC processing is described in detail, for example, in TS 36.321, and is a technology that is well known to a person of ordinary skill in the art. For example, a limitation to the description, such as inclusion of one portion of the processing that is described in TS 36.321, is not imposed.

The PDCP processing unit 206 performs PDCP reception processing on the signal that is output from the RLC processing unit 205, and outputs the signal on which the reception processing is performed. The signal that is output from the PDCP processing unit 206, for example, is transmitted to a higher layer apparatus for the wireless base station 100. Furthermore, the PDCP processing unit 206, for example, performs PDCP transmission processing on a signal that is transmitted from a higher layer apparatus for the wireless base station 100, and outputs the signal on which the transmission processing is performed, to the RLC processing unit 205. It is noted that the detailed processing as to the PDCP processing is described in detail, for example, in TS 36.322, and is a technology that is well known to a person of ordinary skill in the art. For example, a limitation to the description, such as inclusion of one portion of the processing that is described in TS 36.321, is not imposed.

The RRM processing unit 207 performs RRM processing relating to management of a radio resource that is used for the wireless communication between the wireless base station 100 and the wireless terminal. For example, the RRM processing unit 207 performs the RRM processing by controlling PDCP processing by the PDCP processing unit 206, RLC processing by the RLC processing unit 205, MAC processing by the MAC processing unit 204, or BB processing by the BB processing unit 203, or any combination thereof.

The ARQ and HARQ processing unit 208 performs automatic repeat request (ARQ) processing and hybrid automatic repeat request (HARQ) processing relating to retransmission of a signal between the wireless base station 100 and the wireless terminal. For example, the ARQ and HARQ processing unit 208 performs the retransmission of a signal to and from the wireless terminal through the RLC processing unit 205. Furthermore, the ARQ and HARQ processing unit 208 may perform the ARQ processing and the HARQ processing by controlling at least one of the MAC processing by the MAC processing unit 204 and the BB processing by the BB processing unit 203. Furthermore, the ARQ and HARQ processing unit 208 may perform the ARQ processing and the HARQ processing by acquiring an uplink signal (alternatively, an uplink control signal) from the wireless terminal, from the BB processing unit 203.

The RA processing unit 209 performs random access (RA) processing for connection to the wireless terminal to the wireless base station 100. For example, the RA processing unit 209 performs transmission and reception of a random signal to and from the wireless terminal through the MAC processing unit 204. Furthermore, the RA processing unit 209 may perform the RA processing by controlling at least one of the MAC processing by the MAC processing unit 204 and the BB processing by the BB processing unit 203. Furthermore, the RA processing unit 209 may perform the RA processing by acquiring an uplink random access signal from the wireless terminal, from the BB processing unit 203.

The SCD processing unit 210 performs scheduling for allocating a system band for the transmission and reception of the signal between the wireless base station 100 and the wireless terminal. For example, the SCD processing unit 210 performs scheduling processing by controlling at least one of the MAC processing by the MAC processing unit 204 and the BB processing by the BB processing unit 203. Furthermore, the SCD processing unit 210 may perform the scheduling processing by acquiring quality report information from the wireless terminal, from the BB processing unit 203.

Furthermore, processing for at least one of the RRM and the ARQ, for example, may be performed by the RLC processing unit 205. Furthermore, at least one of the RA processing and the scheduling processing, for example, may be performed by the MAC processing unit 204.

In the example that is illustrated in FIG. 2, the split point of the base station signal processing is between the physical layer processing unit 201 and the DAC and ADC 202, and thus a signal that is transferred along the transfer path 101, for example, is a DAC output or an ADC input, and is analog IQ data.

However, in a case where transfer by the IF processing units 112 and 121 along the transfer path 101 is digital transfer, the analog IQ data between the physical layer processing unit 201 and the DAC and ADC 202 is, for example, a DAC input or an ADC output, and is digitized, thereby being transferred along the transfer path 101.

That is, the IF processing unit 112 converts the analog IQ data that is output from the physical layer processing unit 201, into a digital signal, and transmits the digital signal to the first wireless control apparatus 120 along the transfer path 101. On this occasion, the digital signal is transferred in a state of being mapped onto a format that is determined in advance by a protocol. Furthermore, the IF processing unit 112 converts the digital signal that is transmitted from the first wireless control apparatus 120 along the transfer path 101, into analog IQ data, and outputs the analog IQ data to the physical layer processing unit 201. On this occasion, the digital signal that is transmitted in the state of being mapped onto the above-described format is received in a manner that is de-mapped.

Furthermore, the IF processing unit 121 converts the digital signal that is transmitted from the wireless apparatus 110 along the transfer path 101, into analogue IQ data, and the digital signal is output to the DAC and ADC 202. On this occasion, the digital signal that is transmitted in the state of being mapped onto the above-described format is received in a manner that is de-mapped. Furthermore, the IF processing unit 121 converts the analog IQ data that output from the DAC and ADC 202, into a digital signal, and transmits the digital signal to the first wireless control apparatus 120 along the transfer path 101. On this occasion, the digital signal is transferred in a state of being mapped onto a format that is determined in advance by a protocol.

Furthermore, in the example that is illustrated in FIG. 2, the transfer path 101 (an interface between the CU-U and DU) and the transfer path 102 (an interface between the CU-C and CU-U) are set for communication between the wireless base station 100 and the wireless terminal. A common logical control channel and a dedicated logical control channel that are transferred through dedicated data and a wireless dedicated channel are transferred between the CU-U and the CU-C through the interface between the CU-C and the CU-U.

The dedicated data, for example, is a logical channel that is transferred over Dedicated Traffic Channel (DTCH). The common logical control channel, for example, a Common Control Channel (CCCH). The dedicated logical control channel, for example, a Dedicated Control Channel (DCCH).

A control signal relating to the scheduling, and the like, and signals such as L1 signaling, L2 signaling, an SS, and an RS are generated by the CU-C, and is transferred between the CU-U and the CU-C through the interface between the CU-C and the CU-U. Furthermore, for example, in the function of the MAC of the CU-U, logical channel multiplexing and de-multiplexing is performed on the above-described DTCH, CCCH, DCCH, and L2 signaling.

The L1 signaling, for example, is DCI or UCI. DCI is short for Downlink Control Information. UCI is short for Uplink Control Information. The L2 signaling, for example, is a MAC CE in LTE. CE is short for Control Element.

Figure 3:
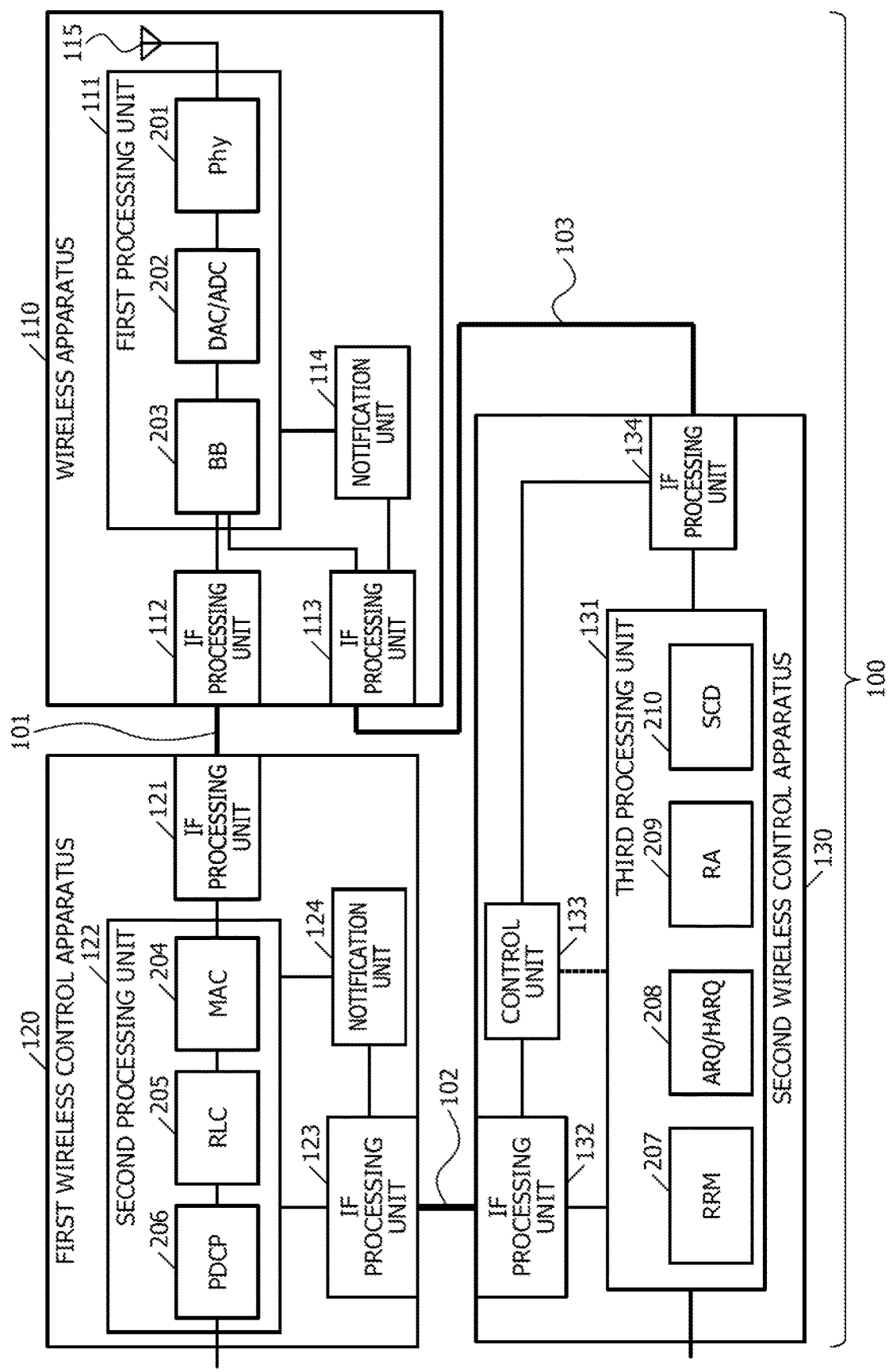
FIG. 3 is a diagram illustrating a second split example of the base station signal processing according to the first embodiment.

FIG. 3 is a diagram illustrating a second split example of the base station signal processing according to the first embodiment. In FIG. 3, a portion that is the same as the portion that is illustrated in FIG. 2 is given the same reference numeral and a description thereof is omitted. In an example that is illustrated in FIG. 3, the physical layer processing unit 201, the DAC and ADC 202, and the BB processing unit 203 are included in the first processing unit 111. Furthermore, the MAC processing unit 204, the RLC processing unit 205, and the PDCP processing unit 206 are included in the second processing unit 122. Furthermore, the RRM processing unit 207, the ARQ and HARQ processing unit 208, the RA processing unit 209, and the SCD processing unit 210 are included in the third processing unit 131.

That is, in the second split example that is illustrated in FIG. 3, a function of the BB (after the modulation) is included in the wireless apparatus 110 (the DU). Furthermore, the function of each of the RA, the ARQ and HARQ, the SCD, and the RRM (RRC) that are included in the function of the MAC is included in the second wireless control apparatus 130 (the CU-C). Furthermore, the ARQ function that is included in the RLC function is included in the second wireless control apparatus 130 (the CU-C). Furthermore, the function of generating the signal such as the SS or the RS may be included in the second wireless control apparatus 130 (the CU-C).

The physical layer processing unit 201 performs the physical layer reception processing on the signal that is received using the antenna 115, and outputs the signal on which the reception processing is performed, to the DAC and ADC 202. Furthermore, the physical layer processing unit 201 performs the physical layer transmission processing on the signal that is output from the DAC and ADC 202, and wirelessly transmits the signal on which the transmission processing is performed, through the antenna 115.

The DAC and ADC 202 converts the signal that is output from the physical layer processing unit 201, from an analog signal to a digital signal, and outputs a signal that results from the conversion, to the BB processing unit 203. Furthermore, the DAC and ADC 202 converts the signal that is output from the BB processing unit 203, from a digital signal to an analog signal, and outputs a signal that results from the conversion, to the physical layer processing unit 201.

The BB processing unit 203 performs the baseband reception processing on the signal that is output from the DAC and ADC 202, and outputs the signal on which the reception processing is performed, to the IF processing unit 112. Furthermore, the BB processing unit 203 performs the baseband transmission processing on the signal that is output from the IF processing unit 112, and outputs the signal on which the transmission processing is performed, to the DAC and ADC 202.

The IF processing unit 112 transmits a signal (for example, a U-Plane signal (user data or user information)) for the first wireless control apparatus 120, among signals that are output from the BB processing unit 203, to the first wireless control apparatus 120 along the transfer path 101. The IF processing unit 113 transmits a signal (for example, a C-Plane signal (control data or control information)) for the second wireless control apparatus 130, among the signals that are output from the BB processing unit 203, to the second wireless control apparatus 130 along the transfer path 103.

Furthermore, the IF processing unit 112 outputs the signal (for example, the U-Plane signal) that is transmitted from the first wireless control apparatus 120 along the transfer path 101, to the BB processing unit 203. Furthermore, the IF processing unit 113 outputs a signal (for example, the C-Plane signal) that is transmitted from the second wireless control apparatus 130 along the transfer path 103, to the BB processing unit 203.

The IF processing unit 121 outputs the signal that is transmitted from the wireless apparatus 110 along the transfer path 101, to the MAC processing unit 204. Furthermore, the IF processing unit 121 transmits the signal that is output from the MAC processing unit 204, to the wireless apparatus 110 along the transfer path 101.

The MAC processing unit 204 performs the MAC reception processing on the signal that is output from the IF processing unit 121, and outputs the signal on which the reception processing is performed, to the RLC processing unit 205. Furthermore, the MAC processing unit 204 performs the MAC transmission processing on the signal that is output from the RLC processing unit 205, and outputs the signal on which the transmission processing is performed, to the IF processing unit 121.

In the example that is illustrated in FIG. 3, the split point of the base station signal processing is between the BB processing unit 203 and the MAC processing unit 204, and thus the signal that is transferred along the transfer path 101, for example, is a MAC PDU. PDU is short for Protocol Data Unit. The MAC PDU, for example, is a digital signal that is one bit long.

Furthermore, in the example that is illustrated in FIG. 3, the transfer path 101 (the interface between the CU-U and the DU), the transfer path 102 (the interface between the CU-C and the CU-U), and the transfer path 103 (an interface between the CU-C and the DU) are set for the communication between the wireless base station 100 and the wireless terminal. In the function of the MAC of the CU-U, the logical channel multiplexing and de-multiplexing are performed on the common logical control channel or the dedicated logical control channel that is transferred through the dedicated data and the wireless dedicated channel, and on the L2 signaling. Thus, the common logical control channel or the dedicated logical control channel, and the wireless dedicated channel are transferred between the CU-U and the DU.

The L1 signaling (for example, the DCI or the UCI) is transferred from the CU-C to the DU through the interface between the CU-C and the DU. DCI is short for Downlink Control Information. UCI is short for Uplink Control Information. Furthermore, the MAC PDU is transferred between the CU-U and the DU through the interface between the CU-U and the DU.

Figure 4:
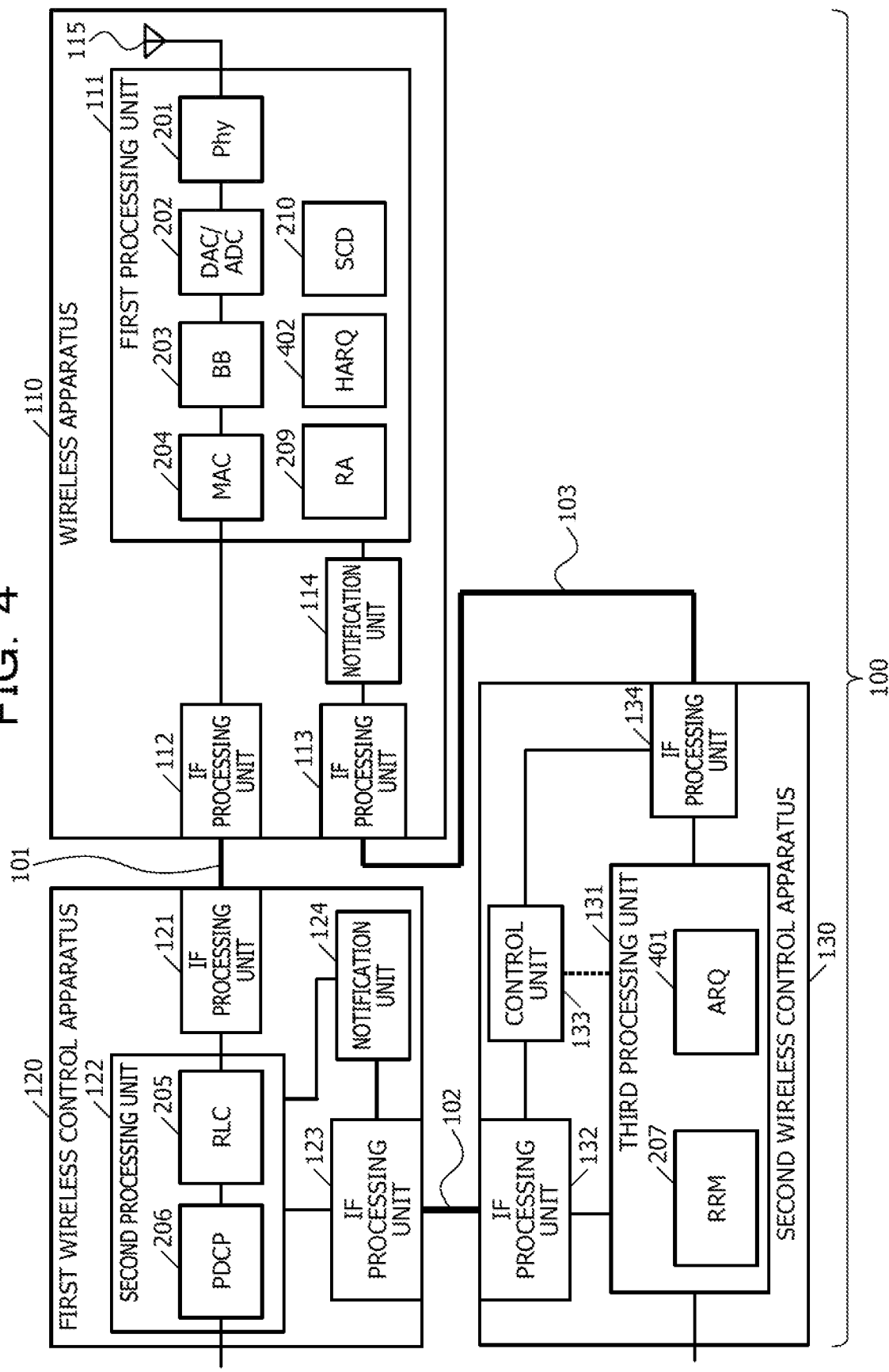
FIG. 4 is a diagram illustrating a third split example of the base station signal processing according to the first embodiment.

FIG. 4 is a diagram illustrating a third split example of the base station signal processing according to the first embodiment. In FIG. 4, a portion that is the same as the portion that is illustrated in FIG. 3 is given the same reference numeral and a description thereof is omitted. In an example that is illustrated in FIG. 4, the physical layer processing unit 201, the DAC and ADC 202, the BB processing unit 203, the MAC processing unit 204, the RA processing unit 209, a HARQ 402, and the SCD processing unit 210 are included in the first processing unit 111.

Furthermore, the RLC processing unit 205 and the PDCP processing unit 206 are included in the second processing unit 122. Furthermore, the RRM processing unit 207 and an ARQ processing unit 401 (an ARQ) are included in the third processing unit 131.

That is, in the third split example that is illustrated in FIG. 4, the function of each of the MAC (the RS, the HARQ, and the SCD) and the BB function are included in the wireless apparatus 110 (the DU). Furthermore, the function of the RRM that is included in the function of the MAC is included in the second wireless control apparatus 130 (the CU-C). Furthermore, the function of the ARQ that is included in the function of the RLC is included in the second wireless control apparatus 130 (the CU-C). Furthermore, the function of generating the signal such as the SS or the RS may be included in the second wireless control apparatus 130 (the CU-C).

The ARQ processing unit 401, for example, performs ARQ processing in processing by the above-described ARQ and HARQ processing unit 208. The HARQ 402, for example, performs the HARQ processing in the processing by the above-described ARQ and HARQ processing unit 208.

The BB processing unit 203 performs the baseband reception processing on the signal that is output from the DAC and ADC 202, and outputs the signal on which the reception processing is performed, to the MAC processing unit 204. Furthermore, the BB processing unit 203 performs the baseband transmission processing on the signal that is output from the MAC processing unit 204, and outputs the signal on which the transmission processing is performed, to the DAC and ADC 202.

The MAC processing unit 204 performs the MAC reception processing on the signal that is output from the BB processing unit 203, and outputs the signal on which the reception processing is performed, to the IF processing unit 112. Furthermore, the MAC processing unit 204 performs the MAC transmission processing on the signal that is output from the IF processing unit 112, and outputs the signal on which the transmission processing is performed, to the BB processing unit 203.

The IF processing unit 112 transmits the signal that is output from the MAC processing unit 204 to the first wireless control apparatus 120 along the transfer path 101. Furthermore, the IF processing unit 112 outputs the signal that is transmitted from the first wireless control apparatus 120 along the transfer path 101, to the MAC processing unit 204.

The IF processing unit 121 outputs the signal that is transmitted from the wireless apparatus 110 along the transfer path 101, to the RLC processing unit 205. Furthermore, the IF processing unit 121 transmits the signal that is output from the RLC processing unit 205, to the wireless apparatus 110 along the transfer path 101.

In the example that is illustrated in FIG. 4, the split point of the base station signal processing is between the MAC processing unit 204 and the RLC processing unit 205, and thus, the signal that is transferred along the transfer path 101, for example, is an RLC PDU.

Furthermore, in the example that is illustrated in FIG. 4, the transfer path 101 (the interface between the CU-U and DU) and the transfer path 102 (the interface between the CU-C and CU-U) are set for the communication between the wireless base station 100 and the wireless terminal. The common logical control channel (the CCCH) and the dedicated logical control channel (the DCCH) that are transferred through the dedicated data and the wireless dedicated channel are transferred between the CU-U and the DU through the interface between the CU-U and the DU.

Pieces of information on the common logical control channel (CCCH) and the dedicated logical control channel (DCCH) are generated in the CU-C, and are transferred between the CU-C and CU-U through the interface between the CU-C and the CU-U. Furthermore, the CCCH or the DCCH itself may be transferred.

Furthermore, for example, in the DU, the logical channel multiplexing and de-multiplexing are performed on the above-described DTCH, CCCH, and DCCH. Because the L1 signaling is generated in the DU, the L1 signaling is not transferred through the interface between the CU-C and the CU-U.

As an example, in the mobile communication network in which the wireless base station 100 is applicable, the wireless base stations 100 may exist together among which the split point of the base station signal processing that is illustrated in FIGS. 2 to 4 differs. However, in the mobile communication network in which the wireless base station 100 is applicable, a plurality of wireless base stations 100, which are a portion of the wireless base stations 100 that are illustrated in FIGS. 2 to 4, may exist together. Furthermore, in the mobile communication network in which the wireless base station 100 is applicable, in the examples that are illustrated in FIGS. 2 to 4, wireless base stations 100 may exist together among which the split point of the base station signal processing differs.

For example, the split point of the base station signal processing may be between the RLC processing unit 205 and the PDCP processing unit 206.

Furthermore, in a case where it is possible that MAC processing is divided into two processing operations in conversion units of the PDU and the SDU, the MAC processing unit 204 may be divided into two MAC processing units, and the split point of the base station signal processing may be between the two MAC processing units that result from the division. In this case, as an example, the signal that is transferred along the transfer path 101 is a MAC SDU. SDU is short for Service Data Unit. It is noted that, of the two MACs that result from the division, one on the RLC side may be referred to as a higher-layer MAC (High MAC) and the other one on the BB side may be referred to as a lower-layer MAC (a Low MAC).

Furthermore, in a case where it is possible that RLC processing is divided into two processing operations in the conversion units of the PDU and the SDU, the RLC processing unit 205 may be divided into two RLC processing units, and the split point of the base station signal processing may be between the two RLC processing units that result from the division. In this case, as an example, the signal that is transferred along the transfer path 101 is an RLC SDU. It is noted that, of the two RLCs that result from the division, one on the PDCP side may be referred to as a higher-layer RLC (High RLC), and the other one on the MAC side may be referred to as a lower-layer RLC (Low RLC).

Furthermore, in a case where it is possible that PDCP processing is divided into two processing operations in the conversion units of the PDU and the SDU, the PDCP processing unit 206 may be divided into two PDCP processing units, and the split point of the base station signal processing may be between the two PDCP processing units that result from the division. In this case, as an example, the signal that is transferred along the transfer path 101 is a PDCP SDU. It is noted that, of the two PDCPs that result from the division, one on the MME or SGW side may be referred to as a higher-layer PDCP (High PDCP) and the other one on the RLC side may be a lower-layer PDCP (Low PDCP).

Furthermore, if a Radio Frequency (RF) processing unit is present between the antenna 115 and the physical layer processing unit 201, the split point of the base station signal processing may be between the RF processing unit and the physical layer processing unit 201.

Furthermore, the base station signal processing by the wireless base station 100 is not limited to the examples that are illustrated in FIGS. 2 to 4, and may be changed according to a communication scheme for the wireless base station 100. For example, the physical layer processing, the BB processing, the MAC processing, the RLC processing, and PDCP processing, as in the examples that are illustrated in FIGS. 2 to 4, are included in the base station signal processing in a 4G mobile communication network, but there is a likelihood that the base station signal processing in a 5G mobile communication network will differ from the processing. For example, the base station signal processing by the wireless base station 100 may be a plurality of processing operations that are serially performed by the wireless base station 100 on a signal which is to be transferred by the wireless base station 100, or may be processing that controls the plurality of processing operations. Specifically, for example, it is also possible that one or several functions are deleted like the case where the RLC is deleted by integrally combining the function of the RLC with the MAC and/or the PDCP, and so forth. Furthermore, it is also possible that a new function is added.

(Mobile Communication Network in which the Wireless Base Station According to the First Embodiment is Applicable)

Figure 5:
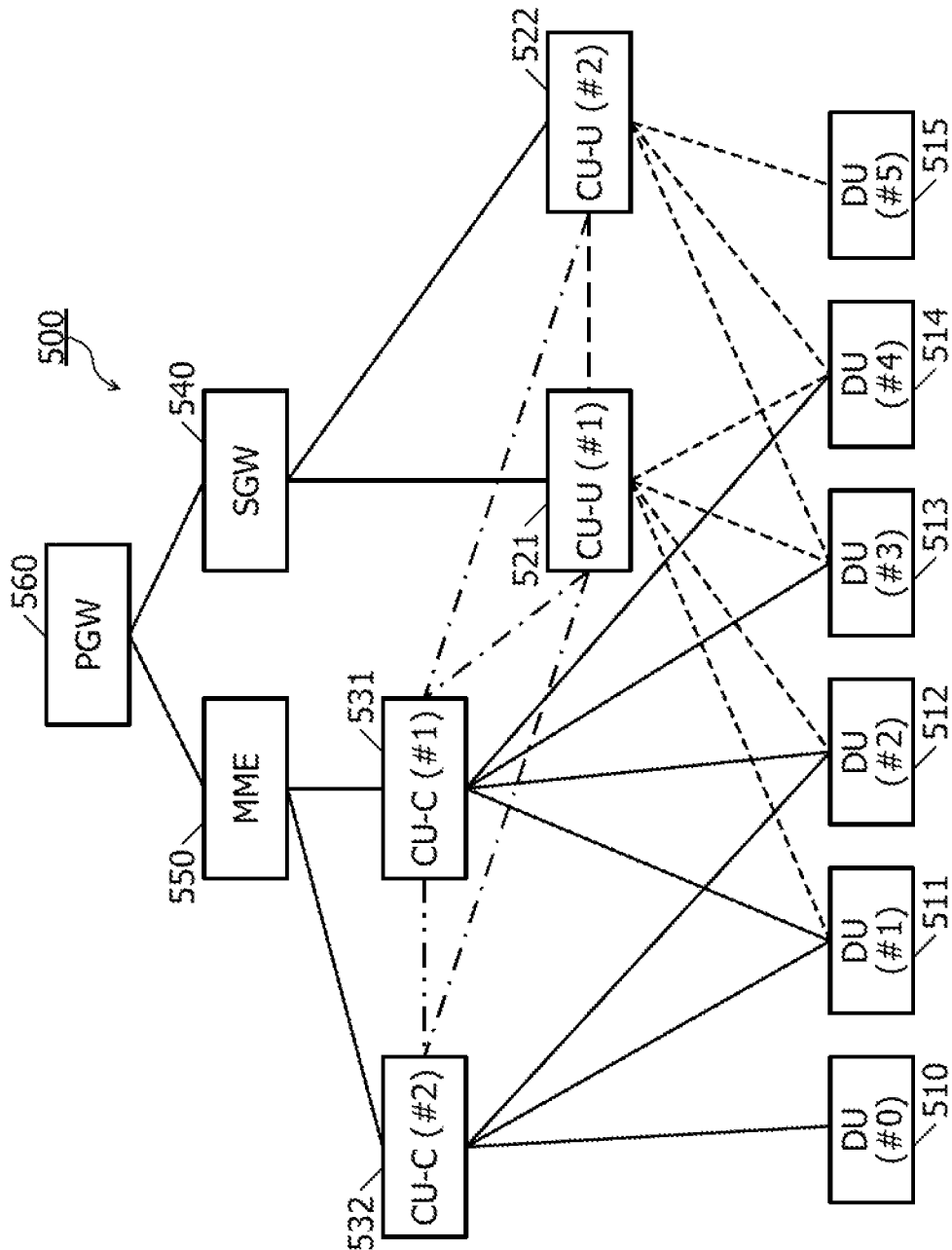
FIG. 5 is a diagram illustrating an example of a mobile communication network in which the wireless base station according to the first embodiment is applicable.

FIG. 5 is a diagram illustrating an example of a mobile communication network in which the wireless base station according to the first embodiment is applicable. The wireless base station 100 according to the first embodiment, for example, may be applicable as a mobile communication network 500 that is illustrated in FIG. 5.

In an example that is illustrated in FIG. 5, the mobile communication network 500 includes DUs 510 to 515 (#0 to #5), CU-Us 521 and 522 (#1 and #2), CU-Cs 531 and 532 (#1 and #2), an SGW 540, an MME 550, and a PGW 560. PGW is short for Packet Data Network Gateway.

Each of the DUs 510 to 515 is an apparatus that may be the wireless apparatus 110 which performs the first signal processing in the wireless base station 100. Furthermore, among the DUs 510 to 515, DUs may exist together among which the processing, which is included in the first signal processing that is to be performed, differs. That is, among the DUs 510 to 515, DUs may exist together among which the split point of the base station signal processing differs.

Each of the CU-Us 521 and 522 is an apparatus that may be the first wireless control apparatus 120 which performs the second signal processing in the wireless base station 100. Furthermore, among the CU-Us 521 and 522, CU-Us may exist together among the processing, which is included in the second signal processing that is to be performed, differs. That is, among the CU-Us 521 and 522, CU-Us may exist together among the split point of the base station signal processing differs.

Each of the CU-Cs 531 and 532 is an apparatus that may be the second wireless control apparatus 130 which performs the third signal processing in the wireless base station 100. Furthermore, each of the CU-Cs 531 and 532 is a CU-C that may correspond to a plurality of split points of the base station signal processing. That is, each of the CU-Cs 531 and 532 sets the processing that is included in the third signal processing by the CU-C itself, according to the processing that is included in the first signal processing and the second signal processing by the DU and CU-U, respectively, which are the wireless base station 100 along with the CU-U itself.

The CU-U 521 is connected to the DUs 511 to 514 through the interface between the CU-U and the DU. The CU-U 522 is connected to the DUs 513 to 515 through the interface between the CU-U and the DU. The interface between the CU-U and the DU, for example, is a transfer path that corresponds to the above-described above transfer path 101. As illustrated in FIG. 5, one or more DUs among the DUs 510 to 515 are connected to each of the CU-Us 521 and 522 through the interface between the CU-U and the DU. Furthermore, each of the DUs 510 to 515 is connected to one or more CU-Us of the CU-Us 521 and 522 through the interface between the CU-U and the DU.

The CU-C 531 is connected to the DUs 511 to 514 through the interface between the CU-C and the DU. The CU-C 532 is connected to the DUs 510 to 512 through the interface between the CU-C and the DU. The interface between the CU-C and the DU, for example, is a transfer path that corresponds to the above-described transfer path 103. As illustrated in FIG. 5, one or more DUs among the DUs 510 to 515 are connected to each of the CU-Cs 531 and 532 through the interface between the CU-U and the DU. Furthermore, each of the DUs 510 to 515 is connected to one or more CU-Cs of the CU-Cs 531 and 532 through the interface between the CU-U and the DU.

An inter-CU-U interface connects between the CU-U 521 and the CU-U 522. The interface between the CU-C and the CU-U connects between the CU-U 521 and the CU-Cs 531 and 532. The interface between the CU-C and the CU-U connects between the CU-U 522 and CU-C 531.

Each of the CU-Us 521 and 522, for example, is connected to the SGW 540 through an S1 interface. Furthermore, each of the CU-Us 521 and 522 may be connected to a plurality of SGWs. Each of the CU-Cs 531 and 532, for example, is connected to the MME 550 through the S1 interface. Furthermore, each of the CU-Cs 531 and 532 may be connected to a plurality of MMEs.

Each of the SGW 540 and the MME 550 is the apparatus that may be a higher layer apparatus for the wireless base station 100 described above. Each of the SGW 540 and the MME 550 is connected to the PGW 560. Between the PGW 560 and the CU-Us 521 and 522, a control plane signal is transferred through the MME 550, and a user plane signal is transferred through the SGW 540.

The wireless base station 100 may realize the DUs 510, 511, 512, 513, 514, or 515, or any combination thereof, as the wireless apparatus 110, at least one of the CU-Us 521 and 522 as the first wireless control apparatus 120, and the CU-Cs 531 and 532 as the second wireless control apparatus 130. Furthermore, a plurality of wireless base stations 100 may be realized by providing a plurality of combinations of one or more DUs among the DUs 510 to 515, one or more CU-Us of the CU-Us 521 and 522, and one or more CU-Cs of the CU-Cs 531 and 532.

In the example that is illustrated in FIG. 5, a configured is described in which the DUs that are included in the DUs 510 to 515 are connected in a star-shaped manner to the CU-Us 521 and 522 and the CU-Cs 531 and 532, but no limitation to this configuration is imposed. For example, a configuration may be employed in which the DUs that are included in the DUs 510 to 515 are connected in a cascade to the CU-Us 521 and 522 and the CU-Cs 531 and 532.

Furthermore, in the example that is illustrated in FIG. 5, one CU-U may be connected to a plurality of DUs. Furthermore, the plurality of DUs may be connected to one CU-C. Furthermore, a plurality of CU-Us and a plurality of CU-Cs may be connected to one DU. Accordingly, the wireless base station 100 may be realized by flexibly change a combination of the DU, the CU-U, and CU-C. Therefore, for example, in a DSA, a VC, AAA, beamforming, a CoMP and the like, it is possible that the combination with the DU is flexibly controlled. DSA is short for Distributed Antenna System. VC is short for Virtual Cell. CoMP is short for Coordinated Multiple-Point Transmission and Reception.

It is noted that in the example which is illustrated in FIG. 5, a connection to the CU-U of the DU 510 and a connection to the CU-C of the DU 515 are omitted, but, for example, the DU 510 may be connected to a CU-U that is different from the CU-Us 521 and 522. Furthermore, the DU 515 may be connected to a CU-C that is different from the CU-Cs 531 and 532.

(Processing in the Mobile Communication Network According to the First Embodiment)

Figure 6:
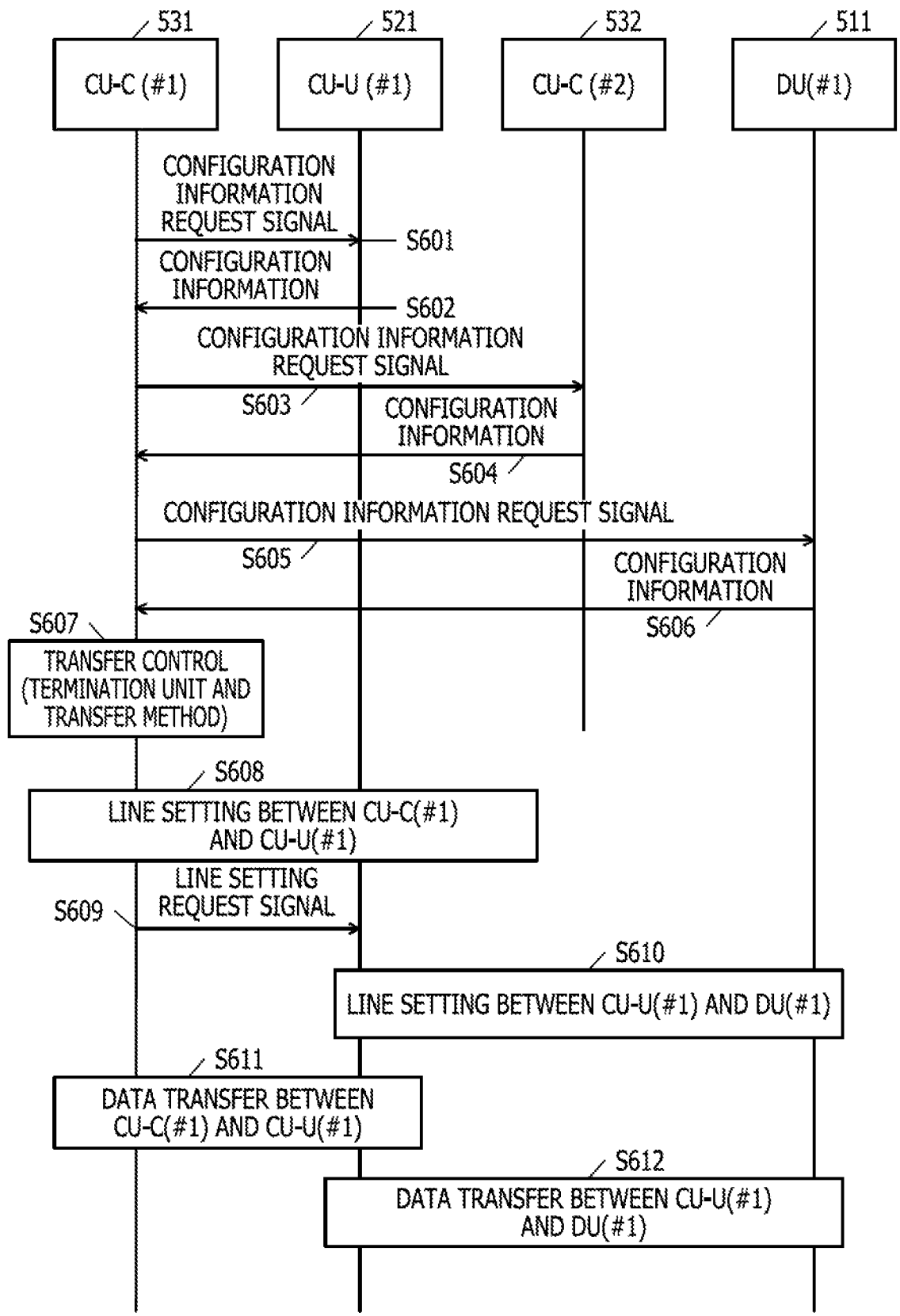
FIG. 6 is a sequence diagram illustrating an example of processing in the mobile communication network, which corresponds to the first and third split examples of the base station signal processing according to the first embodiment.

FIG. 6 is a sequence diagram illustrating an example of processing in the mobile communication network, which corresponds to the first and third split examples of the base station signal processing according to the first embodiment. A case where the wireless base station 100 is realized by the CU-Cs 531 and 532 (#1 and #2) that are illustrated in FIG. 5, the CU-U 521 (#1), and the DU 511 (#1) is described with reference to FIG. 6. In this case, for example, the wireless apparatus 110, the first wireless control apparatus 120, and the second wireless control apparatus 130 pertaining to the first split example, which are illustrated in FIG. 2, may be applicable as the DU 511, the CU-U 521, and the CU-C 531, respectively.

For example, each step that is illustrated in FIG. 6 is performed in a state where the DU 511 and the CU-U 521 are connected to the CU-C 531. First, the CU-C 531 transmits the configuration information request signal that requests the transmission of the configuration information, to the CU-U 521 (Step S601). As an example, the transmission of the configuration information request signal in Step S601 may be performed by the control unit 133 of the second wireless control apparatus 130, which is illustrated in FIG. 2, via the transfer path 102 using the IF processing unit 132. Furthermore, as an example, the configuration information request signal that is transmitted in Step S601 is received in the notification unit 124 through the IF processing unit 123 that is illustrated in FIG. 2.

Subsequently, the CU-U 521 transmits the configuration information relating to the second signal processing by the CU-U 521 itself to the CU-C 531 (Step S602). As an example, the transmission of the configuration information in Step S602 may be performed by the notification unit 124 of the first wireless control apparatus 120 via the transfer path 102 using the IF processing unit 123. Furthermore, as an example, the configuration information that is transmitted in Step S602 is received in the control unit 133 via the IF processing unit 132 that is illustrated in FIG. 2.

Subsequently, the CU-C 531 transmits the configuration information request signal that requests the transmission of the configuration information, to the CU-C 532 (Step S603). As an example, the transmission of the configuration information request signal in Step S603 may be performed through an inter-CU-C interface that is illustrated in FIG. 5. Subsequently, the CU-C 532 transmits the configuration information relating to the third signal processing by the CU-C 532 itself to the CU-C 531 (Step S604). As an example, the transmission of the configuration information in Step S604 may be performed through the inter-CU-C interface that is illustrated in FIG. 5. As Step S603 and Step S604, the configuration information may be transmitted and received between the CU-Cs.

Subsequently, the CU-C 531 transmits the configuration information request signal that requests the transmission of the configuration information, to the DU 511 (Step S605). As an example, the transmission of the configuration information request signal in Step S605 may be performed by the control unit 133 of the second wireless control apparatus 130, which is illustrated in FIG. 2, via the transfer path 103 using the IF processing unit 134. Furthermore, as an example, the configuration information request signal that is transmitted in Step S605 is received in the notification unit 114 through the IF processing unit 113 that is illustrated in FIG. 2.

Subsequently, the DU 511 transmits the configuration information relating to the first signal processing by the DU 511 itself to the CU-C 531 (Step S606). As an example, the transmission of the configuration information in Step S606 may be performed by the notification unit 114 of the wireless apparatus 110 via the transfer path 103, which is illustrated in FIG. 2, using the IF processing unit 113. Furthermore, as an example, the configuration information that is transmitted in Step S606 is received in the control unit 133 via the IF processing unit 134 that is illustrated in FIG. 2.

Subsequently, based on each of the pieces of received configuration information that are received in Step S602, S604, and S606, the CU-C 531 performs transfer control (transfer setting) between the CU-U 521 and the DU 511 (Step S607). The transfer control in Step S607 will be described below.

Subsequently, setting of a line between the CU-C 531 and the CU-U 521 is performed (Step S608). The line setting in Step S608, for example, may be performed by the second wireless control apparatus 130 performing communication with the first wireless control apparatus 120 via the transfer path 102 using the IF processing unit 132.

Subsequently, the CU-C 531 transmits a line setting request signal that requests setting of a line between the CU-U 521 and the DU 511, to the CU-U 521, using a line that is set by the line setting in Step S608 (Step S609).

Subsequently, the setting of the line between the CU-U 521 and the DU 511 is performed (Step S610). The line setting in Step S610, for example, may be performed by the first wireless control apparatus 120 performing communication with the wireless apparatus 110 via the transfer path 101 using the IF processing unit 121.

Subsequently, data transfer is performed between the CU-C 531 and the CU-U 521 (Step S611). Accordingly, it is possible that the CU-C 531 performs the third signal processing which transmits the control information relating to the second signal processing by the CU-U 521 to the CU-U 521.

Furthermore, the data transfer is performed between the CU-U 521 and the DU 511 (Step S612). Accordingly, it is possible that the CU-U 521 performs the second signal processing that is based on the control information from the CU-C 531 and performs the data transfer to and from the wireless terminal through DU 511.

Control of the third signal processing (a termination unit) by the CU-C 531, which is in the base station signal processing is included in the transfer control in Step S607. Furthermore, control of a transfer method for transferring a control signal in accordance with the processing that is included in the third signal processing by the CU-C 531, from the CU-C 531 to the CU-U 521 via the transfer path 102 may be included in the transfer control in Step S607.

Processing in a case where the wireless apparatus 110, the first wireless control apparatus 120, and the second wireless control apparatus 130 pertaining to the third split example, which are illustrated in FIG. 4, may be applicable as the DU 511, the CU-U 521, and the CU-C 531, respectively, is the same as the processing that is illustrated in FIG. 6.

Figure 7:
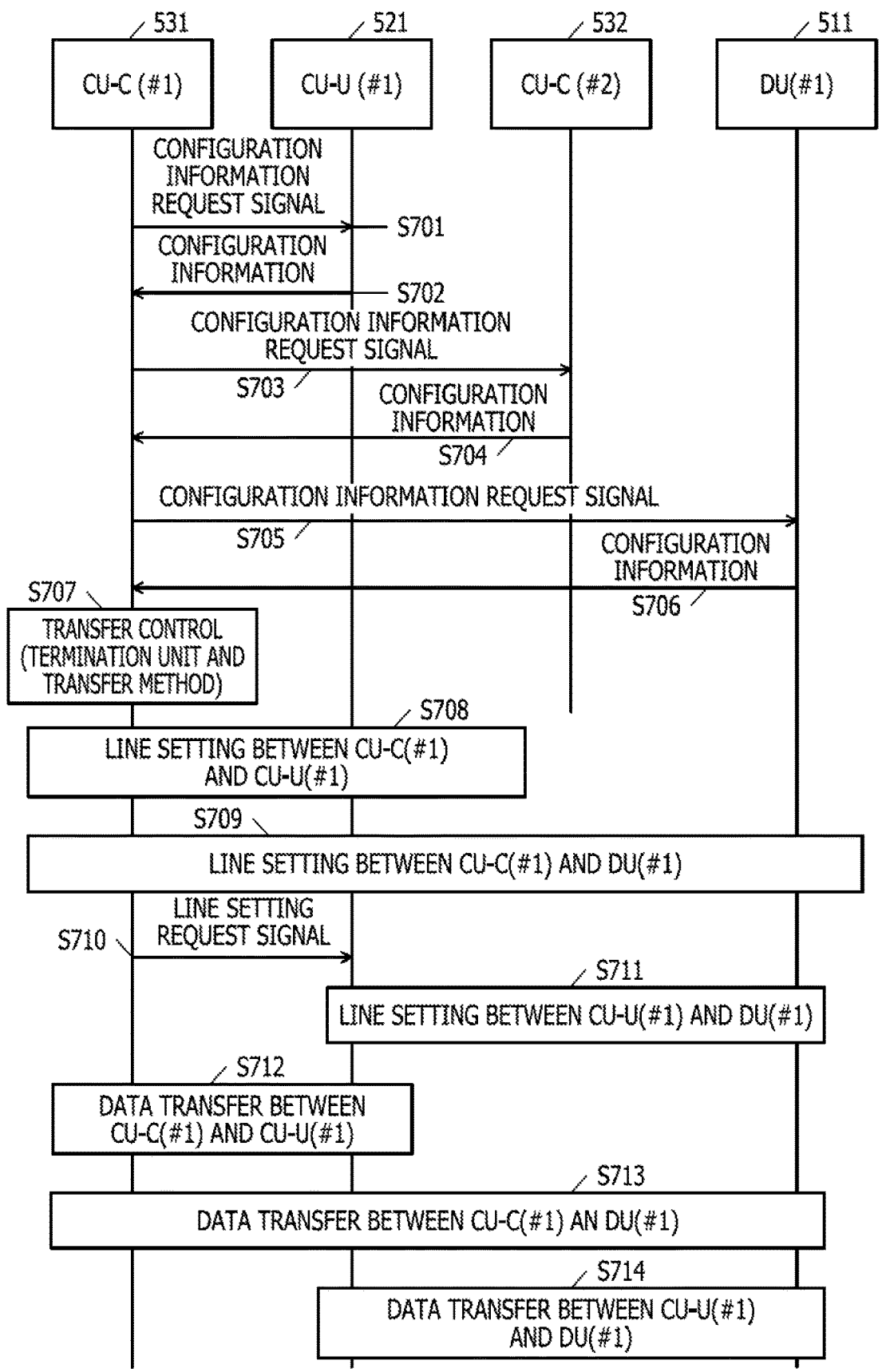
FIG. 7 is a sequence diagram illustrating an example of processing in the mobile communication network, which corresponds to the second split example of the base station signal processing according to the first embodiment.

FIG. 7 is a sequence diagram illustrating an example of processing in the mobile communication network, which corresponds to the second split example of the base station signal processing according to the first embodiment. In FIG. 7, for example, processing in a case where the wireless apparatus 110, the first wireless control apparatus 120, and the second wireless control apparatus 130 pertaining to the second split example, which are illustrated in FIG. 3, may be applicable as the DU 511, the CU-U 521, and the CU-C 531, respectively, is described.

For example, each step that is illustrated in FIG. 7 is performed in the state where the DU 511 and the CU-U 521 are connected to the CU-C 531. Steps S701 to S708 that are illustrated in FIG. 7 are the same as Steps S601 to S608, respectively, that are illustrated in FIG. 6. Subsequently to Step S708, setting of a line between the CU-C 531 and the DU 511 is performed (Step S709). The line setting in Step S709, for example, may be performed by the second wireless control apparatus 130 performing the communication with the wireless apparatus 110 via the transfer path 103 using the IF processing unit 134.

Step S710 to S711 in FIG. 7 are the same as Step S610 to S611, respectively, that are illustrated in FIG. 6. Subsequently to Step S711, the data transfer is performed between the CU-C 531 and the CU-U 521 (Step S712). Accordingly, it is possible that the CU-C 531 performs the third signal processing which transmits the control information relating to the second signal processing by the CU-U 521 to the CU-U 521.

Furthermore, the data transfer is performed between the CU-C 531 and the DU 511 (Step S713). Accordingly, it is possible that the CU-C 531 performs transfer of a signal to and from the wireless apparatus 110, which is based on the third signal processing. Furthermore, data transfer is performed between the CU-U 521 and the DU 511 (Step S714). Accordingly, it is possible that the CU-U 521 performs the second signal processing that is based on the control information from the CU-C 531 and performs the data transfer to and from the wireless terminal through DU 511.

(Format of a Signal for Transmitting the Configuration Information According to the First Embodiment)

Figure 8:
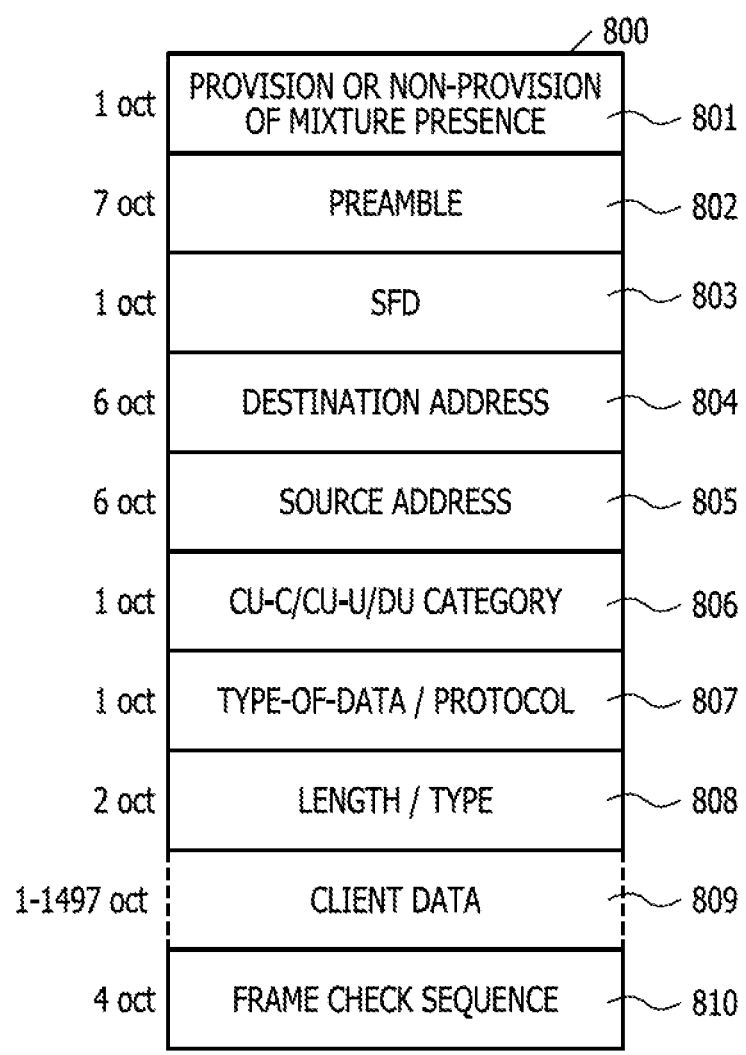
FIG. 8 is a diagram illustrating an example of a format of a signal for transmitting configuration information according to the first embodiment.

FIG. 8 is a diagram illustrating an example of a format of a signal for transmitting the configuration information according to the first embodiment. For example, a signal 800 that is illustrated in FIG. 8 is transferred via the transfer path 102 between the first wireless control apparatus 120 and the second wireless control apparatus 130. Furthermore, for example, the signal 800 that is illustrated in FIG. 8 is transferred via the transfer path 103 between the wireless apparatus 110 and the second wireless control apparatus 130.

The signal 800 includes mixture presence information 801, a preamble 802, an SFD 803, a destination address 804, a source address 805, a CU-C/CU-U/DU category 806, and type-of-data and protocol information 807. Furthermore, the signal 800 includes length/type information 808, client data 809, and a frame check sequence 810. SFD is short for Start Frame Delimiter.

The mixture presence information 801 is one-octet (oct) information indicating whether or not the mixture presence of the CU-C, the CU-U, and the DU is provided, among which the split point of the base station signal processing differs in the wireless base station 100. For example, because the CU-U and the DU may exist together among which the split point of the base station signal processing differs in the wireless base station 100 according to the present embodiment, the mixture presence information 801 is a value indicating whether or not the mixture presence is provided. However, for example, in a case where the mobile communication network is provided on the assumption that the split points of the base station signal processing may exist together, the mixture presence information 801 may be omitted from the signal 800. It is noted that the information is described as being one-octet long, but that the information may be multiple octets long and be less than one octet long (that is, less than eight bits) without being limited in an amount of information. In the following, in the same manner, the description is provided below on the assumption that no limitation is imposed on the amount of information.

The preamble 802 is a given seven-octet pattern. The SFD 803 is one-octet information indicating a starting point of a frame. The destination address 804 is six-octet information indicating an identifier of a destination of the signal 800. The source address 805 is six-octet information indicating an identifier of a transmission source of the signal 800. It is noted that the destination address 804 and the source address 805, for example, are not specified for use of the CPRI, but that the destination address 804 and the source address 805, as illustrated in FIG. 8, may be used for the signal 800.

The CU-C/CU-U/DU category 806 is one-octet information indicating a category in accordance with the split point of the base station signal processing, which corresponds to the signal 800. The split point of the base station signal processing, which corresponds to the signal 800, for example, is the split point of the base station signal processing, to which the CU-C, the CU-U, or the DU that transmits or receives the signal 800 corresponds.

The type-of-data and protocol information 807 is one-octet information indicating at least one of a type of data of the signal 800 at the time of the transfer along the transfer path and a protocol for transferring the signal 800 along the transfer path. Each of the type of data and the protocol differs with the split point of the base station signal processing, which is indicated by the CU-C/CU-U/DU category 806.

The length/type information 808 is two-octet information indicating by which one of a single hop and a multi-hop the signal 800 is transferred. The client data 809 is data that is transferred along the transfer path. The type of data of the client data 809 differs with the split point of the base station signal processing, which is indicated by the CU-C/CU-U/DU category 806. The frame check sequence 810 is four-octet redundant information for detecting an error in the signal 800. It is noted that, as is the case with the above-described cascade connection, the multi-hop is a format for performing the data transfer between a transmission source and a transmission destination through a plurality of apparatuses and the single hop is a format for performing the data transfer directly between the transmission source and the transmission destination without any other apparatus in between.

The configuration information described above, for example, may be realized by at least one of the CU-C/CU-U/DU category 806 and the type-of-data and protocol information 807. For example, in a case where the configuration information is realized by the CU-C/CU-U/DU category 806, the type-of-data and protocol information 807 may be omitted from the signal 800. Furthermore, in a case where the configuration information is realized by the type-of-data and protocol information 807, the CU-C/CU-U/DU category 806 may be omitted from the signal 800. Furthermore, in a case where the configuration information is transmitted with the signal 800, the length/type information 808 and the client data 809 may be omitted from the signal 800.

For example, the notification unit 124 of the first wireless control apparatus 120 transmits the signal 800, which is illustrated in FIG. 8, as the configuration information, to the second wireless control apparatus 130 through the IF processing unit 123. In this case, the notification unit 124 stores information indicating a CU-C category relating to the second signal processing by the first wireless control apparatus 120 itself, in the CU-C/CU-U/DU category 806. Furthermore, the notification unit 124 stores information indicating at least one of the type of data and the protocol which relate to the second signal processing by the first wireless control apparatus 120 itself in the type-of-data and protocol information 807.

Furthermore, for example, the notification unit 114 of the wireless apparatus 110 transmits the signal 800, which is illustrated in FIG. 8, as the configuration information, to the second wireless control apparatus 130 through the IF processing unit 113. In this case, the notification unit 114, for example, stores information indicating a DU category relating to the first signal processing by the wireless apparatus 110 itself, in the CU-C/CU-U/DU category 806. Alternatively, the notification unit 114 may store information indicating at least one of the type of data and the protocol which relate to the first signal processing by the wireless apparatus 110 itself, in the type-of-data and protocol information 807.

It is possible that the IF processing units 132 or 134 of the second wireless control apparatus 130 receives at least one of the CU-C/CU-U/DU category 806 and the type-of-data and protocol information 807, without depending on the split point of the base station signal processing, to which the transmission source of the received signal 800 corresponds. Furthermore, the control unit 133 acquires at least one of the CU-C/CU-U/DU category 806 and the type-of-data and protocol information 807 that are decoded in the IF processing unit 132 or 134.

Then, based on at least one of the CU-C/CU-U/DU category 806 and the type-of-data and protocol information 807, which are acquired, the control unit 133 determines the split point of the base station signal processing, which corresponds to the transmission source of the signal 800. Furthermore, based on a result of the determination, the control unit 133 performs the above-described transfer control.

Figure 9:
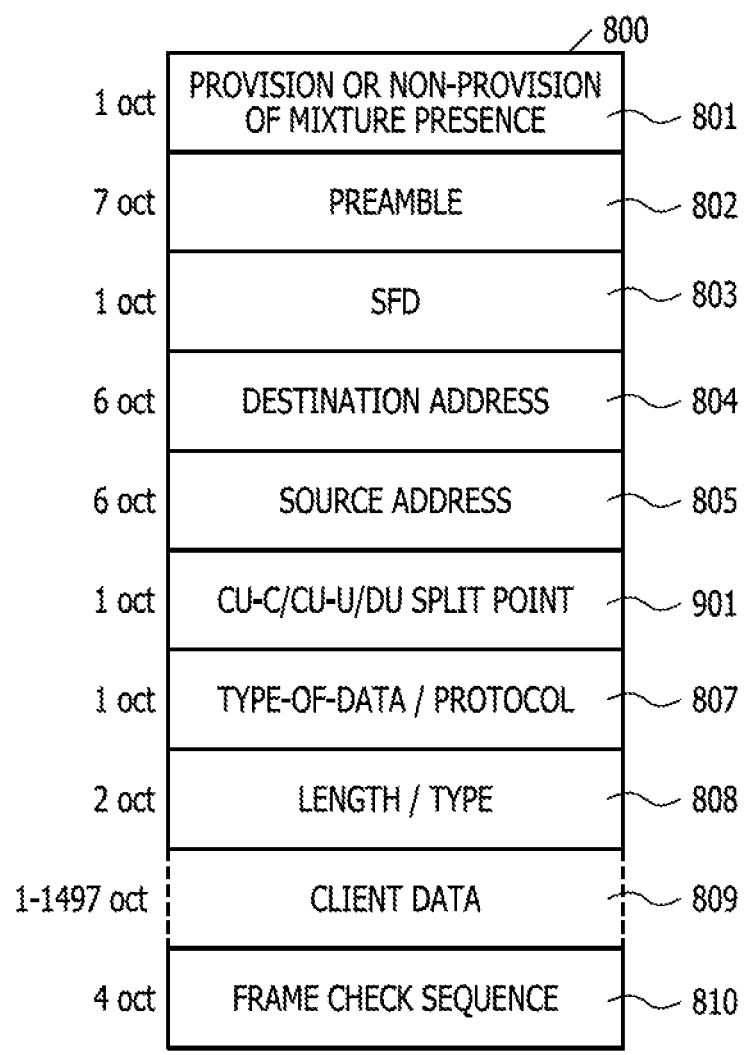
FIG. 9 is a diagram illustrating another example of the format of the signal for transmitting the configuration information according to the first embodiment.

FIG. 9 is a diagram illustrating another example of the format of the signal for transmitting the configuration information according to the first embodiment. In FIG. 9, a portion that is the same as the portion that is illustrated in FIG. 8 is given the same reference numeral and a description thereof is omitted. For example, the signal 800 that is illustrated in FIG. 9 may be transferred via the transfer path 102 between the first wireless control apparatus 120 and the second wireless control apparatus 130. Furthermore, for example, the signal 800 that is illustrated in FIG. 9 may be transferred via the transfer path 103 between the wireless apparatus 110 and the second wireless control apparatus 130.

The signal 800 that is illustrated in FIG. 9 includes a CU-C/CU-U/DU split point 901 instead of the CU-C/CU-U/DU category 806 of the signal 800 that is illustrated in FIG. 8. The CU-C/CU-U/DU split point 901 is one-octet information indicating the split point of the base station signal processing, which corresponds to the signal 800.

For example, the configuration information described above may be realized by at least one of the CU-C/CU-U/DU split point 901 and the type-of-data and protocol information 807. For example, in a case where the configuration information is realized by the CU-C/CU-U/DU split point 901, the type-of-data and protocol information 807 may be omitted from the signal 800. Furthermore, in a case where the configuration information is realized by the type-of-data and protocol information 807, the CU-C/CU-U/DU split point 901 may be omitted from the signal 800. Furthermore, in the case where the configuration information is transmitted with the signal 800, the length/type information 808 and the client data 809 may be omitted from the signal 800.

For example, the notification unit 124 of the first wireless control apparatus 120 transmits the signal 800, which is illustrated in FIG. 9, as the configuration information, to the second wireless control apparatus 130 through the IF processing unit 123. In this case, for example, the notification unit 124 stores the information indicating the CU-C category relating to the second signal processing by the first wireless control apparatus 120 itself, in the CU-C/CU-U/DU split point 901. Alternatively, the notification unit 124 may store information indicating at least one of the type of data and the protocol which relate to the second signal processing by the first wireless control apparatus 120 itself in the type-of-data and protocol information 807.

Furthermore, for example, the notification unit 114 of the wireless apparatus 110 transmits the signal 800, which is illustrated in FIG. 9, as the configuration information, to the second wireless control apparatus 130 through the IF processing unit 113. In this case, for example, the notification unit 114 stores the information indicating the DU category relating to the first signal processing by the wireless apparatus 110 itself, in the CU-C/CU-U/DU split point 901. Alternatively, the notification unit 114 may store the information indicating at least one of the type of data and the protocol which relate to the first signal processing by the wireless apparatus 110 itself, in the type-of-data and protocol information 807.

It is possible that the IF processing units 132 or 134 receives at least one of the CU-C/CU-U/DU split point 901 and the type-of-data and protocol information 807, without depending on the split point of the base station signal processing, to which the transmission source of the received signal 800 corresponds. Furthermore, the control unit 133 acquires at least one of the CU-C/CU-U/DU split point 901 and the type-of-data and protocol information 807, which is decoded in the IF processing unit 132 or 134.

Then, based on at least one of the CU-C/CU-U/DU split point 901 and the type-of-data and protocol information 807, which are acquired, the control unit 133 determines the split point of the base station signal processing, which corresponds to the transmission source of the signal 800. Furthermore, based on a result of the determination, the control unit 133 performs the above-described transfer control.

(DU Category in Accordance with Every Split Point of the Base Station Signal Processing According to the First Embodiment)

FIG. 10 is a diagram illustrating an example of the DU category in accordance without every split point of the base station signal processing according to the first embodiment. A table 1000 that is illustrated in FIG. 10 indicates the DU category in accordance with the split point of the base station signal processing, which is defined in the mobile communication network in which the wireless base station 100 is applicable. DU categories 1 to 8 correspond to split points 8 to 1, respectively.

A type of transfer data in the table 1000 is a type of data in accordance with the split point of the base station signal processing, and is a type of data of a signal that is transferred through the interface between the CU-U and the DU. In an example that is illustrated in FIG. 10, types of transfer data include analog IQ data, digital IQ data, MAC PDU, MAC SDU, RLC PDU, RLC SDU, PDCP PDU, and PDCP SDU.

A protocol in the table 1000 is a protocol in accordance with the split point of the base station signal processing, and is a protocol for transfer of a signal, which is performed through the interface between the CU-U and the DU. In the example that is illustrated in FIG. 10, protocols include CPRI and P1 to P7. Each of P1 to P7, for example, is a protocol that is newly defined according to the split point of the base station signal processing.

A function in the table 1000 is a function (processing) that is included in the first signal processing by the DU, which is in accordance with the split point. In the example that is illustrated in FIG. 10, processing by each of the RF, the Phy, the BB, the MAC, the RLC, and the PDCP is included in the base station signal processing by the wireless base station 100.

The split point 8 that corresponds to the DU category 1 is a split point at which that the split of the base station signal processing takes place between the RF and the Phy. At the split point 8, the processing by the RF is included in the first signal processing by the DU. Therefore, at the split point 8, the processing by each of the Phy, the BB, the MAC, the RLC, and the PDCP is included in the second signal processing by the CU-U. Furthermore, at the split point 8, the analog IQ data is transferred using the CPRI through the interface between the CU-U and the DU.

The split point 7 that corresponds to the DU category 2 is a split point at which the split of the base station signal processing takes place between the Phy and the BB. At the split point 7, the processing by each of the RF and the Phy is included in the first signal processing by the DU. Therefore, at the split point 7, the processing by each of the BB, the MAC, the RLC, and the PDCP is included in the second signal processing by the CU-U. Furthermore, at the split point 7, the digital IQ data is transferred using P1 through the interface between the CU-U and the DU.

The split point 6 that corresponds to the DU category 3 is a split point at which the split of the base station signal processing takes place between the BB and the MAC, and for example, is a split point that is illustrated in FIG. 3. At the split point 6, the processing by each of the RF, the Phy, and the BB is included in the first signal processing by the DU. Therefore, at the split point 6, the processing by each of the MAC, the RLC, and the PDCP is included in the second signal processing by the CU-U. Furthermore, at the split point 6, the MAC PDU is transferred using P2 through the interface between the CU-U and the DU.

The split point 5 that corresponds to the DU category 4 is a split point at which the split of the base station signal processing takes place in the middle of the MAC (for example, in the middle between the conversion units of the PDU and the SDU). At the split point 5, the processing by each of the RF, the Phy, and the BB, and the processing by one portion (for example, the Low-MAC) of the MAC are included in the first signal processing by the DU. Therefore, at the split point 5, the processing by one portion (for example, the High-MAC) of the MAC and the processing by each of the RLC and PDCP are included in the second signal processing by the CU-U. Furthermore, at the split point 5, the MAC SDU is transferred using P3 through the interface between the CU-U and the DU.

The split point 4 that corresponds to the DU category 5 is a split point at which the split of the base station signal processing takes place between the MAC and the RLC, and for example, is a split point that is illustrated in FIG. 4. At the split point 4, the processing by each of the RF, the Phy, the BB, and MAC is included in the first signal processing by the DU. Therefore, at the split point 4, the processing by each of the RLC and the PDCP is included in the second signal processing by the CU-U. Furthermore, at the split point 4, the RLC PDU is transferred using P4 through the interface between the CU-U and the DU.

The split point 3 that corresponds to the DU category 6 is a split point at which the split of the base station signal processing takes place in the middle of the RLC (for example, in the middle between the conversion units of the PDU and the SDU). At the split point 3, the processing by each of the RF, the Phy, the BB, and the MAC, and the processing by one portion (for example, the RLC) of the RLC are included in the first signal processing by the DU. Therefore, at the split point 3, the processing by one portion (for example, the High-RLC) of the RLC, and the processing by the PDCP are included in the second signal processing by the CU-U. Furthermore, at the split point 3, the RLC SDU is transferred using P5 through the interface between the CU-U and the DU.

The split point 2 that corresponds to the DU category 7 is a split point at which the split of the base station signal processing takes place between the RLC and the PDCP, and for example, is a split point that is illustrated in FIG. 6. At the split point 2, the processing by each of the RF, the Phy, the BB, the MAC, the RLC is included in the first signal processing by the DU. Therefore, at the split point 2, the processing by the PDCP is included in the second signal processing by the CU-U. Furthermore, at the split point 2, the PDCP PDU is transferred using P6 through the interface between the CU-U and the DU.

The split point 1 that corresponds to the DU category 8 is a split point at which the split of the base station signal processing takes place in the middle of the PDCP (for example, in the middle between the conversion units of the PDU and the SDU). At the split point 1, the processing by each of the RF, the Phy, the BB, the MAC and the RLC, and the processing by one portion (for example, the Low-PDCP) of the PDCP are included in the first signal processing by the DU. Therefore, at the split point 1, the processing by one portion (for example, the High-PDCP) of the PDCP is included in the second signal processing by the CU-U. Furthermore, at the split point 1, the PDCP SDU is transferred using P7 through the interface between the CU-U and the DU.

For example, the wireless apparatus 110 that is illustrated in FIG. 2 transmits at least one of DU category=1 and split point=8, as the configuration information, to the second wireless control apparatus 130. Accordingly, the second wireless control apparatus 130 determines that the wireless apparatus 110 employs a configuration that corresponds to the split point 8, and performs setting that performs the processing by each of the RRM, the ARQ and HARQ, the RA, and the SCD in the third processing unit 131 of the second wireless control apparatus 130 itself.

Furthermore, the wireless apparatus 110 that is illustrated in FIG. 3, for example, transmits at least one of DU category=3 and split point=6, as the configuration information, to the second wireless control apparatus 130. Accordingly, the second wireless control apparatus 130 determines that the wireless apparatus 110 employs a configuration that corresponds to the split point 6, and performs the setting that performs the processing by each of the RRM, the ARQ and HARQ, the RA, and the SCD in the third processing unit 131 of the second wireless control apparatus 130 itself. Furthermore, the second wireless control apparatus 130 performs setting for transferring a signal to and from the wireless apparatus 110 via the transfer path 103.

Furthermore, the wireless apparatus 110 that is illustrated in FIG. 4, for example, transmits at least one of DU category=5 and split point=4, as the configuration information, to the second wireless control apparatus 130. Accordingly, the second wireless control apparatus 130 determines that the wireless apparatus 110 employs a configuration that corresponds to the split point 4, and performs setting that performs the processing by each of the RRM and the ARQ in the third processing unit 131 of the second wireless control apparatus 130 itself.

However, the DU category in accordance with every split point of the base station signal processing is not limited to an example that is indicated in the table 1000. For example, the table 1000 is an example that is based on a candidate for the split point of the base station signal processing, which is specified in 3GPP TR38.801 V0.2.0 6.1.2.1. 3GPP is short for 3rd Generation Partnership Project. For example, it is possible that definitions of the split point itself, the DU category, the type of transfer data, the protocol, and the function variously change according to a mobile communication system to which the split point itself, the DU category, the type of transfer data, the protocol, and the function are actually applied.

Furthermore, in an example that is illustrated in FIG. 10, the type of transfer data and the protocol for the interface between the CU-U and the DU are defined, but the type of transfer data and the protocol for the interface between the CU-C and the DU in the table 1000 may be defined. In this case, the wireless apparatus 110 may transmit at least one of the type of transfer data and the protocol that are in accordance with the split point for the wireless apparatus 110 itself, as the configuration information, to the second wireless control apparatus 130.

(CU Category in Accordance with Every Split Point of the Base Station Signal Processing According to the First Embodiment)

FIG. 11 is a diagram illustrating an example of the CU category in accordance with every split point of the base station signal processing according to the first embodiment. A table 1100 that is illustrated in FIG. 11 indicates the CU category of the split point of the base station signal processing, which is defined in the mobile communication network in which the wireless base station 100 is applicable. CU categories 0 to 8 correspond to the absence (minus) of a split point and split points 8 to 1, respectively. The absence of the split point is a configuration that is realized by one apparatus without splitting the function of the CU into the CU-C and the CU-U.

The type of transfer data (between the CU-C and the CU-U) in the table 1100 is a type of data in accordance with the split point of the base station signal processing, and is a type of data of signal that is transferred through the above-described interface between the CU-C and the CU-U. In an example that is illustrated in FIG. 11, the types of transfer data (between the CU-C and the CU-U) include the absence (minus) of the transfer signal, RRC and DCI and/or UCI, RRC and MAC CE, and RRC.

RRC is short for Radio Resource Control. The DCI and/or the UCI, for example, indicate at least one of the DCI and the UCI.

The type of transfer data (between the CU-C and the DU) in the table 1100 is a type of data in accordance with the split point of the base station signal processing, and is a type of data of signal that is transferred through the above-described interface between the CU-C and the DU. In an example that is illustrated in FIG. 11, the types of transfer data (between the CU-C and the DU) include the absence (minus) of the transfer signal, DCI and/or UCI, MAC CE, and RRC.

The type of transfer data (between the CU-U and the DU) in the table 1100 is a type of data in accordance with the split point of the base station signal processing, and is a type of data of signal that is transferred through the above-described interface between the CU-U and the DU. In the example that is illustrated in FIG. 11, types of transfer data (between the CU-U and the DU) include the absence (minus) of the transfer signal, analog IQ data, digital IQ data, MAC PDU, MAC SDU, RLC PDU, RLC SDU, PDCP PDU, and PDCP SDU.

Furthermore, the types of transfer data (between the CU-C and the CU-U) at the split point 7 and 8 may not include the MAC CE. At the split points 1 to 4, the transfer path may differ from one function of the RRC to another. For example, the transfer path in a case where the function of the RRC is a function associated with control of the RLC may be through the interface between the CU-C and the CU-U, and the transfer path in a case where the function of the RRC is a function other than the control of the RLC, may be through the interface between the CU-C and the DU interface.

A protocol (between the CU-C and the CU-U) in the table 1100 is a protocol in accordance with the split point of the base station signal processing, and is a protocol for transfer of a signal, which is performed through the above-described interface between the CU-C and the CU-U. In the example that is illustrated in FIG. 11, protocols (between the CU-C and the CU-U) include the absence (minus) of the transfer signal and PU1 to PU8. Each of PU1 to P8, for example, is a protocol for the interface between the CU-C and the CU-U, which is newly defined according to the split point of the base station signal processing.

A protocol (between the CU-C and the DU) in the table 1100 is a protocol in accordance with the split point of the base station signal processing, and is a protocol for transfer of a signal, which is performed through the above-described interface between the CU-C and the DU. In the example that is illustrated in FIG. 11, protocols (between the CU-C and the DU) include the absence (minus) of the transfer signal and PD1 to PD6. Each of PD1 to PD6, for example, is a protocol for the interface between the CU-C and the DU, which is newly defined according to the split point of the base station signal processing.

A protocol (between the CU-U and the DU) in the table 1100 is a protocol in accordance with the split point of the base station signal processing, and is a protocol for transfer of a signal, which is performed through the above-described interface between the CU-U and the DU. In the example that is illustrated in FIG. 11, protocols (between the CU-U and the DU) include the absence (minus) of the transfer signal, the CPRI, and P1 to P7. Each of P1 to P7, for example, is a protocol for the interface between the CU-U and the DU, which is newly defined according to the split point of the base station signal processing.

Furthermore, in the table 1100, for every split point of the base station signal processing, processing that is included in the first signal processing by the first wireless control apparatus 120 or the third signal processing by the second wireless control apparatus 130 may be defined.

For example, the first wireless control apparatus 120 that is illustrated in FIG. 2, for example, transmits CU category=1, split point=8, type of transfer data=RRC, DCI/UCI, protocol=PU1, or any combination thereof, as the configuration information, to the second wireless control apparatus 130. Accordingly, the second wireless control apparatus 130 determines that the first wireless control apparatus 120 employs a configuration that corresponds to the split point 8, and performs the setting that performs the processing by each of the RRM, the ARQ and HARQ, the RA, and the SCD in the third processing unit 131 of the second wireless control apparatus 130 itself. Furthermore, the second wireless control apparatus 130 performs setting for transferring the RRC and the DCI and/or UCI to and from the first wireless control apparatus 120 via the transfer path 102 using a protocol that is PU1.

Furthermore, the first wireless control apparatus 120 that is illustrated in FIG. 3, for example, transmits CU category=3, split point=6, type of transfer data=RRC, MAC CE, protocol=PU3, or any combination thereof, as the configuration information, to the second wireless control apparatus 130. Accordingly, the second wireless control apparatus 130 determines that the first wireless control apparatus 120 employs a configuration that corresponds to the split point 6, and performs the setting that performs the processing by each of the RRM, the ARQ and HARQ, the RA, and the SCD in the third processing unit 131 of the second wireless control apparatus 130 itself. Furthermore, the second wireless control apparatus 130 performs setting for transferring the RRC and the MAC CE to and from the first wireless control apparatus 120 via the transfer path 102 using a protocol that is PU3.

Furthermore, the first wireless control apparatus 120 that is illustrated in FIG. 4, for example, transmits CU category=5, split point=4, type of transfer data=RRC, protocol=PU5, or any combination thereof, as the configuration information, to the second wireless control apparatus 130. Accordingly, the second wireless control apparatus 130 determines that the first wireless control apparatus 120 employs a configuration that corresponds to the split point 4, and performs the setting that performs the processing by each of the RRM and the ARQ in the third processing unit 131 of the second wireless control apparatus 130 itself. Furthermore, the second wireless control apparatus 130 performs setting for transferring the RRC to and from the first wireless control apparatus 120 via the transfer path 102 using a protocol that is PU5.

However, the CU category in accordance with every split point of the base station signal processing is not limited to an example that is indicated in the table 1100. For example, the table 1100 is an example that is based on a candidate for the split point of the base station signal processing, which is specified in 3GPP TR38.801 V0.2.0 6.1.2.1. 3GPP is short for 3rd Generation Partnership Project. For example, it is possible that definitions of the split point itself, the CU category, the type of transfer data, the protocol, and the function variously change according to the mobile communication system to which the split point itself, the DU category, the type of transfer data, the protocol, and the function are actually applied.

(Hardware Configuration of the Wireless Apparatus According to the First Embodiment)

Figure 12:
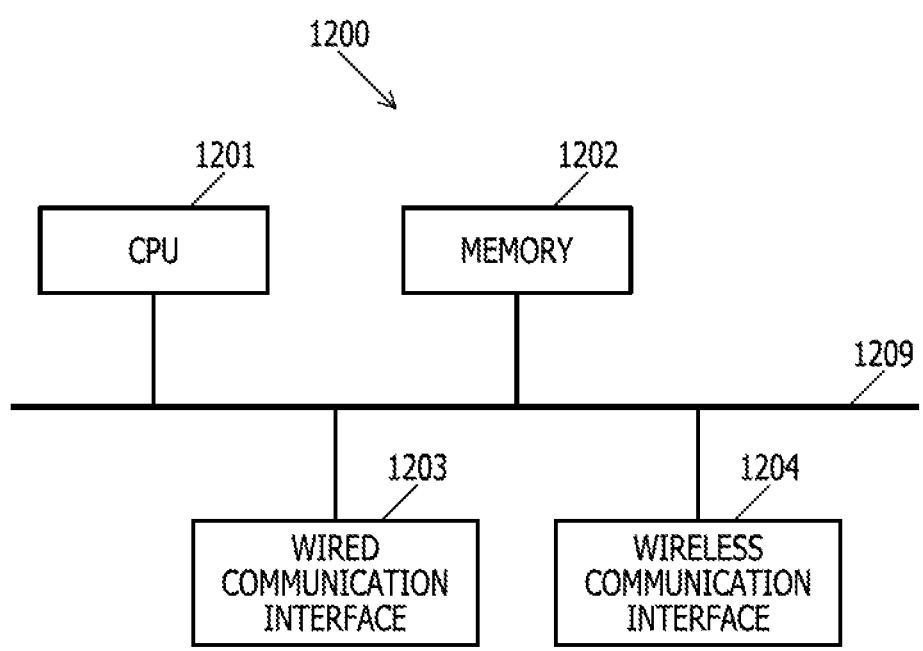
FIG. 12 is a diagram illustrating an example of a hardware configuration of a wireless apparatus to the first embodiment.

FIG. 12 is a diagram illustrating an example of a hardware configuration of the wireless apparatus to the first embodiment. The wireless apparatus 110 described above, for example, may be realized by a communication apparatus 1200 that is illustrated in FIG. 12. The communication apparatus 1200 includes a CPU 1201, a memory 1202, a wired communication interface 1203, and a wireless communication interface 1204. The CPU 1201, the memory 1202, the wired communication interface 1203, and the wireless communication interface 1204 are connected to each other with a bus 1209. CPU is short for Central Processing Unit.

The CPU 1201 manages control of the entire communication apparatus 1200. The memories 1202, for example, include a main memory and an auxiliary memory. The main memory is, for example, a Random Access Memory (RAM). The main memory is used as a work area for the CPU 1201. The auxiliary memory is, for example, a nonvolatile memory, such as a magnetic disk, an optical disk, or a flash memory. Various programs that cause the communication apparatus 1200 to operate are stored in the auxiliary memory. The program that is stored in the auxiliary memory is loaded onto the main memory and is executed by the CPU 1201.

The wireless communication interface 1204 is a communication interface that performs communication with the outside (for example, the wireless terminal) of the communication apparatus 1200 in a wireless manner. The wireless communication interface 1204 is controlled by the CPU 1201.

The wired communication interface 1203 is a communication interface that performs communication with any other apparatus (for example, the first wireless control apparatus 120 or the second wireless control apparatus 130) in the wireless base station 100 in a wired manner. The wired communication interface 1203 is controlled by the CPU 1201.

The antenna 115 that is illustrated in FIG. 1, for example, is included in the wireless communication interface 1204. The first processing unit 111 that is illustrated in FIG. 1, for example, may be realized by at least one of the CPU 1201 and the wireless communication interface 1204. The IF processing units 112 and 113 that are illustrated in FIG. 1, for example, may be realized by the wired communication interface 1203. The notification unit 114 that is illustrated in FIG. 1, for example, may be realized by at least one of the CPU 1201 and the wired communication interface 1203.

Furthermore, the hardware configuration of the wireless apparatus 110 is not limited to a hardware configuration that is illustrated in FIG. 12. For example, a configuration that corresponds to the CPU 1201 or the memory 1202 may be realized using a Field Programmable Gate Array (FPGA), a Digital Signal Processor (DSP), and the like.

(Hardware Configuration of the Wireless Control Apparatus According to the First Embodiment)

Figure 13:
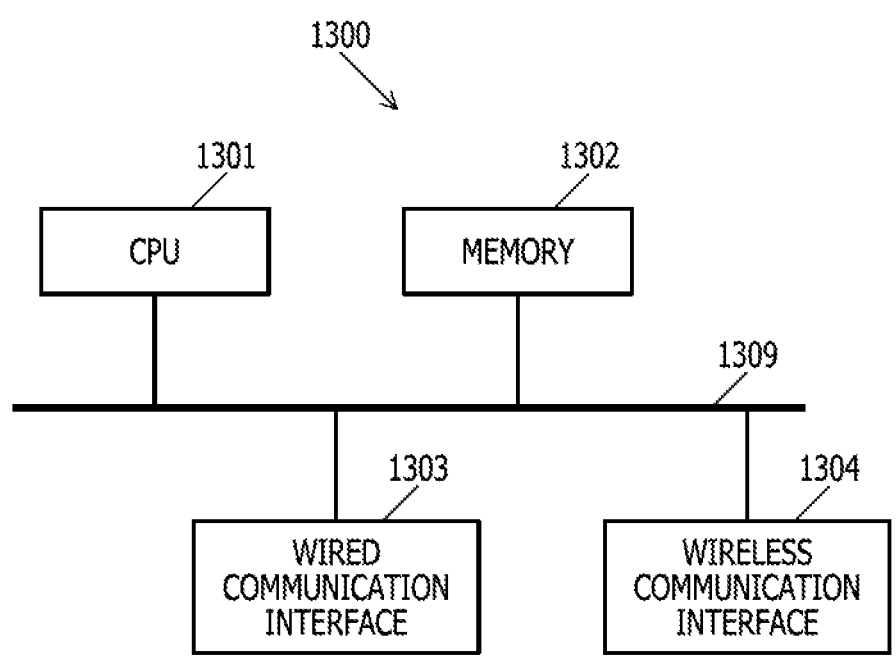
FIG. 13 is a diagram illustrating an example of a hardware configuration of a wireless control apparatus according to the first embodiment.

FIG. 13 is a diagram illustrating an example of a hardware configuration of the wireless control apparatus to the first embodiment. Each of the first wireless control apparatus 120 and the second wireless control apparatus 130, which are described above, for example, may be realized by an information processing apparatus 1300 that is illustrated in FIG. 13. The information processing apparatus 1300 includes a CPU 1301, a memory 1302, and wired communication interfaces 1303 and 1304. The CPU 1301, the memory 1302, and the wired communication interfaces 1303 and 1304 are connected to each other with a bus 1309.

The CPU 1301 controls the entire information processing apparatus 1300. The memories 1302, for example, include a main memory and an auxiliary memory. The main memory is, for example, a RAM. The main memory is used as a work area for the CPU 1301. The auxiliary memory is, for example, a nonvolatile memory, such as a magnetic disk, an optical disk, or a flash memory. Various programs that cause the information processing apparatus 1300 to operate are stored in the auxiliary memory. The program that is stored in the auxiliary memory is loaded onto the main memory and is executed by the CPU 1301.

The wired communication interface 1303 is a communication interface that performs communication with any other apparatus (for example, the wireless apparatus 110 or an apparatus other than the information processing apparatus 1300 itself, of the first wireless control apparatus 120 and the second wireless control apparatus 130) in the wireless base station 100 in a wired manner. The wired communication interface 1304 is a communication interface for performing communication with a higher layer apparatus for the wireless base station 100, in a wired manner. Each of the wired communication interfaces 1303 and 1304 is controlled by the CPU 1301.

The IF processing units 121 and 123 that are illustrated in FIG. 1, for example, may be realized by the wired communication interface 1303. Each of the second processing unit 122 and the notification unit 124 that illustrated in FIG. 1, for example, may be realized by at least one of the CPU 1301 and the wired communication interface 1303. Furthermore, transfer of a signal between the second processing unit 122 and a higher layer apparatus for the wireless base station 100, for example, may be performed through the wired communication interface 1304.

The IF processing units 132 and 134 that illustrated in FIG. 1, for example, may be realized by a wired communication interface 1303. Each of the third processing unit 131 and the control unit 133 that illustrated in FIG. 1, for example, may be realized by at least one of the CPU 1301 and the wired communication interface 1303. Furthermore, transfer of a signal between the third processing unit 131 and a higher layer apparatus for the wireless base station 100, for example, may be performed by the wired communication interface 1304.

Furthermore, a hardware configuration of the first wireless control apparatus 120 is not limited to a hardware configuration that is illustrated in FIG. 13. For example, a configuration that corresponds to the CPU 1301 or the memory 1302 may be realized using an FPGA, a DSP, or the like.

In this manner, according to the first embodiment, for example, the first wireless control apparatus 120 may notify the second wireless control apparatus 130 of the configuration information relating to the second signal processing by the first wireless control apparatus 120, which is in the base station signal processing.

Accordingly, for example, based on the notified configuration information, the second wireless control apparatus 130 may perform control of the third signal processing by the second wireless control apparatus 130, which is in the base station signal processing. Alternatively, based on the notified configuration information, the second wireless control apparatus 130 may perform control of a transfer method for transferring a signal to and from the first wireless control apparatus 120. For example, at least one of control of a protocol for transferring a signal and control of a type of data of signal that is to be transferred is included in the control of the transfer method. Alternatively, based on the notified configuration information, the second wireless control apparatus 130 may perform the control of the third signal processing by the second wireless control apparatus 130, which is in the base station signal processing, and the control of the transfer method for transferring a signal to and from the first wireless control apparatus 120.

For this reason, for example, although the split point of the base station signal processing differs with the first wireless control apparatus 120, a signal may be transferred between the first wireless control apparatus 120 and the second wireless control apparatus 130. Furthermore, the first wireless control apparatus 120 and the second wireless control apparatus 130 may perform the second signal processing and the third signal processing, respectively. For this reason, it is possible that a plurality of split points of the base station signal processing may exist together.

Furthermore, a configuration is described in which the first wireless control apparatus 120 notifies the second wireless control apparatus 130 of the configuration information of the first wireless control apparatus 120, but a configuration may be employed in which the second wireless control apparatus 130 notifies the first wireless control apparatus 120 of the configuration information of the second wireless control apparatus 130. That is, a notification unit that notifies the first wireless control apparatus 120 of the configuration information relating to the third signal processing by the second wireless control apparatus 130, which is in the base station signal processing may be provided in the second wireless control apparatus 130.

Accordingly, for example, based on the notified configuration information, the first wireless control apparatus 120 may perform control of the second signal processing by the first wireless control apparatus 120, which is in the base station signal processing. Alternatively, based on the notified configuration information, the first wireless control apparatus 120 may perform control of a transfer method for transferring a signal to and from the second wireless control apparatus 130. Alternatively, based on the notified configuration information, the first wireless control apparatus 120 may perform the control of the second signal processing by the first wireless control apparatus 120, which is in the base station signal processing, and the control of the transfer method for transferring a signal to and from the second wireless control apparatus 130.

For this reason, for example, although the split point of the base station signal processing differs with the second wireless control apparatus 130, a signal may be transferred between the first wireless control apparatus 120 and the second wireless control apparatus 130. Furthermore, the first wireless control apparatus 120 and the second wireless control apparatus 130 may perform the second signal processing and the third signal processing, respectively. For this reason, it is possible that a plurality of split points of the base station signal processing may exist together.

A method in which the second wireless control apparatus 130 notifies the first wireless control apparatus 120 of the configuration information is the same as a method in which the above-described first wireless control apparatus 120 notifies the second wireless control apparatus 130 of the configuration information. Furthermore, control by the first wireless control apparatus 120, which is abed on the configuration information that is notified by the second wireless control apparatus 130, is the same as control by the second wireless control apparatus 130, which is based on the configuration information that is notified by the above-described first wireless control apparatus 120.

Furthermore, these configurations may be combined. That is, a configuration may be employed in which the first wireless control apparatus 120 notifies the second wireless control apparatus 130 of the configuration information of the first wireless control apparatus 120 and in which the second wireless control apparatus 130 notifies the first wireless control apparatus 120 of the configuration information of the second wireless control apparatus 130.

Furthermore, in the first embodiment, the wireless apparatus 110 may notify the second wireless control apparatus 130 of the configuration information relating to the first signal processing by of the wireless apparatus 110, which is in the base station signal processing.

Accordingly, for example, based on the notified configuration information, the second wireless control apparatus 130 may perform the control of the third signal processing by the second wireless control apparatus 130, which is in the base station signal processing. Alternatively, based on the notified configuration information, the second wireless control apparatus 130 may perform control of a transfer method for transferring a signal to and from the wireless apparatus 110. For example, at least one of the control of the protocol for transferring a signal and the control of the type of data of signal that is to be transferred is included in the control of the transfer method. Alternatively, based on the notified configuration information, the second wireless control apparatus 130 may perform the control of the third signal processing by the second wireless control apparatus 130, which is in the base station signal processing, and the control of the transfer method for transferring a signal to and from the wireless apparatus 110.

For this reason, for example, although the split point of the base station signal processing differs with the wireless apparatus 110, a signal may be transferred between the wireless apparatus 110 and the second wireless control apparatus 130. Furthermore, the wireless apparatus 110 and the second wireless control apparatus 130 may perform the first signal processing and the third signal processing, respectively. For this reason, it is possible that a plurality of split points of the base station signal processing may exist together.

Furthermore, a configuration is described in which the wireless apparatus 110 notifies the second wireless control apparatus 130 of the configuration information of the wireless apparatus 110, but a configuration may be employed in which the second wireless control apparatus 130 notifies the wireless apparatus 110 of the configuration information of the second wireless control apparatus 130. That is, a notification unit (for example, the notification unit 135 in FIGS. 1 and 14) that notifies the wireless apparatus 110 of the configuration information relating to the third signal processing by the second wireless control apparatus 130 which is in the base station signal processing may be provided in the second wireless control apparatus 130.

Accordingly, for example, based on the notified configuration information, the wireless apparatus 110 may perform control of the first signal processing by the wireless apparatus 110, which is in the base station signal processing. Alternatively, based on the notified configuration information, the wireless apparatus 110 may perform the control of a transfer method for transferring a signal to and from the second wireless control apparatus 130. Alternatively, based on the notified configuration information, the wireless apparatus 110 may perform the control of the first signal processing by the wireless apparatus 110, which is in the base station signal processing, and the control of the transfer method for transferring a signal to and from the second wireless control apparatus 130.

For this reason, for example, although the split point of the base station signal processing differs with the second wireless control apparatus 130, a signal may be transferred between the wireless apparatus 110 and the second wireless control apparatus 130. Furthermore, the wireless apparatus 110 and the second wireless control apparatus 130 may perform the first signal processing and the third signal processing, respectively. For this reason, it is possible that a plurality of split points of the base station signal processing may exist together.

A method in which the second wireless control apparatus 130 notifies the wireless apparatus 110 of the configuration information is the same as a method in which the above-described wireless apparatus 110 notifies the second wireless control apparatus 130 of the configuration information. Furthermore, control by the wireless apparatus 110, which is based on the configuration information that is notified by the second wireless control apparatus 130, is the same as the control by the second wireless control apparatus 130, which is based on the configuration information that is notified by the above-described wireless apparatus 110.

Furthermore, these configurations may be combined. That is, the wireless apparatus 110 may notify the second wireless control apparatus 130 of the configuration information of the wireless apparatus 110, and the second wireless control apparatus 130 may notify the wireless apparatus 110 of the configuration information of the second wireless control apparatus 130.

Moreover, a configuration in which notification of the configuration information is made between the first wireless control apparatus 120 and the second wireless control apparatus 130, and a configuration in which notification of the configuration information is made between the wireless apparatus 110 and the second wireless control apparatus 130 may be combined. Moreover, a configuration may be employed in which notification of the configuration information is made between the wireless apparatus 110 and the first wireless control apparatus 120.

Second Embodiment

Portions that distinguish a second embodiment from the first embodiment are described. In the second embodiment, for example, a configuration is described in which, for example, the second wireless control apparatus 130 transmits the configuration information, which is received from the wireless apparatus 110 or the first wireless control apparatus 120, to the wireless terminal.

(Wireless Base Station According to the Second Embodiment)

Figure 14:
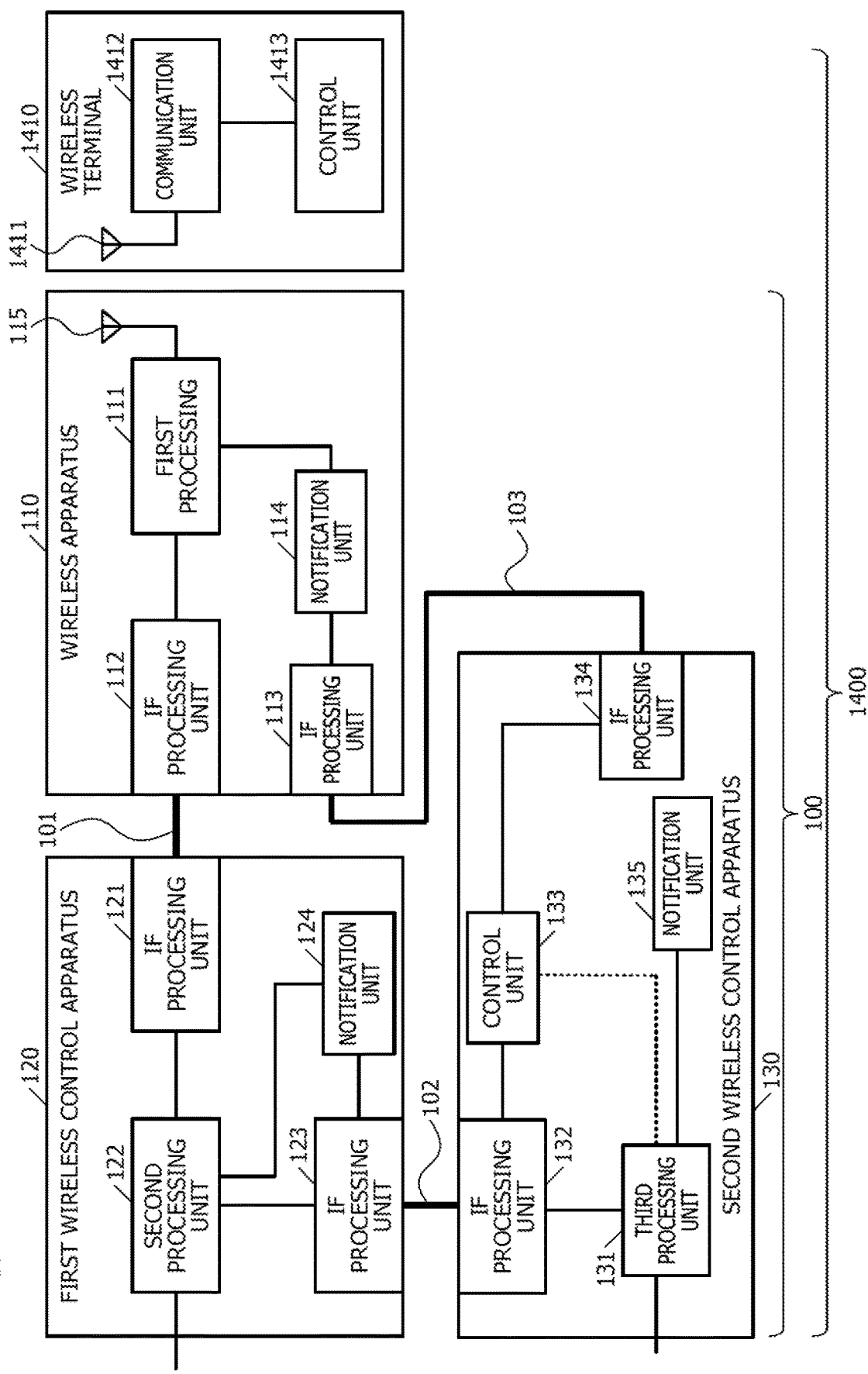
FIG. 14 is a diagram illustrating an example of a wireless communication system according to a second embodiment.

FIG. 14 is a diagram illustrating an example of a wireless communication system according to a second embodiment. In FIG. 14, a portion that is the same as the portion that is illustrated in FIG. 1 is given the same reference numeral and a description thereof is omitted. As illustrated in FIG. 14, the wireless communication system 1400 according to the second embodiment, for example, includes the wireless base station 100 and a wireless terminal 1410. The wireless terminal 1410 is a wireless terminal that performs communication with the above-described above wireless base station 100.

The wireless base station 100 transmits configuration information relating to the first signal processing by the first processing unit 111, the second signal processing by the second processing unit 122, and the third signal processing by the third processing unit 131, which are in the base station signal processing, to the wireless terminal 1410, in a state of being associated with a cell that is formed by the wireless apparatus 110. That is, this configuration information is information relating to the split point of the above-described base station signal processing in accordance with the distribution of the base station signal processing as the first signal processing, the second signal processing, and the third signal processing. Processing that transmits the configuration information to the wireless terminal 1410, for example, may be performed by the third processing unit 131 of the second wireless control apparatus 130.

For example, the control unit 133 notifies the third processing unit 131 of at least one of the configuration information of the first wireless control apparatus 120, which is acquired through the IF processing unit 132, and the configuration information of the wireless apparatus 110, which is acquired through the IF processing unit 134. In contrast, the third processing unit 131 controls the first wireless control apparatus 120 through the IF processing unit 132, in such a manner that the configuration information which is notified by the control unit 133 is stored in a signal for the wireless terminal 1410.

Accordingly, the configuration information may be transmitted from the wireless base station 100 to the wireless terminal 1410. However, no limitation to a configuration in which the configuration information of at least one of the first wireless control apparatus 120 and the wireless apparatus 110 is transmitted, as is, to the wireless terminal 1410 is imposed. For example, the wireless base station 100 may perform a type-of-data or format conversion on the configuration information of at least one of the first wireless control apparatus 120 and the wireless apparatus 110, and then may transmit a result of the conversion to the wireless terminal 1410. For example, the configuration information that is transmitted by the wireless base station 100 to the wireless terminal 1410 may be information, based on which the wireless terminal 1410 may specify the split point of the base station signal processing in the wireless base station 100 described above.

The wireless terminal 1410, for example, includes an antenna 1411, a communication unit 1412, and a control unit 1413. The communication unit 1412 receives a signal that is wirelessly transmitted from the wireless apparatus 110, through the antenna 1411. Then, the communication unit 1412 outputs the received signal to the control unit 1413.

Based on the configuration information that is included in the signal which is output from the communication unit 1412, the control unit 1413, selects a cell that is a connection destination of the wireless terminal 1410 itself, from among cells that include a cell which is formed by the wireless base station 100. Then, the control unit 1413 performs control desirable for the wireless terminal 1410 itself to make a connection to the selected cell.

(Processing in the Wireless Communication System According to the Second Embodiment)

Figure 15:
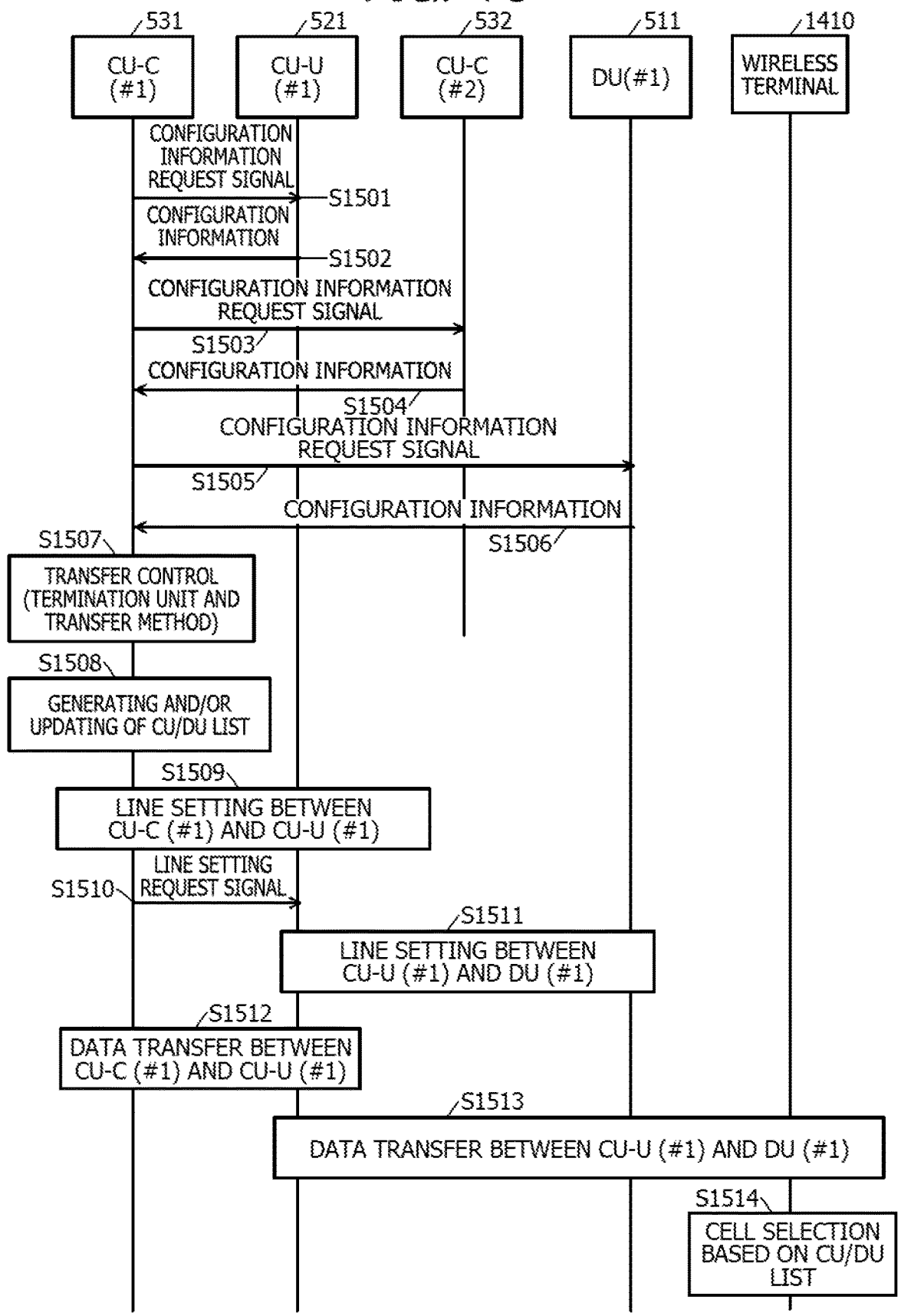
FIG. 15 is a sequence diagram illustrating an example of processing in the wireless communication system according to the second embodiment.

FIG. 15 is a sequence diagram illustrating an example of processing in the wireless communication system according to the second embodiment. In FIG. 15, a case where the wireless base station 100 is realized by the CU-Cs 531 and 532 (#1 and #2), the CU-U 521 (#1), and the DU 511 (#1), which are illustrated in FIG. 5, is described. In this case, for example, the wireless apparatus 110, the first wireless control apparatus 120, and the second wireless control apparatus 130 pertaining to the first split example, which are illustrated in FIG. 2, may be applicable as the DU 511, the CU-U 521, and the CU-C 531, respectively.

For example, each step that is illustrated in FIG. 15 is performed in the state where the DU 511 and the CU-U 521 are connected to the CU-C 531. Steps S1501 to S1507 that are illustrated in FIG. 15 are the same as Steps S601 to S607, respectively, that are illustrated in FIG. 6.

Subsequently to Step S1507, based on pieces of configuration information that are received in Steps S1502, S1504, and S1506, the CU-C 531 generates a CU/DU list (Step S1508). The CU/DU list is information including the configuration information the wireless apparatus 110, the first wireless control apparatus 120, or the second wireless control apparatus 130, or any combination thereof. An example of the CU/DU list will be described below. In Step S1508, in a case where the CU/DU list is generated, based on the pieces of configuration information that are received in Steps S1502 and S1504, the CU-C 531 may update the generated CU/DU list.

Steps S1509 to S1513 that are illustrated in FIG. 15 are the same as Steps S608 to S612, respectively, that are illustrated in FIG. 6. However, the CU/DU list that is generated or updated in Step S1508 is included in downlink data among pieces of data that are transferred in Step S1513. Accordingly, the CU/DU list that is generated or updated in Step S1508 may be transmitted to the wireless terminal 1410.

Subsequently, based on the CU/DU list that is received in Step S1513, the wireless terminal 1410 makes a cell selection that selects the cell which is the connection destination of the wireless terminal 1410 itself, from among cells that include the cell that is formed by the wireless base station 100 (Step S1514).

The processing in the case where the wireless base station 100 is realized by the CU-Cs 531 and 532, the CU-U 521, and the DU 511, which are illustrated in FIG. 5, is described above. Further, processing in a case where the wireless base station 100 is realized by any other CU-C, CU-U, and DU may be in a way similar to the above case.

Furthermore, the transmission of the wireless base station 100 by the CU/DU list may be individually performed on the wireless terminal such as the wireless terminal 1410, and may be broadcast (notified) to each wireless terminal within the cell of the wireless base station 100. It is noted that the broadcast as system information or common control information to each wireless terminal may be formed.

(CU/DU List According to the Second Embodiment)

FIG. 16 is a diagram illustrating an example of the CU/DU list according to the second embodiment. The wireless base station 100, for example, transmits a CU/DU list 1600 that is illustrated in FIG. 16, to the wireless terminal 1410. A type, an identifier, a cell ID, a downlink frequency, and a category for every component (the CU, the CU-C, the CU-U, or the DU) of the wireless base station 100 are included in the CU/DU list 1600.

First, a type of the CU/DU list 1600 is described. The type is information indicating which of the CU, the CU-C, the CU-U, and the DU a component is. In an example that is illustrated in FIG. 16, type=0 denotes CU, type=1 denotes CU-C, type=2 denotes CU-U, and type=3 denotes DU.

First, an identifier of the CU/DU list 1600 is described. The identifier is an identifier of a unique component for every type of component. That is, a component is specified by a combination of the type and the identifier. As an example, 1024 values from 0 to 1023 are used for identifiers.

Subsequently, a cell ID of the CU/DU list 1600 is described. A cell ID of the DU is an identifier of a cell that is formed by the DU. A cell ID of a component other than the DU in the wireless base station 100, for example, may be set to be an identifier of a cell that is mostly used by the component or to be identifiers of all cells in which the component is usable. As an example, 504 values from 0 to 503 are used for the cell ID.

In the wireless base station 100, for example, one DU is allocated to one cell. However, for example, when it is considered that one DU is equivalent to one antenna, a plurality of DUs are set for one cell in MIMO, AAA, Diversity, and the like that use a plurality of antennas.

MIMO is short for Multiple Input Multiple Output. AAA is short for Adaptive Array Antenna. It is noted that it may also be considered that AAA is the same as beamforming.

Furthermore, in 5G, there is also a likelihood that a plurality of DUs will be allocated to one cell. That is, it is also considered that, within a system band such as F-OFDM, a subcarrier interval or symbol length differs and that an SCB which is configured with a plurality of subcarriers is set, and there is a likelihood that one DU will be allocated to one SCB. F-OFDM is short for Filtered-OFDM. OFDM is short for Orthogonal Frequency Division Multiplexing. SCB is short for Subcarrier Block. Furthermore, the SCB may be a cluster or a frequency band. Moreover, a plurality of SCBs may be set for one cell. For this reason, there is a likelihood that a plurality of DUs will be allocated to one cell.

For example, there are 504 (=168×3) cell IDs in LTE, but there is a likelihood that there will not be 504 cell IDs in 5G. Furthermore, with the introduction of massive MIMO, there is also a likelihood that an ID or a beam ID will be given to each beam, and that a cell ID or an SCB ID will be given to every SCB as described above. Considering these, a cell ID may be included in the CU/DU list 1600. It is noted that a cell ID is also included in a neighboring-cell list in LTE, which will be described below.

The downlink frequency in the CU/DU list 1600 is described. The downlink frequency is a frequency [MHz] of a wireless signal that is transmittable by a corresponding DU to the wireless terminal 1410. It is noted that, as is the case with the neighboring-cell list in LTE, instead of the downlink frequency itself, a value that is calculated from the downlink frequency may be used for the CU/DU list 1600. As an example, the formula that is stipulated in 3GPP TS36.101 5.7.3 may be used as a formula for calculating this value.

Furthermore, as an example, the downlink frequency in the CU/DU list 1600 is a central frequency of a downlink frequency, but may be a lower limit or upper limit frequency of the downlink frequency of which a bandwidth is well known. Furthermore, instead of the downlink frequency, or in addition to the downlink frequency, an uplink frequency may be included in the CU/DU list 1600. Furthermore, a bandwidth of the downlink frequency or the uplink frequency may be included in the CU/DU list 1600. These assume FDD, but in the case of TDD, the uplink frequency and the downlink frequency are consistent with each other. Because of this, a frequency may not be added and may be added. FDD is short for Frequency Division Duplex. TDD is short for Time Division Duplex.

The category in the CU/DU list 1600 is described. The category is a category that corresponds to the split point of the base station signal processing described above. Categories that are the CU, the CU-C, and the CU-U, for example, are the CU category that is illustrated in FIG. 11. A category that is the DU, for example, is the DU category that is illustrated in FIG. 10. For example, there is a one-to-one correspondence relationship between the split point of the base station signal processing and the category.

Based on the CU/DU list 1600 that is transmitted from the wireless base station 100, the wireless terminal 1410 selects a cell that is a connection destination. At this time, the wireless terminal 1410, for example, uses the category that is included in the CU/DU list 1600, for cell selection. Various methods may be used for the cell selection that is based on the category.

For example, the less processing that is included in the first signal processing by the wireless apparatus 110 there is in the category, the smaller is a quantity of signals that are transferred through the interface between the CU-U and the DU in a case where the same user data is transferred. For this reason, it is possible that pieces of user data for many users are transferred. On the other hand, the more processing that is included in the first signal processing by the wireless apparatus 110 there is in the category, the larger is a quantity of signals that are transferred through the interface between the CU-U and the DU in a case where the same user data is transferred. For this reason, because of a limitation in a speed through the interface between the CU-U and DU, it is difficult to transfer pieces of data for many users.

In contrast, for example, in a case where QoS of data that is transferred to and from the wireless base station 100 is QoS that requests transfer of a large quantity of signals, the wireless terminal 1410 selects a cell in a category in which the processing that is included in the first signal processing is comparatively less or the processing time for signal processing is short. Qos is short for Quality of Service. Furthermore, in a case where the QoS of data that is transferred to and from the wireless base station 100 is QoS that does not request the transfer of the large quantity, the wireless terminal 1410 selects a cell in a category in which the comparatively more processing is included in the first signal processing or the processing time for signal processing is long.

Furthermore, in some cases, due to the split point of the base station signal processing, a transfer delay, an error rate, scheduling precision, or the like differs without any limitation to the quantity of signals that are transferred through the above-described interface between the CU-U and the DU. In this case, the wireless terminal 1410 may select a cell according to the transfer delay, the error rate, the scheduling precision, or the like that is requested in the QoS of data that is transferred to and from the wireless base station 100.

Subsequently, the neighboring-cell list is described. For example, in LTE, SIB 4 or SIB 5 that specifies a neighbouring cell for cell reselection is used. SIB is short for System Information Block.

SIB 4 is system information relating to the neighboring-cell list for an intra-frequency, that is, the same frequency. The content of a list for SIB 4 is configured with PhysCellID (which, in some cases, referred to as an ID or a PCI), that is, a cell ID, and q-OffsetCell that is a parameter that is used for the cell reselection. It is noted that the parameter that is used for the cell reselection, for example, is specified in 3GPP TS 36.304.

SIB 5 is system information relating to the neighboring-cell list for the inter-frequency, that is, the different frequency. For example, a downlink frequency (dl-Carrier-Freq), NeighCell Config, inteFreqNeighCellList, and the parameter for the cell reselection are included, as inter-FreqCarrierFreqList, in SIB 5. NeighCellConfig includes information indicating whether or not the neighboring cell is for MBSFN, or information on setting of UL and DL in TDD, or the like. MBSFN is short for MBMS Single Frequency Network. MBMS is short for Multimedia Broadcast and Multicast Service. TDD is short for Time Division Duplex. UL and DL are short for Uplink and Downlink, respectively. Furthermore, in the same manner as in SIB 4, the cell ID and the parameter for the cell reselection are included in interFreqNeighCellList. In this manner, the frequency, the cell ID, and the parameter for the cell reselection are included in the neighboring-cell list.

As an example, the CU/DU list 1600 described above may be set to be information that results from adding a category of every DU to the neighboring-cell list. However, the CU/DU list 1600 is not limited to this information, and for example, may be set to be various information indicating a category of every component of the wireless base station 100. Furthermore, pieces of information that are various names, such as classification, type, and capability, as pieces of information which are equivalent to the above-described categories, may be used.

(Hardware Configuration of a Wireless Terminal According to the Second Embodiment)

Figure 17:
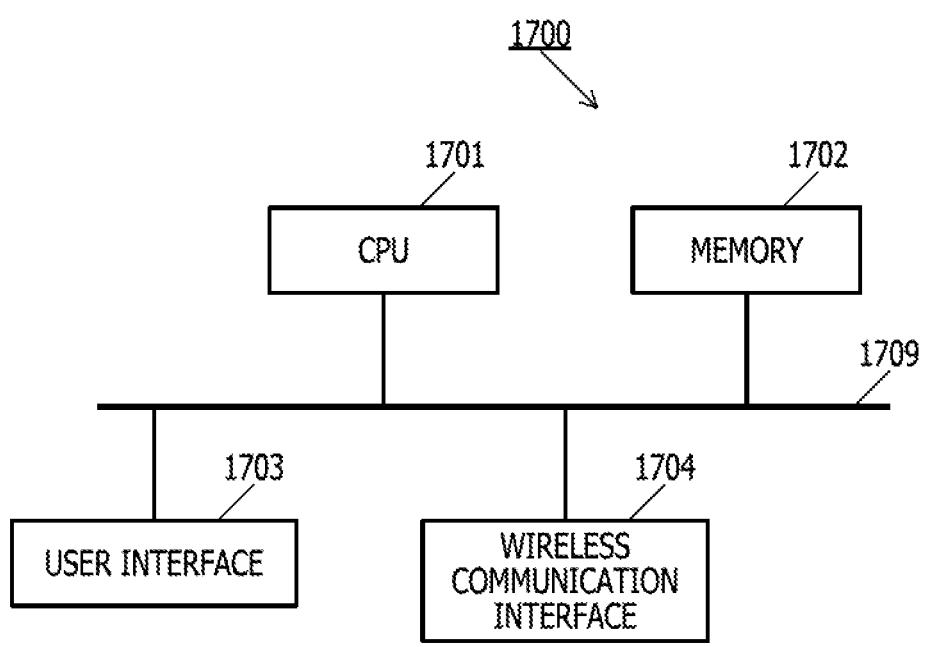
FIG. 17 is a diagram illustrating an example of a hardware configuration of a wireless terminal according to the second embodiment.

FIG. 17 is a diagram illustrating an example of a hardware configuration of a wireless terminal according to the second embodiment. The wireless terminal 1410 that is illustrated in FIG. 14, for example, may be realized by a communication apparatus 1700 that is illustrated in FIG. 17. The communication apparatus 1700 includes a CPU 1701, a memory 1702, a user interface 1703, and a wireless communication interface 1704. The CPU 1701, the memory 1702, the user interface 1703, and the wireless communication interface 1704 are connected to each other with a bus 1709.

The CPU 1701 manages control of the entire communication apparatus 1700. The memories 1702, for example, include a main memory and an auxiliary memory. The main memory, for example, is a RAM. The main memory is used as a work area for the CPU 1701. The auxiliary memory is, for example, a nonvolatile memory such as a magnetic disk or a flash memory. Various programs that cause the communication apparatus 1700 to operate are stored in the auxiliary memory. The program that is stored in the auxiliary memory is loaded onto the main memory and is executed by the CPU 1701.

The user interfaces 1703, for example, includes an input device that receives input of an operation from a user, and an output device that outputs information to the user. The input device, for example, may be realized by a key (for example, a keyboard), a remote controller, or the like. The output device, for example, may be realized by a display, a speaker, or the like. Furthermore, the input device and the output device may be realized by a touch panel or the like. The user interface 1703 is controlled by the CPU 1701.

The wireless communication interface 1704 is a communication interface that performs communication with the outside (for example, the wireless base station 100) of the communication apparatus 1700 in a wireless manner. The wireless communication interface 1704 is controlled by the CPU 1701.

The antenna 1411 that is illustrated in FIG. 14, for example, is included in the wireless communication interface 1704. The communication unit 1412 and the control unit 1413 that are illustrated in FIG. 14, for example, may be realized by at least one of the CPU 1701 and the wireless communication interface 1704.

Furthermore, a hardware configuration of the wireless terminal 1410 is not limited to a hardware configuration that is illustrated in FIG. 17. For example, a configuration that corresponds to the CPU 1701 or the memory 1702 may be realized using an FPGA, a DSP, or the like.

In this manner, according to the second embodiment, the configuration information relating to the first signal processing by the wireless apparatus 110, the second signal processing by the first wireless control apparatus 120, and the third signal processing by the second wireless control apparatus 130, in the base station signal processing, which are in the base station signal processing, may be transmitted to the wireless terminal 1410. Accordingly, it is possible that the wireless terminal 1410 selects a cell that is a connection destination of the wireless terminal 1410 itself according to the split point of the base station signal processing.

Furthermore, a configuration is described in which, with the processing by the second wireless control apparatus 130, the configuration information is transmitted to the wireless terminal 1410, but a configuration may be employed in which, with the processing by the wireless apparatus 110 or the second wireless control apparatus 130, the configuration information is transmitted to the wireless terminal 1410. Furthermore, the configuration information that is transmitted to the wireless terminal 1410, for example, includes the configuration information of at last one of the wireless apparatus 110, the first wireless control apparatus 120, and the second wireless control apparatus 130.

It is noted that the cell selection in accordance with the above-described above configuration information may be made in the wireless base station 100 instead of the wireless terminal 1410. In this case, the configuration information may not be transmitted from the wireless base station 100 to the wireless terminal 1410.

Third Embodiment

As described above, for example, the split point of the base station signal processing may be between the RLC processing unit 205 and the PDCP processing unit 206. In a third embodiment, an example of a configuration in which the split point of the base station signal processing is set to be between the RLC processing unit 205 and the PDCP processing unit 206 is described.

(Split Example of the Base Station Signal Processing According to the Third Embodiment)

Figure 18:
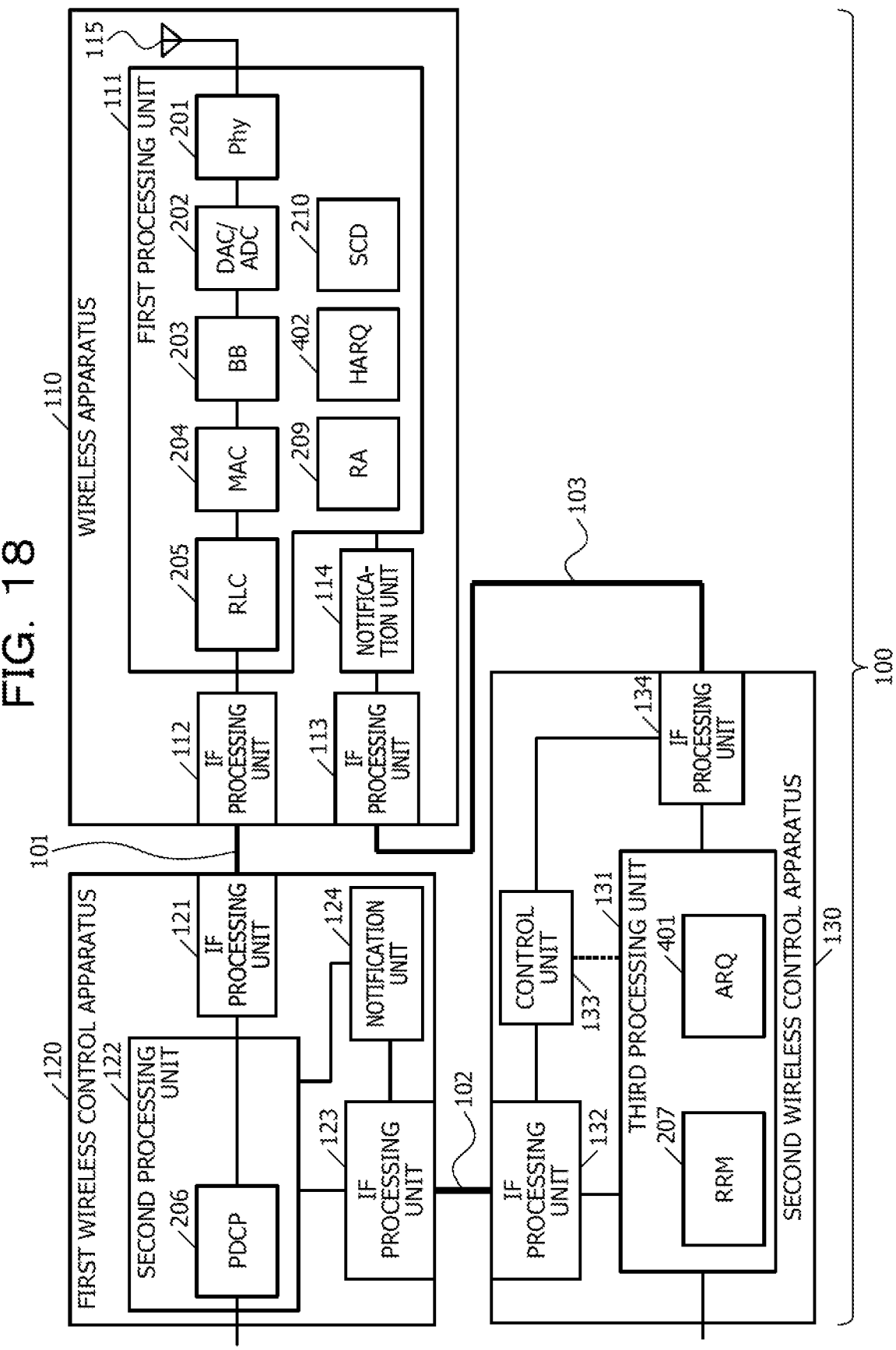
FIG. 18 is a diagram illustrating a split example of base station signal processing according to a third embodiment.

FIG. 18 is a diagram illustrating a split example of base station signal processing according to the third embodiment. In FIG. 18, a portion that is the same as the portion that is illustrated in FIG. 4 is given the same reference numeral and a description thereof is omitted. In an example that is illustrated in FIG. 18, the physical layer processing unit 201, the DAC and ADC 202, the BB processing unit 203, the MAC processing unit 204, the RLC processing unit 205, the RA processing unit 209, the HARQ 402, and the SCD processing unit 210 are included in the first processing unit 111. Furthermore, the PDCP processing unit 206 is included in the second processing unit 122. Furthermore, the RRM processing unit 207 and the ARQ processing unit 401 (the ARQ) are included in the third processing unit 131. However, a configuration of the third processing unit 131 is not limited to this, and may be set to be each configuration described above.

The MAC processing unit 204 performs the MAC reception processing on the signal that is output from the BB processing unit 203, and outputs the signal on which the reception processing is performed, to the RLC processing unit 205. Furthermore, the MAC processing unit 204 performs the MAC transmission processing on the signal that is output from the RLC processing unit 205, and outputs the signal on which the transmission processing is performed, to the BB processing unit 203.

The RLC processing unit 205 performs the RLC reception processing on the signal that is output from the MAC processing unit 204, and outputs the signal on which the reception processing is performed, to the IF processing unit 112. Furthermore, the RLC processing unit 205 performs the RLC transmission processing on the signal that is output from the IF processing unit 112, and outputs the signal on which the transmission processing is performed, to the MAC processing unit 204.

The IF processing unit 112 transmits the signal that is output from the RLC processing unit 205 to the first wireless control apparatus 120 along the transfer path 101. Furthermore, the IF processing unit 112 outputs the signal that is transmitted from the first wireless control apparatus 120 to the RLC processing unit 205 along the transfer path 101.

The IF processing unit 121 outputs the signal that is transmitted from the wireless apparatus 110 to the PDCP processing unit 206 along the transfer path 101. Furthermore, the IF processing unit 121 transmits the signal that is output from the PDCP processing unit 206 to the wireless apparatus 110 along the transfer path 101.

In the example that is illustrated in FIG. 18, the split point of the base station signal processing is between the RLC processing unit 205 and the PDCP processing unit 206, and thus, the signal that is transferred along the transfer path 101, for example, is a PDCP PDU.

Furthermore, for example, in a configuration that is illustrated in FIG. 18, the PDCP processing unit 206 may be separated into a PDCP-C that processes the C-Plane signal and a PDCP-U that processes the U-Plane signal. In this case, for example, instead of the PDCP processing unit 206 of the first wireless control apparatus 120, the PDCP-U may be provided. Furthermore, the PDCP-C may be provided in the third processing unit 131 of the second wireless control apparatus 130, or a processing unit of any other wireless control apparatus.

In this manner, according to the third embodiment, a split point at which the RLC processing unit 205 and the PDCP processing unit 206 are separated from each other may be included and a plurality of split points of the signal processing in the wireless base station may be set to exist together.

Furthermore, in the third embodiment, as in the second embodiment, for example, a configuration may be employed in which the second wireless control apparatus 130 transmits the configuration information, which is received from the wireless apparatus 110 or the first wireless control apparatus 120, to the wireless terminal.

Fourth Embodiment

With references to for example FIG. 5 and other figures, the LTE system is described above as an example. As illustrated above, the invention in the present application may be applicable in any other wireless communication system. In a fourth embodiment, a 5G system in which the invention is applied is described.

(Mobile Communication Network in which a Wireless Base Station According to the Fourth Embodiment is Applicable)

Figure 19:
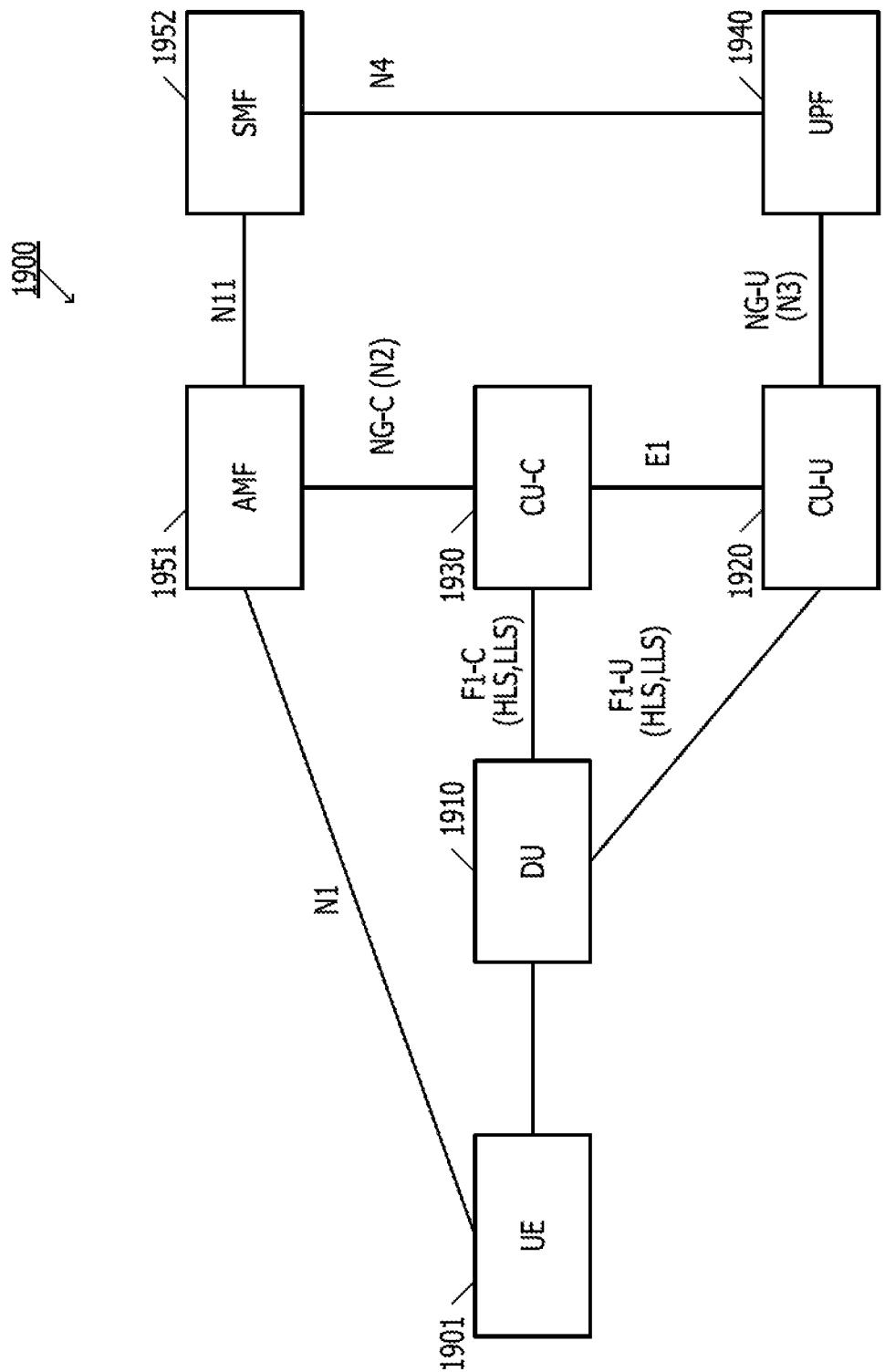
FIG. 19 is a diagram illustrating an example of a mobile communication network in which a wireless base station according to a fourth embodiment is applicable.

FIG. 19 is a diagram illustrating an example of a mobile communication network in which a wireless base station according to the fourth embodiment is applicable. The wireless base station 100 described above, for example, may be applied as the mobile communication network 1900 that is illustrated in FIG. 19. The mobile communication network 1900 is an example of a system that is studied as the 5G system.

In an example that is illustrated in FIG. 19, the mobile communication network 1900 includes a UE 1901, a DU 1910, a CU-U 1920, a CU-C 1930, a UPF 1940, an AMF 1951, and an SMF 1952. It is noted that in FIG. 19, among higher layer apparatuses in the system that is studied as the 5G system, an illustration of a higher layer apparatus other than the UPF 1940, the AMF 1951, and the SMF 1952 is omitted.

UE is short for User Equipment. UPF is short for User Plane Function. AMF is short for Access and Mobility Management Function. SFM is short for Session Management Function.

The UE 1901 is a user equipment that performs wireless communication. An ng-evolved Node B (gNB) that is a base station which performs wireless communication with the UE 1901 is realized by the DU 1910, the CU-U 1920, and the CU-C 1930. It is noted that 4G base stations (for example, the ng-eNBs) also exist together in the mobile communication network 1900 and that the 4G base station may be included in the base station that is realized by the DU 1910, the CU-U 1920, and the CU-C 1930. That is, the wireless base station 100 may set an eNB, the ng-eNB, the gNB, and the like to be various base stations.

The DUs 1910 employ a configuration that corresponds to, for example, the DUs 510 to 515 described above, and are a group of apparatuses each of which may be the wireless apparatus 110 which performs the first signal processing in the wireless base station 100. Furthermore, among the DUs 1910, DUs among which the processing that is included in the first signal processing which is performed differs exist together. That is, among the DUs 1910, the DUs exist together among which the split point of the base station signal processing differs.

The CU-Us 1920 employ a configuration that corresponds to, for example, the CU-Us 521 and 522 described above, and are a group of apparatuses each of which may be the first wireless control apparatus 120 which performs the second signal processing in the wireless base station 100. Furthermore, among the CU-Us 1920, CU-Us among which the processing that is included in the second signal processing which is performed differs exist together. That is, among the CU-Us 1920, CU-Us among which the split point of the base station signal processing differs exist together.

The CU-Cs 1930 employ a configuration that corresponds to, for example, the CU-Cs 531 and 532 described above, and are an apparatus group that may be the second wireless control apparatus 130 which performs the third signal processing in the wireless base station 100. Furthermore, each of the CU-Cs 1930 is a CU-C that may correspond to a plurality of split points of the base station signal processing. That is, each of the CU-Cs 1930 sets the processing that is included in the third signal processing by the CU-C itself, according to the processing that is included in the first signal processing and the second signal processing by the DU and CU-U, respectively, which are the wireless base station 100 along with the CU-C itself.

The DU 1910 is connected to the CU-U 1920 through an F1-U interface. Furthermore, the DU 1910 is connected to the CU-C 1930 through an F1-C interface. The CU-U 1920 is connected to the CU-C 1930 through an E1 interface. Furthermore, the CU-U 1920 is connected to the UPF 1940 through an NG-U (N3) interface. The CU-C 1930 is connected to the AMF 1951 through an NG-C(N2) interface.

It is noted that, as an example, for example, General Packet Radio Service Tunneling Protocol for User Plane (GTP-U) may be used for a communication protocol for the NG-U (N3) interface. Furthermore, as an example, Stream Control Transmission Protocol (SCTP) may be used for a communication protocol for the NG-C(N2) interface.

Furthermore, as an example, GTP-U may be used for a communication protocol for an Xn-U interface that is an inter-base station U-Plane. Furthermore, as an example, SCTP may be used for a communication protocol for an Xn-C interface that is an inter-base station C-Plane.

The UPF 1940, the AMF 1951, and the SMF 1952 are apparatuses that may be higher layer apparatuses for the above-described wireless base station 100.

The UPF 1940, for example, employs a configuration that corresponds to an SGW (for example, the SGW 540 that is illustrated in FIG. 5) in the LTE system. The UPF 1940 is connected to the SMF 1952 through an N4 interface. For example, the UPF 1940 performs transfer (routing and forwarding) data (a packet) and QoS control processing (that is, processing that handles data based on the QoS) of a user plane.

The AMF 1951 and the SMF 1952, for example, employ a configuration that corresponds to an MME (for example, the MME 550 that is illustrated in FIG. 5) in the LTE system. The AMF 1951 is connected to the SMF 1952 through an N11 interface.

The AMF 1951, for example, performs management (for example, control of handover or the like) of connection or mobility, authentication, or the like.

The SMF 1952, for example, performs establishment (setting), change, and deletion of a session. Furthermore, the SMF 1952, for example, performs management of a tunnel between the UPF 1940 and an Access Node (AN). Furthermore, the SMF 1952, for example, performs selection and control of User Plane (UP). Furthermore, the SMF 1952, for example, performs control of a policy, or the QoS.

In the mobile communication network 1900 that is illustrated in FIG. 19, for example, HLS and LLS are studied as the split points of the base station signal processing. HLS is short for Higher Layer Split. LLS is short for Lower Layer Split. The HLS, for example, is a split point at which the split of the base station signal processing takes place between the PDCP and the RLC (for example, refer to FIG. 18). The LLS, for example, is a split point at which the split of the base station signal processing takes place between the MAC and a physical layer (for example, refer to FIGS. 2 and 3). Alternatively, the LLS may be a split point at which the split of the base station signal processing takes place in the middle of the physical layer.

The wireless base station 100 may realize the DU that is included in the DU 1910, as the wireless apparatus 110, the CU-U that is included in the CU-U 1920, as the first wireless control apparatus 120, and the CU-C that is included in the CU-C 1930, as the second wireless control apparatus 130. Furthermore, a plurality of wireless base stations 100 may be realized by providing a plurality of combinations of one or more DUs that are included in the DU 1910, one or more CU-Us that are included in the CU-U 1920, and one or more CU-Cs that are included in the CU-C 1930.

In this manner, according to the fourth embodiment, in the system that is studied as the 5G system, a plurality of split points of the signal processing in the wireless base station may be set to exist together. Furthermore, in the fourth embodiment, as in the second embodiment, for example, a configuration may be employed in which the second wireless control apparatus 130 transmits the configuration information, which is received from the wireless apparatus 110 or the first wireless control apparatus 120, to the wireless terminal.

Fifth Embodiment

For example, as illustrated in FIG. 5, the inter-CU-C interface may be provided between CU-Cs (for example, the CU-Cs 531 and 532) that are different from each other. Furthermore, for example, as illustrated in FIG. 6, the configuration information request signal or the configuration information may be transferred between the CU-Cs through the inter-CU-C interface. Furthermore, for example, as illustrated in FIG. 5, the inter-CU-U interface may be provided between CU-Us (for example, the CU-Us 521 and 522) that are different from each other. Furthermore, an inter-DU interface may be provided between the DUs (for example, the DUs 510 to 515) that are different from each other.

Furthermore, as illustrated in FIG. 5, an interface (for example, the S1 interface) may be provided between the CU-C (for example, the CU-C 531 or 532) and a higher layer apparatus (for example, the MME 550). Furthermore, as illustrated in FIG. 5, an interface (for example, the S1 interface) may be provided between the CU-U (for example, the CU-U 521 or 522) and a higher layer apparatus (for example, the SGW 540).

(Wireless Base Station According to a Fifth Embodiment)

Figure 20:
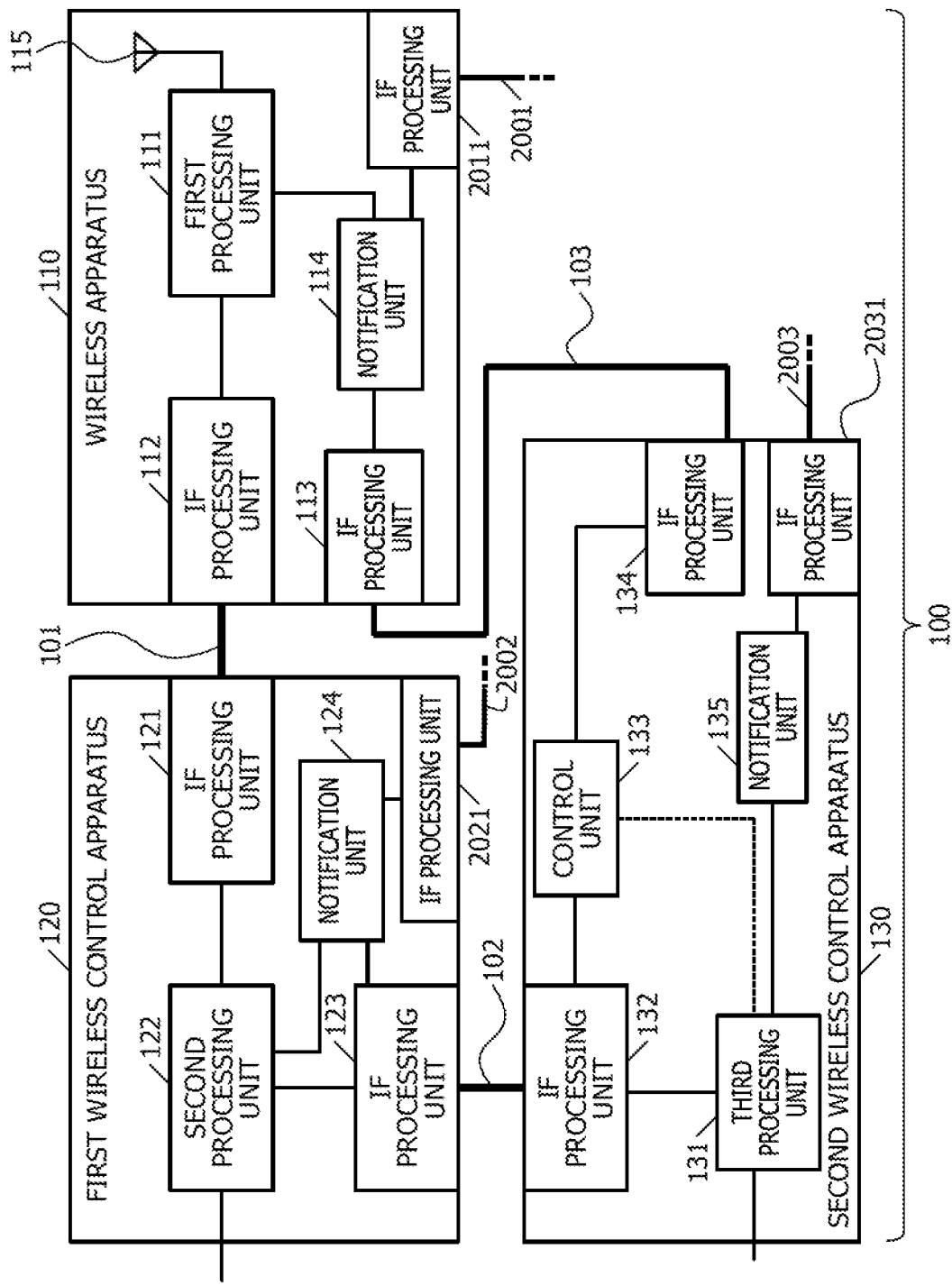
FIG. 20 is a diagram illustrating an example of a wireless base station according to a fifth embodiment.

FIG. 20 is a diagram illustrating an example of a wireless base station according to a fifth embodiment. In FIG. 20, a portion that is the same as the portion that is illustrated in FIG. 1 is given the same reference numeral and a description thereof is omitted. As illustrated in FIG. 20, the wireless apparatus 110 according to the fifth embodiment may include an IF processing unit 2011 in addition to employing the configuration that is illustrated in FIG. 1.

The IF processing unit 2011 includes an interface processing unit that performs communication with any other wireless apparatus (for example, the DU) via a transfer path 2001. For example, the IF processing unit 2011 transmits F1 configuration information, which is output from the notification unit 114, to any other wireless apparatus (for example, the DU) via the transfer path 2001.

The notification unit 114 outputs the F1 configuration information indicating an F1 configuration to which the wireless base station 100 may correspond, to the IF processing unit 2011. Accordingly, the F1 configuration information may be transmitted to any other wireless apparatus (for example, the DU) along the transfer path 2001. The F1 configuration and the F1 configuration information will be described below.

For example, in a case where the wireless apparatus 110 and any other wireless apparatus (for example, the DU) is connected to each other, the notification unit 114 outputs the F1 configuration information to the IF processing unit 2011. Furthermore, in a state where the wireless apparatus 110 and any other wireless apparatus (for example, the DU) are connected to each other, in a case where the instruction to output the configuration information is received from the manager of the wireless apparatus 110, the notification unit 114 may output the configuration information to the IF processing unit 2011. Furthermore, in the state where the wireless apparatus 110 and any other wireless apparatus (for example, the DU) are connected to each other, the notification unit 114 may periodically output the configuration information to the IF processing unit 2011.

Furthermore, for example, the F1 configuration information indicating the F1 configuration to which the wireless base station 100 may correspond is stored in the memory of the wireless apparatus 110 (for example, a nonvolatile memory). In this case, the notification unit 114 reads the F1 configuration information that is stored in the memory of the wireless apparatus 110, and outputs the F1 configuration information, which is read, to the IF processing unit 2011. Alternatively, information for generating the F1 configuration information indicating an F1 configuration of the wireless apparatus 110 may be stored in the memory of the wireless apparatus 110 (for example, a nonvolatile memory). In this case, the notification unit 114 reads the information that is stored in the memory of the wireless apparatus 110, and generates the F1 configuration information based on the information that is read. Then, the notification unit 114 outputs the generated F1 configuration information to the IF processing unit 2011. Alternatively, the notification unit 114 may acquire the F1 configuration information indicating the F1 configuration to which the wireless base station 100 may correspond, from the first processing unit 111.

Furthermore, as illustrated in FIG. 20, the first wireless control apparatus 120 according to the fifth embodiment may include an IF processing unit 2021 in addition to employing the configuration that is illustrated in FIG. 1. The IF processing unit 2021 includes an interface processing unit that performs communication with any other first wireless control apparatus (for example, the CU-U) via a transfer path 2002 (for example, the above-described inter-CU-U interface). For example, the IF processing unit 2021 transmits the F1 configuration information that is output from the notification unit 124, to any other first wireless control apparatus (for example, the CU-U) via the transfer path 2002.

The notification unit 124 outputs the F1 configuration information indicating the F1 configuration to which the wireless base station 100 may correspond, to the IF processing unit 2021. Accordingly, the F1 configuration information may be transmitted to any other first wireless control apparatus (for example, the CU-U) along the transfer path 2002.

For example, in a case where the first wireless control apparatus 120 and any other first wireless control apparatus (for example, the CU-U) are connected to each other, the notification unit 124 outputs the F1 configuration information to the IF processing unit 2021. Furthermore, in a state where the first wireless control apparatus 120 and any other first wireless control apparatus (for example, the CU-U) are connected to each other, in the case where the instruction to output the configuration information is received from the manager of the first wireless control apparatus 120, the notification unit 124 may output the configuration information to the IF processing unit 2021. Furthermore, in the state where the first wireless control apparatus 120 and any other first wireless control apparatus (for example, the CU-U) are connected to each other, the notification unit 124 may periodically output the configuration information to the IF processing unit 2021.

Furthermore, for example, the F1 configuration information indicating the F1 configuration to which the wireless base station 100 may correspond is stored in the memory of the first wireless control apparatus 120 (for example, a nonvolatile memory). In this case, the notification unit 124 reads the F1 configuration information that is stored in the memory of the first wireless control apparatus 120, and outputs the F1 configuration information that is read, to the IF processing unit 2021. Alternatively, information for generating the F1 configuration information indicating the F1 configuration to which the wireless base station 100 may correspond is stored in the memory of the first wireless control apparatus 120 (for example, a nonvolatile memory). In this case, the notification unit 124 reads the information that is stored in the memory of the first wireless control apparatus 120, and generates the F1 configuration information based on the information that is read. Then, the notification unit 124 outputs the generated F1 configuration information to the IF processing unit 2021. Alternatively, the notification unit 124 may acquire the F1 configuration information indicating the F1 configuration to which the wireless base station 100 may correspond, from the second processing unit 122.

Alternatively, the IF processing unit 2021 may include an interface processing unit that performs communication with a higher layer apparatus (for example, the SGW 540 that is illustrated in FIG. 5, or the UPF 1940 that is illustrated in FIG. 19) for the first wireless control apparatus 120, via the transfer path 2002. In this case, the IF processing unit 2021 may transmit the F1 configuration information, which is output from the notification unit 124, to any other first wireless control apparatus via the transfer path 2002 (for example, the S1 interface described above or an NG-U interface), with the F1 configuration information passing by the higher layer apparatus for the first wireless control apparatus 120.

Furthermore, as illustrated in FIG. 20, the second wireless control apparatus 130 according to the fifth embodiment may include an IF processing unit 2031 in addition to employing the configuration that is illustrated in FIG. 1. The IF processing unit 2031 includes an interface processing unit that performs communication with any other second wireless control apparatus (for example, the CU-C) via a transfer path 2003. For example, the IF processing unit 2031 transmits the F1 configuration information, which is output from the notification unit 135, to any other second wireless control apparatus (for example, the CU-C) via the transfer path 2003 (for example, the inter-CU-C interface described above).

The notification unit 135 outputs the F1 configuration information of the second wireless control apparatus 130 itself to the IF processing unit 2031. Accordingly, the F1 configuration information may be transmitted to any other second wireless control apparatus (for example, the CU-C) along the transfer path 2003.

For example, in a case where the second wireless control apparatus 130 and any other second wireless control apparatus (for example, the CU-C) are connected to each other, the notification unit 135 outputs the F1 configuration information to the IF processing unit 2031. Furthermore, in a state where the second wireless control apparatus 130 and any other second wireless control apparatus (for example, the CU-C) are connected to each other, in the case where the instruction to output the configuration information is received from a manager of the first wireless control apparatus 130, the notification unit 135 may output the configuration information to the IF processing unit 2031. Furthermore, in a state where the second wireless control apparatus 130 and any other second wireless control apparatus (for example, the CU-C) are connected with each other, the notification unit 135 may periodically output the configuration information to the IF processing unit 2031.

Furthermore, for example, the F1 configuration information indicating the F1 configuration to which the wireless base station 100 may correspond is stored in a memory of the second wireless control apparatus 130 (for example, a nonvolatile memory). In this case, the notification unit 135 reads the F1 configuration information that is stored in the memory of the second wireless control apparatus 130, and outputs the F1 configuration information that is read, to the IF processing unit 2031. Alternatively, the information for generating the F1 configuration information indicating the F1 configuration to which the wireless base station 100 may correspond is stored in the memory of the second wireless control apparatus 130 (for example, a nonvolatile memory). In this case, the notification unit 114 reads the information that is stored in the memory of the second wireless control apparatus 130, and generates the F1 configuration information based on the information that is read. Then, the notification unit 135 outputs the generated F1 configuration information to the IF processing unit 2031. Alternatively, the notification unit 135 may acquire the F1 configuration information indicating the F1 configuration to which the wireless base station 100 may correspond, from the third processing unit 131.

Alternatively, the IF processing unit 2031 may include an interface processing unit that performs communication with a higher layer apparatus (for example, the MME 550 that is illustrated in FIG. 5, or the DU 1910 that is illustrated in FIG. 19) for the second wireless control apparatus 130, via the transfer path 2003. In this case, the IF processing unit 2031 may transmit the F1 configuration information, which is output from the notification unit 135, to any other second wireless control apparatus via the transfer path 2003 (for example, the S1 interface described above or an NG-C interface), with the F1 configuration information passing by the higher layer apparatus for the second wireless control apparatus 130.

The wireless base station 100 may include at least one of the IF processing unit 2011, 2021, and 2031. That is, with the IF processing units 2011, 2021, or 2031, or any combination thereof, the wireless base station 100 may transmit an F1 configuration of the wireless base station 100 itself to any other wireless base station.

The F1 configuration and the F1 configuration information are described. F1, for example, is an interface between the DU and the CU. For example, the F1-C interface between the DU and the CU-C and the F1-U interface between the DU and the CU-U are included in the F1 (for example, refer to FIG. 19). The F1 configuration is a configuration relating to the F1. For example, the F1 configuration is a configuration in accordance with the split point of the above-described base station signal processing in accordance with the distribution of the base station signal processing as the first signal processing, the second signal processing, and the third signal processing.

As an example, the F1 configuration information is information indicating the F1 configuration to which the wireless base station 100 may correspond, in the HLS and the LLS. Furthermore, in a case where the wireless base station 100 does not correspond to the Function Split, such as the HLS or the LLS, the F1 configuration information may be information indicating that there is no correspondence to the Function Split. Alternatively, base stations may be categorized according to a support situation of the HLS or the LLS, and the F1 configuration information may be information indicating a category in accordance with the support situation of the HLS or the LLS in the wireless base station 100.

Furthermore, the F1 configuration information may be information relating to a connection through an F1 interface between the DU and the CU in accordance with the F1 configuration. Furthermore, the F1 configuration information may be information relating to a protocol that is used for the connection through the F1 interface between the DU and the CU in accordance with the F1 configuration.

(Transmission of the F1 Configuration Information in a Wireless Communication System According to the Fifth Embodiment)

Figure 21:
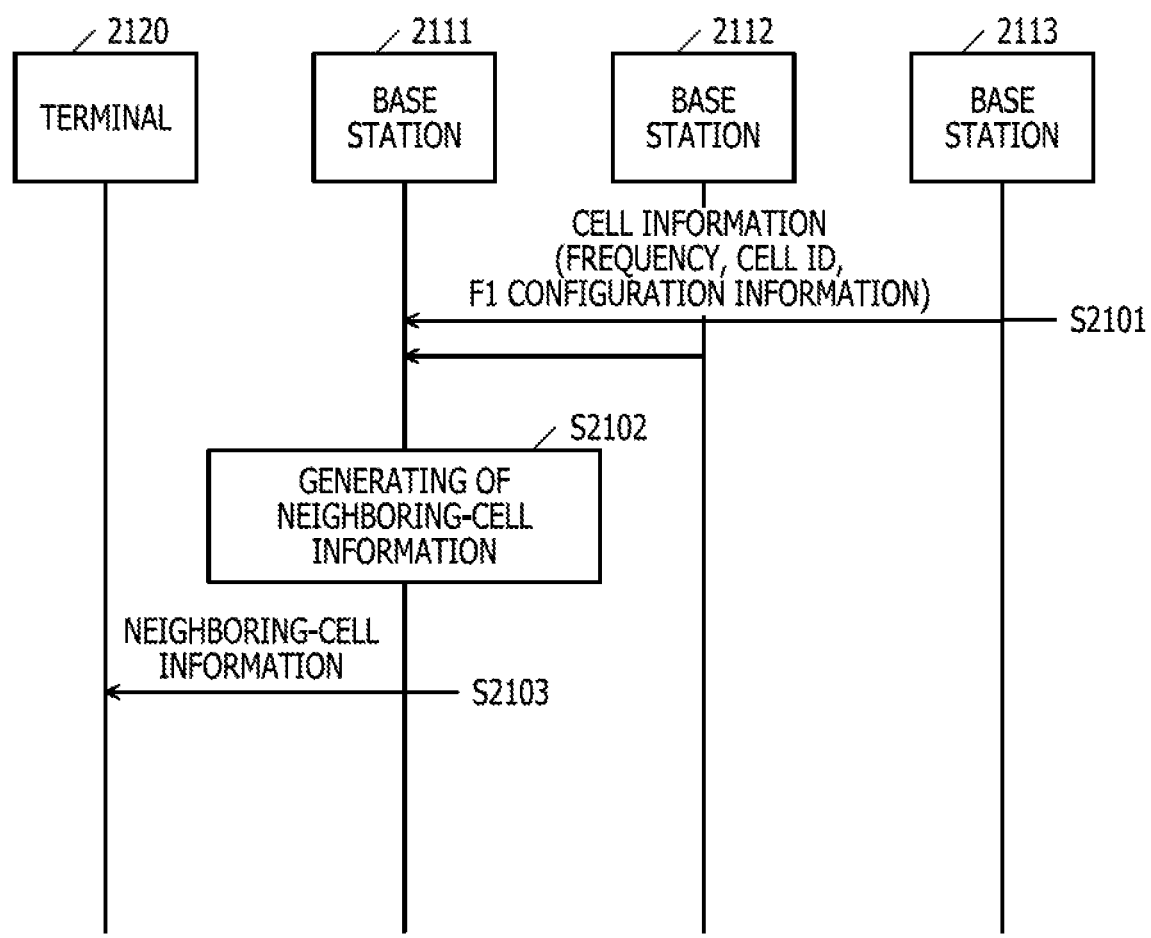
FIG. 21 is a diagram illustrating an example of transmission of F1 configuration information in a wireless communication system according to the fifth embodiment.

FIG. 21 is a diagram illustrating an example of transmission of the F1 configuration information in a wireless communication system according to the fifth embodiment. Base stations 2111 to 2113 that are illustrated in FIG. 21, for example, are wireless base stations that are realized by the wireless apparatus 110, the first wireless control apparatus 120, and the second wireless control apparatus 130, respectively, which are described above. Furthermore, the base stations 2111 to 2113 are wireless base stations which form cells, respectively, that are adjacent to each other. A terminal 2120 that is illustrated in FIG. 21, for example, is a terminal that is included in the UE 1901 which is illustrated in FIG. 19, and that performs wireless communication with the base station 2111.

In FIG. 21, a case where the base stations 2112 and 2113 transmit pieces of FI configuration information of the base stations 2112 and 2113 themselves, respectively, to the base station 2111, is described. First, each of the base stations 2112 and 2113 notifies cell information regarding the each of the base station 2112 and 2113, to the base station 2111 (Step S2101). The F1 configuration information indicating the F1 configuration to which each of the base station 2112 and 2113 themselves may correspond, as well as a frequency and a cell ID of a cell that is formed by each of the base station 2112 and 2113 themselves, is included in the cell information.

As an example, the notifying in Step S2101 may be performed by the inter-CU-C interface (for example, the IF processing unit 2031 and the transfer path 2003, which are illustrated in FIG. 20) between each of the base stations 2111 to 2113.

Alternatively, the notifying in Step S2101 may be performed by the inter-CU-U interface (for example, the IF processing unit 2021 and the transfer path 2002, which are illustrated in FIG. 20) between each of the base stations 2111 to 2113. Alternatively, the notifying in Step S2101 may be performed by the inter-DU interface (for example, the IF processing unit 2011 and the transfer path 2001, which are illustrated in FIG. 20) between each of the base stations 2111 to 2113. Alternatively, the notifying in Step S2101 may be performed by an Xn (for example, X2) interface between each of the base stations 2111 to 2113.

Subsequently, the base station 2111 generates neighboring-cell information that is based on pieces of cell information which are received from the base stations 2112 and 2113 in Step S2101 (Step S2102). For example, pieces of information indicating cell frequencies or cell IDs of neighboring cells (for example, the base stations 2112 and 2113) are included in the neighboring-cell information. Alternatively, pieces of F1 configuration information of the neighboring cells (for example, the base stations 2112 and 2113) may be further included in the neighboring-cell information.

Subsequently, the base station 2111 transmits the neighboring-cell information that is generated in Step S2102, to the terminal 2120 in a cell that is formed by the base station 2111 itself (Step S2103). For example, based on the neighboring-cell information that is received in Step S2103, for example, the terminal 2120 performs wireless quality measurement or the like for handover.

As illustrated in FIG. 21, each of the base stations 2112 and 2113 notifies the F1 configuration information, as well as the frequency or the cell ID of the cell that is formed by each of the base stations 2112 and 2113 themselves, to the base station 2111. In the same manner, each of the base stations 2111 and 2113 notifies the F1 configuration information, as well as the frequency and the cell ID of the cell that is formed by each of the base stations 2111 and 2113 themselves, to the base station 2112. Furthermore, each of the base stations 2111 and 2112 notifies the F1 configuration information, as well as the frequency and the cell ID of the cell that is formed by each of the base stations 2111 and 2112 themselves, to the base station 2113.

Accordingly, the base stations 2111 to 2113 may exchange pieces of F1 configuration information with each other. However, the exchanging of the pieces of F1 configuration information is not limited to this method, and may be performed by processing that is separate from processing that notifies the cell information indicating the frequency or the cell ID of the cell that is formed by each of the base stations 2111 to 2113 themselves. For example, the exchanging of the pieces of F1 configuration information may be performed using a protocol for exchanging the pieces of F1 configuration information.

For example, the base station 2111 obtains pieces of F1 configuration information of the base stations 2112 and 2113, and thus may determine the F1 configurations to which the base stations 2112 and 2113, respectively, may correspond. Accordingly, the base station 2111 may specify a type of service for the wireless communication that is performed by the terminal 2120, and may select a cell of a base station that may correspond to the F1 configuration which is suitable for the type of service that is specified, of the base stations 2112 and 2113, as a candidate for a destination of the terminal 2120 for handover from the cell that is formed by the base station 2111 itself. Alternatively, the base station 2111 may also select the candidate for the destination of the terminal 2120 for handover from the cell that is formed by the base station 2111 itself, considering communication conditions, such as the QoS, for the base stations 2112 and 2113, in addition to the F1 configuration information.

(Transmission of the F1 Configuration Information and CP/UP Split Information in the Wireless Communication System According to the Fifth Embodiment)

Figure 22:
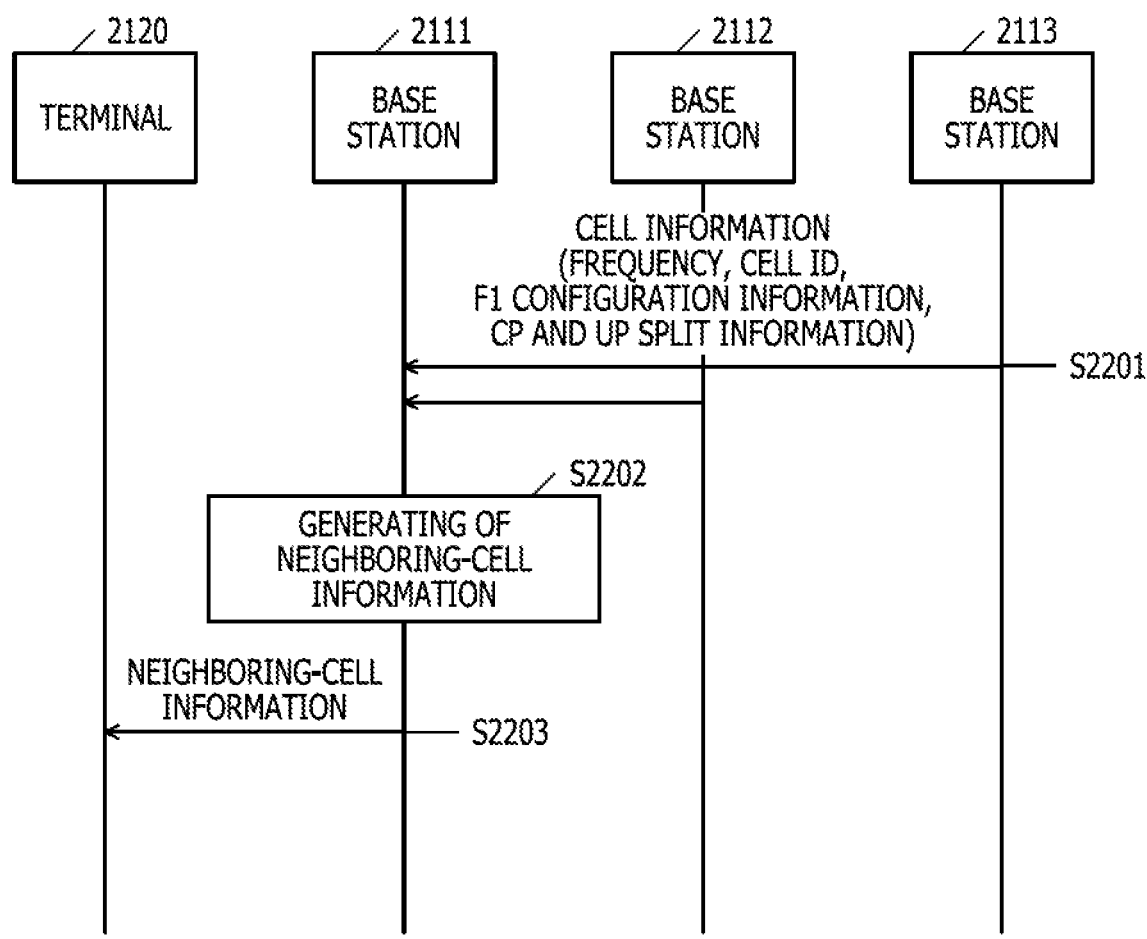
FIG. 22 is a diagram illustrating an example of transmission of the F1 configuration information and CP/UP split information in the wireless communication system according to the fifth embodiment.

FIG. 22 is a diagram illustrating an example of transmission of the F1 configuration information and CP/UP split information in the wireless communication system according to the fifth embodiment. In FIG. 22, a portion that is the same as the portion that is illustrated in FIG. 21 is given the same reference numeral and a description thereof is omitted. Steps S2201 to S2203 that are illustrated in FIG. 22 are the same as Steps S2101 to S2103, respectively, that are illustrated in FIG. 21. However, the cell information that is transmitted in Step S2201 may include the CP/UP split information indicating "support" or "non-support" of CP/UP split in the CU.

Accordingly, the base station 2111 may select the candidate for the destination of the terminal 2120 for handover from the cell that is formed by the base station 2111 itself, considering the "support" or "non-support" of the CP/UP split, in addition to F1 configurations of the base stations 2112 and 2113.

(Transmission of the F1 Configuration Information and Support Service Information in the Wireless Communication System According to the Fifth Embodiment)

Figure 23:
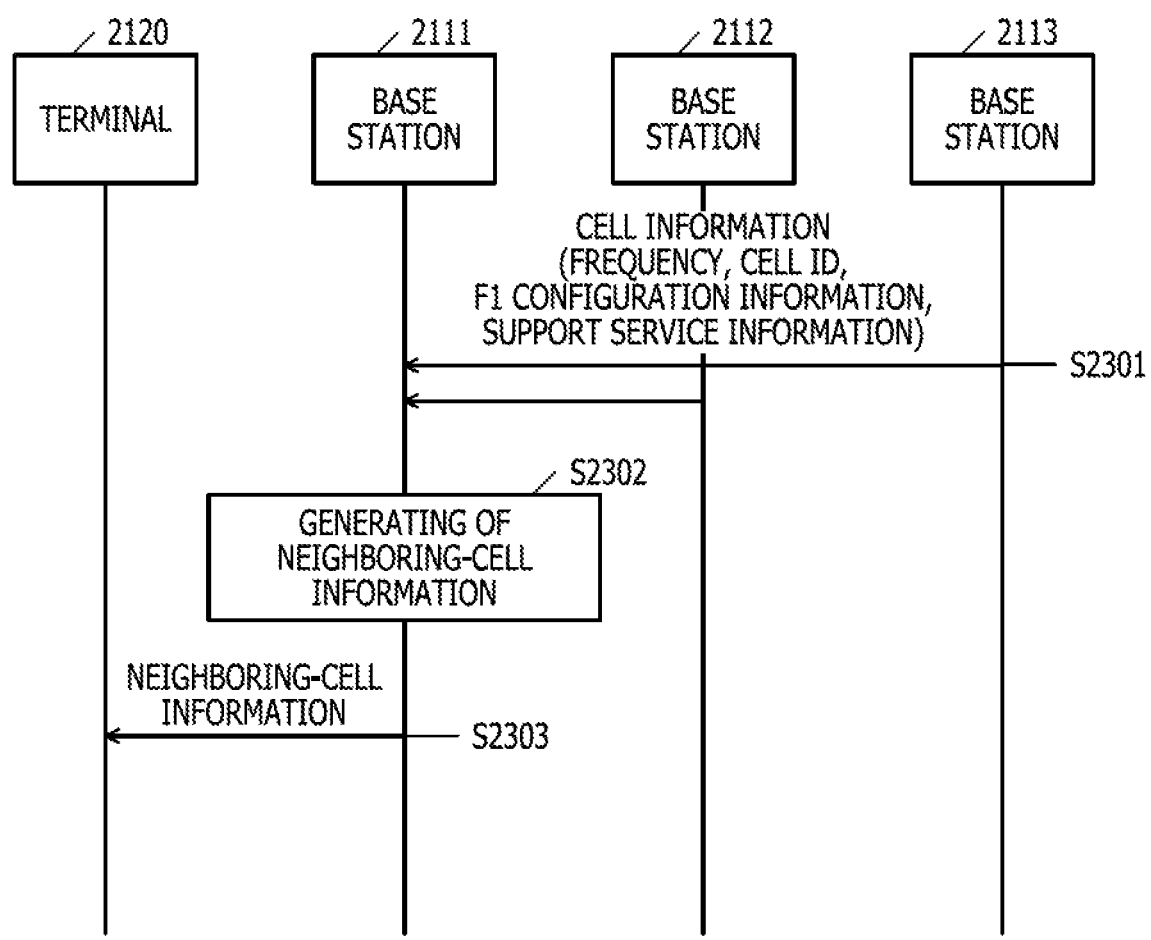
FIG. 23 is a diagram illustrating an example of transmission of the F1 configuration information and support service information in the wireless communication system according to the fifth embodiment.

FIG. 23 is a diagram illustrating an example of transmission of the F1 configuration information and support service information in the wireless communication system according to the fifth embodiment. In FIG. 23, a portion that is the same as the portion that is illustrated in FIG. 21 is given the same reference numeral and a description thereof is omitted. Steps S2301 to S2303 that are illustrated in FIG. 23 are the same as Steps S2101 to S2103, respectively, that are illustrated in FIG. 21.

However, support service information indicating a service that is supportable by the cell that is formed by the base station 2111 itself may be included in the cell information that is transmitted in Step S2301. Accordingly, the base station 2111 may select the candidate for the destination of the terminal 2120 for handover from the cell that is formed by the base station 2111 itself, considering the service that is supportable by each cell, in addition to the F1 configurations of the base stations 2112 and 2113.

Furthermore, communication condition information indicating a communication condition for communication in the cell that is formed by the base station 2111 itself may be included in the cell information that is transmitted in Step S2301. As an example, the communication condition is a type of supportable communication, among eMBB, URLLC, and mMTC. eMBB is short for enhanced Mobile Broad Band. URLLC is short for Ultra-Reliable and Low Latency Communications. mMTC is short for massive Machine Type Communications.

Alternatively, the communication condition may be a condition for communication, such as a maximum transfer delay or a guarantee transfer speed. Alternatively, the communication condition may be a slice that may provide support, among slices that correspond to various services. Accordingly, the base station 2111 may select the candidate for the destination of the terminal 2120 for handover from the cell that is formed by the base station 2111 itself, considering the communication condition for communication in each cell, in addition to the F1 configurations of the base stations 2112 and 2113.

Furthermore, in some cases, the service that is supportable by each cell, or the communication condition changes according to load on the base station apparatus. For this reason, the support service information or the communication condition information may be periodically reported with the cell information.

(Transmission of the F1 Configuration Information Between the Base Stations that Differ in the Slice in the Wireless Communication System According to the Fifth Embodiment)

Figure 24:
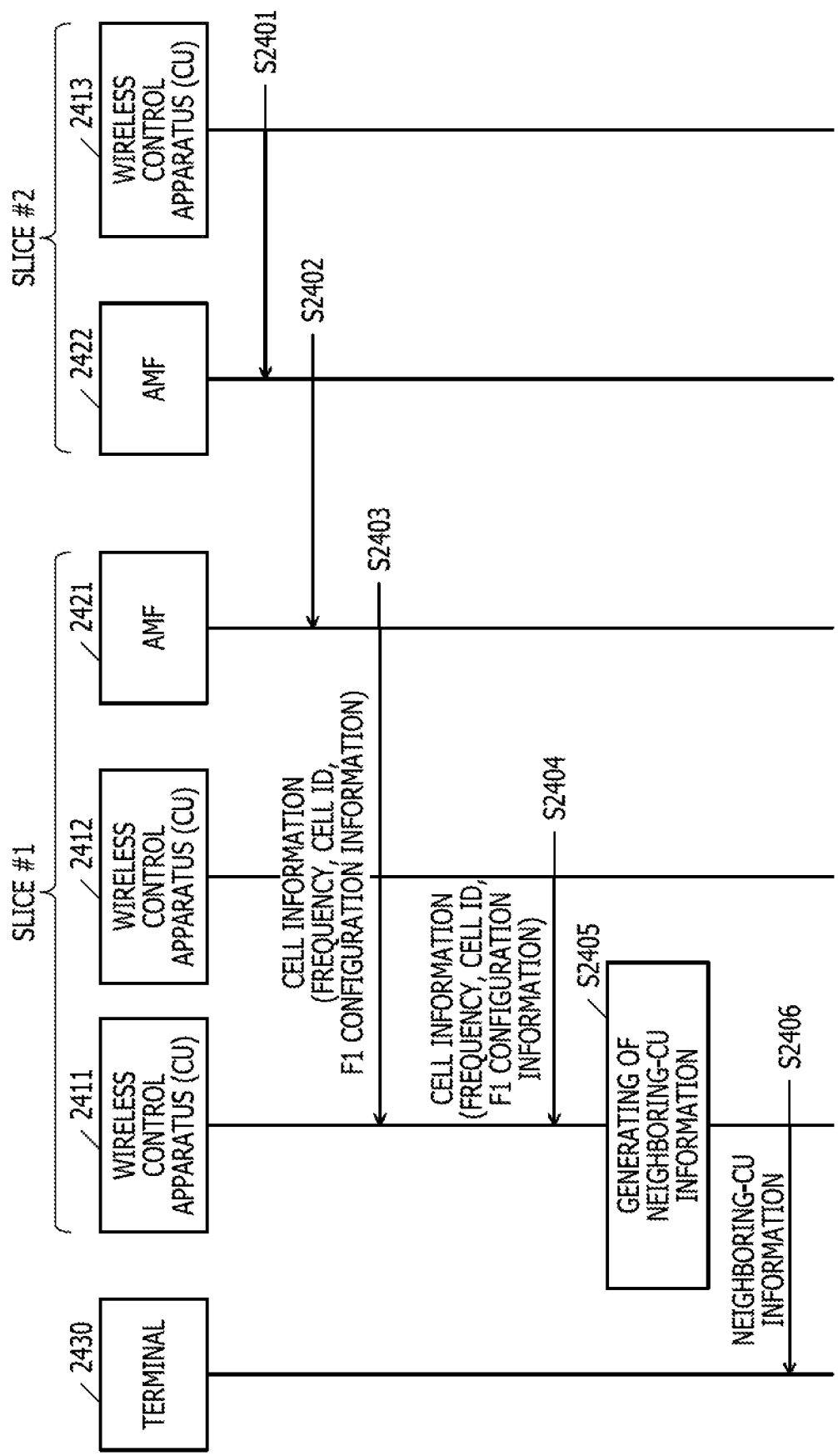
FIG. 24 is a diagram illustrating an example of the transmission of the F1 configuration information between base stations that differ in slice in the wireless communication system according to the fifth embodiment.

FIG. 24 is a diagram illustrating an example of the transmission of the F1 configuration information between the base stations that differ in the slice in the wireless communication system according to the fifth embodiment. Each of the wireless control apparatuses 2411 to 2413 (CUs), which are illustrated in FIG. 24, for example, is the first wireless control apparatus 120 (for example, the CU-U) or the second wireless control apparatus 130 (for example, the CU-C), which are described above. Furthermore, the wireless control apparatuses 2411 to 2413 are included in each of the wireless base stations that form neighboring cells, respectively. A terminal 2430 that is illustrated in FIG. 24, for example, is a terminal that is included in the UE 1901 which is illustrated in FIG. 19, and that performs wireless communication with the base station which is configured with the wireless control apparatus 2411.

Furthermore, the wireless control apparatuses 2411 and 2412 belong slice # (Core Slice). An AMF 2421, for example, is included in the AMF 1951 that is illustrated in FIG. 19. The AMF 2421 may be a higher layer apparatus for the wireless control apparatuses 2411 and 2412 in slice #1. The wireless control apparatus 2413 belongs to slice #2 (Core Slice) that is different from slice #1. An AMF 2422, for example, is included in the AMF 1951 that is illustrated in FIG. 19. The AMF 2422 may be a higher layer apparatus for the wireless control apparatuses 2413 in slice #2.

In FIG. 24, a case where the wireless control apparatuses 2412 and 2413 transmit pieces of F1 configuration information of base stations to which the wireless control apparatuses 2412 and 2413 themselves, respectively, belong, to the wireless control apparatus 2411 is described with reference to FIG. 24. First, the wireless control apparatus 2413 transmits cell information of a base station to which the wireless control apparatus 2413 itself belongs, to the AMF 2422 that may be a higher layer apparatus for the wireless control apparatus 2413 itself (Step S2401). The F1 configuration information indicating the F1 configuration to which each of the base station 2112 and 2113 themselves may correspond, as well as the frequency and the cell ID of the cell that is formed by each of the base station 2112 and 2113 themselves, is included in the cell information.

In a case where the wireless control apparatus 2413 is the first wireless control apparatus 120 (for example, the CU-U), transmission in Step S2401, for example, is performed by the notification unit 124, the IF processing unit 2021, and the transfer path 2002, which are illustrated in FIG. 20. Furthermore, in this case, the transmission in Step S2401, for example, is performed through the E1 interface, the second wireless control apparatus 130, and the NG-C interface, which are illustrated in FIG. 19.

In a case where the wireless control apparatus 2413 is the second wireless control apparatus 130 (for example, the CU-C), transmission in Step S2401, for example, is performed by the notification unit 135, the IF processing unit 2031, and the transfer path 2003, which are illustrated in FIG. 20. Furthermore, in this case, the transmission in Step S2401, for example, is performed through the NG-C interface that is illustrated in FIG. 19.

Subsequently, the AMF 2422 transmits cell information of the wireless control apparatus 2413, which is received in Step S2401, to the AMF 2421 (Step S2402). Transmission in Step S2402, for example, may be performed through an inter-slice interface.

Subsequently, the AMF 2421 transmits the cell information of the wireless control apparatus 2413, which is received in Step S2402, to the wireless control apparatus 2411 (Step S2403). Transmission in Step S2403, for example, may be performed through the NG-C interface that is illustrated in FIG. 19.

Subsequently, the wireless control apparatus 2412 notifies the cell information regarding the base station to which the wireless control apparatus 2412 itself belongs, to the wireless control apparatus 2411 (Step S2404). The F1 configuration information indicating the F1 configuration to which each of the base station 2112 and 2113 themselves may correspond, as well as a frequency and a cell ID of a cell that is formed by each of the base station 2112 and 2113 themselves, is included in the cell information. In a case where each of the wireless control apparatuses 2411 and 2412 is the first wireless control apparatus 120 (for example, the CU-U), notifying in Step S2404, for example, may be performed through the inter-CU-U interface. In a case where each of the wireless control apparatuses 2411 and 2412 is the second wireless control apparatus 130 (for example, the CU-C), the notifying in Step S2404, for example, may be performed through the inter-CU-C interface.

Subsequently, the wireless control apparatus 2411 generates neighboring-CU information that is based on pieces of cell information which are received from the wireless control apparatuses 2412 and 2413 in Step S2401 to S2404 (Step S2405). For example, information indicating cell frequencies or cell IDs of neighboring cells (for example, the wireless control apparatuses 2412 and 2413) is included in the neighboring-CU information. Alternatively, pieces of F1 configuration information of the neighboring cells (for example, the wireless control apparatuses 2412 and 2413) may be further included in the neighboring-CU information.

Subsequently, the wireless control apparatus 2411 transmits the neighboring-CU information that is generated in Step S2405, to the terminal 2430 in a cell that is formed by a base station to which the wireless control apparatus 2411 itself belongs (Step S2406). For example, based on the neighboring-CU information that is received in Step S2406, for example, the terminal 2430 performs wireless quality measurement or the like for handover.

As illustrated in FIG. 24, each of the wireless control apparatuses 2412 and 2413 notifies, to the wireless control apparatus 2411, the F1 configuration information, as well as a frequency or a cell ID regarding a cell that is formed by the base station to which each of the wireless control apparatuses 2412 and 2413 themselves belong. In the same manner, each of the wireless control apparatuses 2411 and 2413 notifies, to the wireless control apparatus 2412, the F1 configuration information, as well as a frequency or a cell ID of a cell that is formed by the base station to which each of the wireless control apparatuses 2411 and 2413 themselves belong. Furthermore, each of the wireless control apparatuses 2411 and 2412 notifies the F1 configuration information, as well as a frequency or a cell ID of a cell that is formed by the base station to which each of the wireless control apparatuses 2411 and 2412 themselves belong, to the wireless control apparatus 2413.

Accordingly, the wireless control apparatuses 2411 to 2413 may exchange pieces of F1 configuration information with each other. However, the exchanging of the pieces of F1 configuration information is not limited to this method, and may be performed by processing that is separate from processing that notifies the cell information indicating the frequency or the cell ID regarding the cell that is formed by each of the base stations. For example, the exchanging of the pieces of F1 configuration information may be performed using the protocol for exchanging the pieces of F1 configuration information.

For example, the wireless control apparatus 2411 obtains pieces of F1 configuration information of the wireless control apparatuses 2412 and 2413, and thus may determine the F1 configurations to which the wireless control apparatuses 2412 and 2413, respectively, may correspond. Accordingly, the wireless control apparatus 2411 may select a cell of a base station that may correspond the F1 configuration which is suitable for a type of service for the wireless communication that is performed by the terminal 2430, among cells that are formed by the wireless control apparatuses 2412 and 2413, as a candidate for a destination of the terminal 2430 for handover. Alternatively, the wireless control apparatus 2411 may also select the candidate for the destination of the terminal 2430 for handover from the cell that is formed by the base station to which the wireless control apparatus 2411 itself belongs, considering the communication conditions, such as the QoS, for the wireless control apparatuses 2412 and 2413, in addition to the F1 configuration information.

Furthermore, in an example that is illustrated in FIG. 24, as in the example that is illustrated in FIG. 22, the CP/UP split information indicating the "support" or "non-support" of the CP/UP split in the CU may be included in the cell information. Accordingly, the wireless control apparatus 2411 may select the candidate for the destination of the terminal 2430 for handover from the cell that is formed by the base station to which the wireless control apparatus 2411 itself belongs, considering the "support" or "non-support" of the CP/UP split, in addition to F1 configurations of the wireless control apparatuses 2412 and 2413.

Furthermore, as illustrated in FIG. 24, it is also possible that exchanging of pieces of cell information is performed between the wireless control apparatuses (between the base stations) that differ in the slice. For example, as in the example that is illustrated in FIG. 24, through the AMFs 2421 and 2422 in each slice, the exchanging of the pieces of cell information may be performed between the wireless control apparatuses that differ in the slice.

Figure 25:
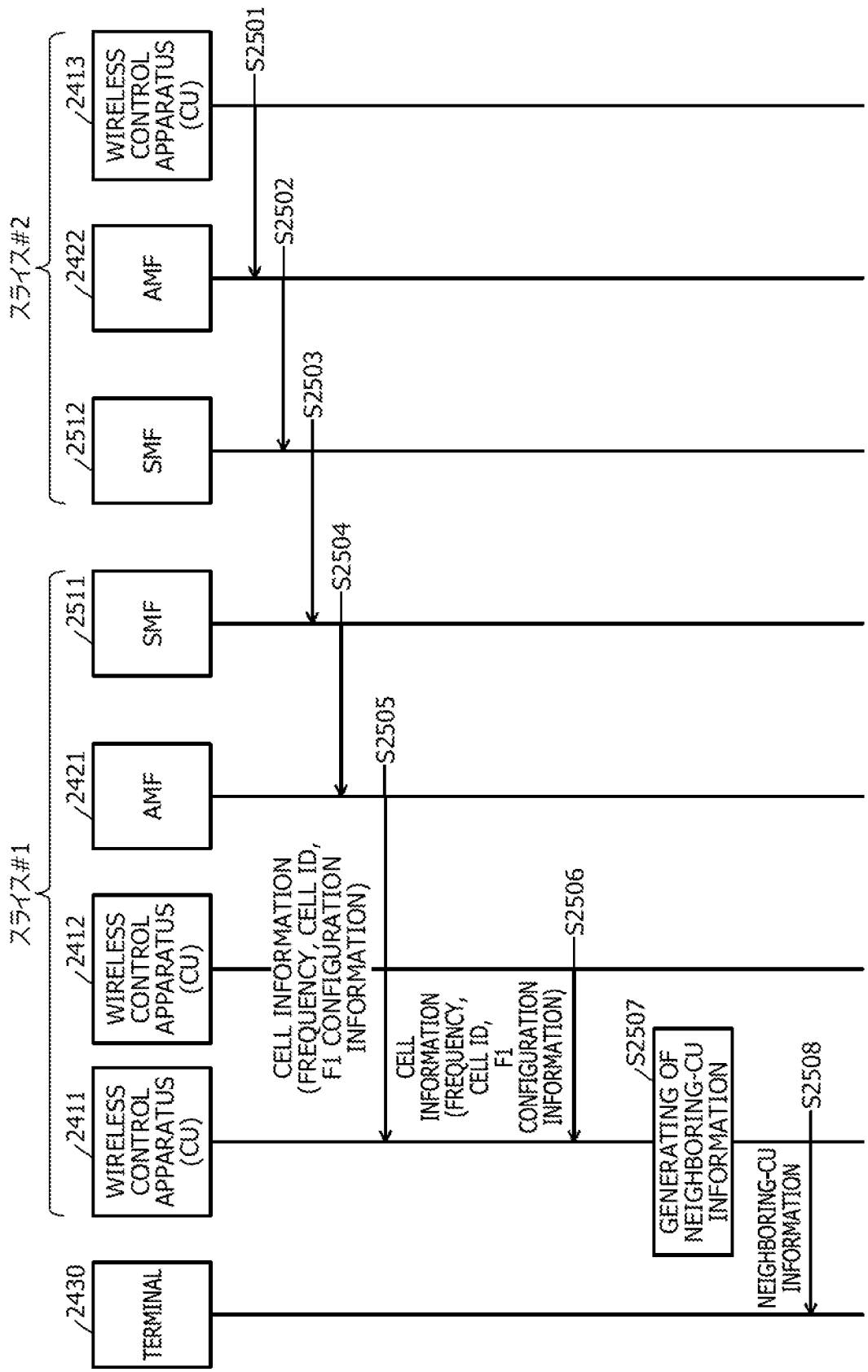
FIG. 25 is a diagram illustrating another example of the transmission of the F1 configuration information between the base stations that differ in the slice in the wireless communication system according to the fifth embodiment.

FIG. 25 is a diagram illustrating another example of the transmission of the F1 configuration information between the base stations that differ in the slice in the wireless communication system according to the fifth embodiment. In FIG. 25, a portion that is the same as the portion that is illustrated in FIG. 24 is given the same reference numeral and a description thereof is omitted. An SMF 2511 that is illustrated in FIG. 25, for example, is included in the SMF 1952 that is illustrated in FIG. 19. The SMF 2511 is a higher layer apparatus in slice #1. An SMF 2512 that is illustrated in FIG. 25, for example, is included in the SMF 1952 that is illustrated in FIG. 19. The SMF 2512 is a higher layer apparatus in slice #2.

Step S2501 that is illustrated in FIG. 25 is the same as Step S2401 that is illustrated in FIG. 24. Subsequently to Step S2501, the AMF 2422 transmits the cell information of the wireless control apparatus 2413, which is received in Step S2501, to the SMF 2512 (Step S2502). Transmission in Step S2502, for example, may be performed through the N11 interface that is illustrated in FIG. 19.

Subsequently, the SMF 2512 transmits the cell information of the wireless control apparatus 2413, which is received in Step S2502, to the SMF 2511 (Step S2503). Transmission in Step S2503, for example, may be performed through the inter-slice interface. Subsequently, the SMF 2511 transmits the cell information of the wireless control apparatus 2413, which is received in Step S2503, to the AMF 2421 (Step S2504). Transmission in Step S2504, for example, may be performed through the N11 interface that is illustrated in FIG. 19.

Steps S2505 to S2508 that are illustrated in FIG. 25 are the same as Steps S2403 to S2406, respectively, that are illustrated in FIG. 24. As in an example that is illustrated in FIG. 25, through the SMFs 2511 and 2522 in each slice, the exchanging of the pieces of cell information may also be performed between the wireless control apparatuses that differ in the slice.

In this manner, with the wireless base station 100 according to the fifth embodiment, any other wireless base station may be notified of fifth information (for example, the F1 configuration information) that includes information relating to the first signal processing, the second signal processing, or the third signal processing, or any combination thereof. Accordingly, any one wireless base station may be caused to select a base station that is a connection destination of a wireless terminal which is being connected to the wireless base station, using the fifth information. For this reason, it is possible that a suitable base station in accordance with a communication service for the wireless terminal is caused to be selected as a base station that is a connection destination of the wireless terminal.

The selection of the base station that is the connection destination, for example, is a selection of a base station that is a destination for handover. Alternatively, the selection of the base station that is the connection destination may be a selection of an additional base station in CoMP or CA. CA is short for Carrier Aggregation.

With the wireless base station 100 according to the fifth embodiment, for example, in selecting a base station that is a destination for handover or an additional base station, it is possible that a base station including the F1 configuration which may support a service desirable for a wireless terminal is selected. For this reason, for example, a base station that does not support a desirable service may be suppressed from being selected, and thus, reselection or line resetting may be suppressed from occurring.

For example, in a case where a service desirable for a wireless terminal is a desirable service that demands a low delay, it is possible that a base station which employs the F1 configuration that may realize the low delay such as in the HLS is selected as a connection destination. Alternatively, in a case where the service desirable for a wireless terminal is a desirable service that does not demands a low delay, it is possible that a base station which employs an inexpensive F1 configuration in which a delay such as in the LLS is easy to occur is selected as a connection destination.

As an example, when a base station that does not support a desirable service is selected and thus the reselection and the line resetting occur, in some cases, a discontinuity in the service occurs for approximately 0.5 to 1.0 seconds [sec] and thus a request communication condition (for example, a maximum transfer rate) is not satisfied. In contrast, the base station that supports the desirable service is selected and thus, this discontinuity in the service may be suppressed.

Sixth Embodiment (Wireless Base Station According to a Sixth Embodiment)

Figure 26:
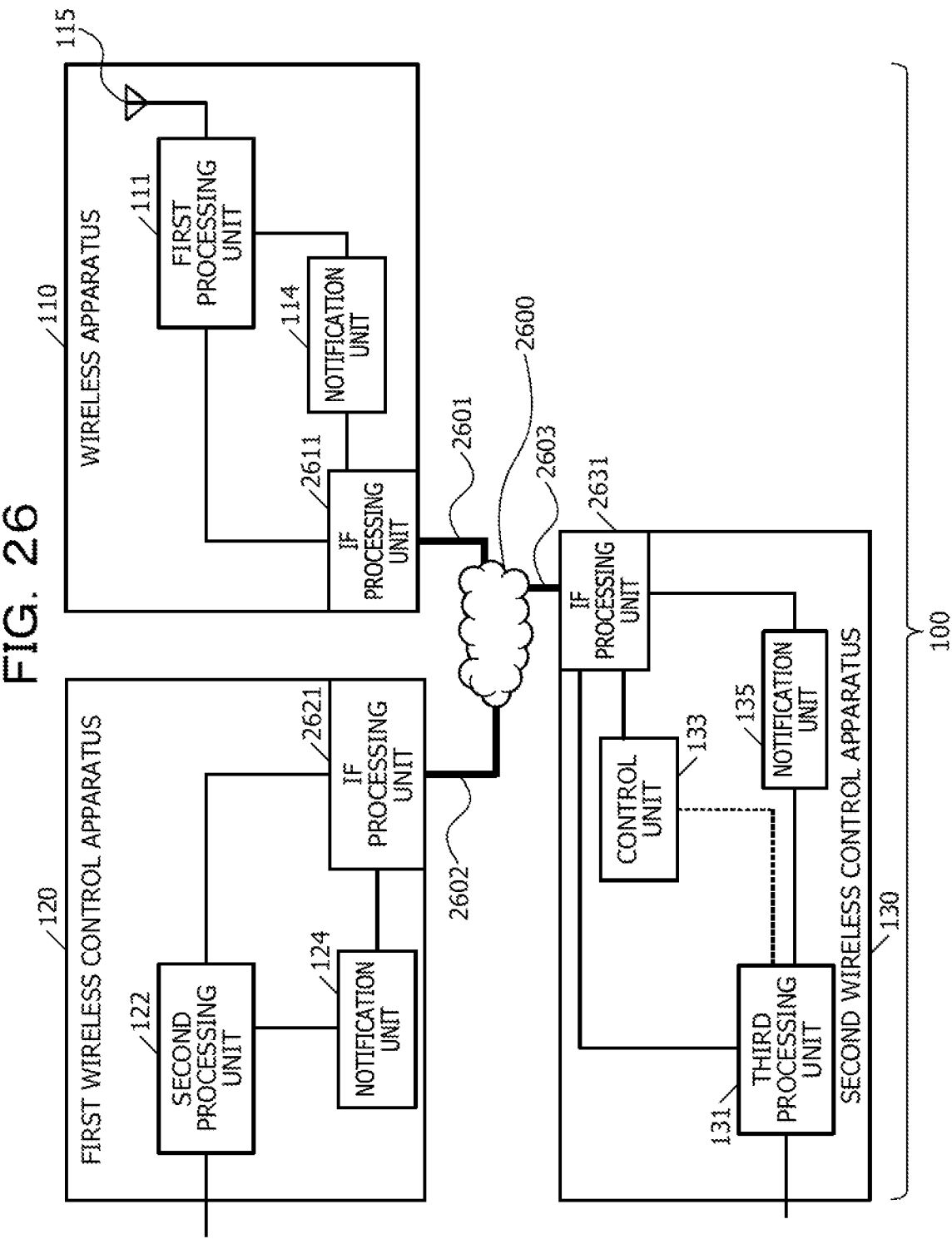
FIG. 26 is a diagram illustrating an example of a wireless base station according to a sixth embodiment.

FIG. 26 is a diagram illustrating an example of a wireless base station according to a sixth embodiment. In FIG. 26, a portion that is the same as the portion that is illustrated in FIG. 1 or 20 is given the same reference numeral and a description thereof is omitted. As illustrated in FIG. 26, for example, the IF processing units 112 and 113 of the wireless apparatus 110, which are illustrated in FIG. 1, may be realized by one IF processing unit 2611.

The IF processing unit 2611 is connected to a network 2600 via a transfer path 2601, and may communicate with each of the first wireless control apparatus 120 and the second wireless control apparatus 130 through the network 2600. The transfer path 2601, for example, is physically a single transfer path. As an example, networks 2600 may include various networks such as the Internet.

Furthermore, for example, the IF processing unit 2011 that is illustrated in FIG. 20 may also be realized by the IF processing unit 2611. In this case, the IF processing unit 2611 may communicate with any other wireless apparatus (for example, any other DU) or a higher layer apparatus for the wireless base station 100, through the network 2600.

Furthermore, as illustrated in FIG. 26, for example, the IF processing units 121 and 123 of the first wireless control apparatus 120, which are illustrated in FIG. 1, may be realized by one IF processing unit 2621. The IF processing unit 2621 is connected to the network 2600 via a transfer path 2602, and may communicate with each of the wireless apparatus 110 and the second wireless control apparatus 130 through the network 2600. The transfer path 2602, for example, is physically a single transfer path.

Furthermore, for example, the IF processing unit 2021 that is illustrated in FIG. 20 may also be realized by the IF processing unit 2621. In this case, the IF processing unit 2621 may communicate with any other first wireless control apparatus (for example, any other CU-U) or a higher layer apparatus for the wireless base station 100, through the network 2600.

Furthermore, as illustrated in FIG. 26, for example, the IF processing units 132 and 134 of the second wireless control apparatus 130, which are illustrated in FIG. 1, may be realized by one IF processing unit 2631. The IF processing unit 2631 is connected to the network 2600 via a transfer path 2603, and may communicate with each of the wireless apparatus 110 and the first wireless control apparatus 120 through the network 2600. The transfer path 2603, for example, is physically a single transfer path.

Furthermore, for example, the IF processing unit 2031 that is illustrated in FIG. 20 may also be realized by the IF processing unit 2631. In this case, the IF processing unit 2631 may communicate with any other second wireless control apparatus (for example, any other CU-C) or a higher layer apparatus for the wireless base station 100, through the network 2600.

As illustrated in FIG. 26, with one IF processing unit, the wireless apparatus 110, the first wireless control apparatus 120, and the second wireless control apparatus 130 may perform communication with each other through the network 2600. Furthermore, with one IF processing unit, each of the wireless apparatus 110, the first wireless control apparatus 120, and the second wireless control apparatus 130 may perform communication with a higher layer apparatus for the wireless base station 100, through the network 2600.

For example, in 5G, there is a likelihood that lines which are all physically the same will connect such as between CUs, between CU-Us, between CU-C and DU, between CU-U and DU, between CU-C and AMF, and between CU-U and UPF, respectively. However, it is assumed that protocol differs in C-Plane and U-Plane and that identifiers, such as IP addresses, differ. Consequently, at the time of the data transfer and the line setting, identification information within C-Plane and U-Plane is desired.

For example, in a case where CU and DU split is absent, two interfaces, the NG-C interface (between the gNB and the AMF) and the NG-U interface (between the gNB and the UPF) may exist together for a gNB (the ng and the eNB) interface (for example, refer to FIG. 19).

Furthermore, in a case where the CU and DU split is present, three interfaces, the NG-C interface (between the CU-C and the AMF), the E1 interface (between the CU-C and the CU-U), and the F1-C interface (the CU-C and the DU) may exist together for a CU-C interface. Then, in some cases, these interfaces differ in a transfer method such as a protocol, according to the split point of the base station signal processing.

Furthermore, in the case where the CU and DU split is present, three interfaces, the E1 interface (between the CU-U and the CU-C), the NG-U interface (between the CU-U and the UPF), and the F1-U interface (the CU-U and the DU) may exist together for a CU-U interface. Then, in some cases, these interfaces differ in the transfer method such as a protocol, according to the split point of the base station signal processing.

In an example that is illustrated in FIG. 26, signals that are transmitted by the IF processing unit 2621 of the first wireless control apparatus 120 (the CU-U) include a signal for the wireless apparatus 110 (the DU), a signal for the second wireless control apparatus 130 (the CU-C), and a signal for a higher layer apparatus (the AMF, alternatively the SMF).

In contrast, for example, the second processing unit 122 may output a destination indicating the wireless apparatus 110 and identification information in accordance with processing that is included in the first signal processing by the wireless apparatus 110, to the IF processing unit 2621, in a state of being added to a signal for the wireless apparatus 110. The identification information, for example, is information that may specify a transfer method (for example, a protocol) in accordance with the split point of the base station signal processing, for transferring a signal that is to be transmitted from the first wireless control apparatus 120 to the wireless apparatus 110.

Furthermore, for example, the second processing unit 122 may output a destination indicating the second wireless control apparatus 130 and identification information in accordance with processing that is included in the third signal processing by the second wireless control apparatus 130, to the IF processing unit 2621, in a state of being added to a signal for the second wireless control apparatus 130. This identification information, for example, is information that may specify a transfer method in accordance with the split point of the base station signal processing, for transferring a signal that is to be transmitted from the first wireless control apparatus 120 to the second wireless control apparatus 130.

Furthermore, for example, the second processing unit 122 may output a destination indicating a higher layer apparatus for the wireless base station 100, and identification information to the IF processing unit 2621, in a state of being added to a signal for the higher layer apparatus for the wireless base station 100. This identification information, for example, is information that may specify a transfer method for transferring a signal that is to be transmitted from the first wireless control apparatus 120 to the higher layer apparatus for the wireless base station 100.

The IF processing unit 2621 transmits each signal that is output from the second processing unit 122 to the wireless apparatus 110, the second wireless control apparatus 130, or a higher layer apparatus for the wireless base station 100, according to a destination of the signal through the network 2600.

At this time, based on the identification information that is added to the signal for the wireless apparatus 110, the IF processing unit 2621 specifies a transfer method (for example, a protocol) for transferring the signal through the network 2600. Then, the IF processing unit 2621 transmits the signal to the wireless apparatus 110 through the network 2600 using the specified transfer method.

Furthermore, based on the identification information that is added to the signal for the second wireless control apparatus 130, the IF processing unit 2621 specifies a transfer method (for example, a protocol) for transferring the signal through the network 2600. Then, the IF processing unit 2621 transmits the signal to the second wireless control apparatus 130 through the network 2600 using the specified transfer method.

Furthermore, based on the identification information that is added to the signal for the higher layer apparatus for the wireless base station 100, the IF processing unit 2621 specifies a transfer method (for example, a protocol) for transferring the signal through the network 2600. Then, the IF processing unit 2621 transmits the signal to the higher layer apparatus for the wireless base station 100, through the network 2600 using the specified transfer method.

Regarding a signal that is transmitted from the first wireless control apparatus 120 through the network 2600, the IF processing unit 2611 of the wireless apparatus 110 specifies a method for transferring the signal based on the identification information that is added to the signal, and receives the signal using the specified transfer method. Regarding the signal that is transmitted from the first wireless control apparatus 120 through the network 2600, the IF processing unit 2631 of the second wireless control apparatus 130 specifies the method for transferring the signal based on the identification information that is added to the signal, and receives the signal using the specified transfer method. Regarding the signal that is transmitted from the first wireless control apparatus 120 through the network 2600, a higher layer apparatus for the wireless base station 100 specifies the method for transferring the signal based on the identification information that is added to the signal, and receives the signal using the specified transfer method.

Furthermore, signals that are transmitted by the IF processing unit 2631 of the second wireless control apparatus 130 (the CU-C) include the signal for the wireless apparatus 110 (the DU), the signal for the first wireless control apparatus 120 (the CU-U), and a signal for a higher layer apparatus (the AMF or the SMF).

In contrast, for example, the third processing unit 131 and the control unit 133 may output the destination indicating the wireless apparatus 110 and the identification information in accordance with the processing that is included in the first signal processing by the wireless apparatus 110, to the IF processing unit 2631, in the state of being added to the signal for the wireless apparatus 110. The identification information, for example, is information that may specify the transfer method in accordance with the split point of the base station signal processing, for transferring a signal that is to be transmitted from the second wireless control apparatus 130 to the wireless apparatus 110.

Furthermore, the third processing unit 131 and the control unit 133 may output a destination indicating the first wireless control apparatus 120 and identification information in accordance with processing that is included in the second signal processing by the first wireless control apparatus 120 to the IF processing unit 2631, in a state of being added to the signal for the first wireless control apparatus 120. This identification information, for example, is information that may specify a transfer method in accordance with the split point of the base station signal processing, for transferring a signal that is to be transmitted from the second wireless control apparatus 130 to the first wireless control apparatus 120.

Furthermore, the third processing unit 131 and the control unit 133 may output a destination indicating a higher layer apparatus for the wireless base station 100 and identification information to the IF processing unit 2631, in a state of being added to the signal for the higher layer apparatus for the wireless base station 100. This identification information, for example, is information that may specify a transfer method for transferring a signal that is to be transmitted from the second wireless control apparatus 130 to the higher layer apparatus for the wireless base station 100.

The IF processing unit 2631 transmits each signal that is output from the third processing unit 131 or the control unit 133 to the wireless apparatus 110, the first wireless control apparatus 120, or a higher layer apparatus for the wireless base station 100, according to a destination of the signal through the network 2600.

At this time, based on the identification information that is added to the signal for the wireless apparatus 110, the IF processing unit 2631 specifies the transfer method (for example, the protocol) for transferring the signal through the network 2600. Then, the IF processing unit 2631 transmits the signal to the wireless apparatus 110 through the network 2600 using the specified transfer method.

Furthermore, based on the identification information that is added to the signal for the first wireless control apparatus 120, the IF processing unit 2631 specifies the transfer method (for example, the protocol) for transferring the signal through the network 2600. Then, the IF processing unit 2631 transmits the signal to the first wireless control apparatus 120 through the network 2600 using the specified transfer method.

Furthermore, based on the identification information that is added to the signal for the wireless base station 100, the IF processing unit 2631 specifies the transfer method (for example, the protocol) for transferring the signal through the network 2600. Then, the IF processing unit 2631 transmits the signal to a higher layer apparatus for the wireless base station 100, through the network 2600 using the specified transfer method.

Regarding a signal that is transmitted from the second wireless control apparatus 130 through the network 2600, the IF processing unit 2611 of the wireless apparatus 110 specifies a method for transferring the signal based on the identification information that is added to the signal, and receives the signal using the specified transfer method. Regarding the signal that is transmitted from the second wireless control apparatus 130 through the network 2600, the IF processing unit 2621 of the first wireless control apparatus 120 specifies the method for transferring the signal based on the identification information that is added to the signal, and receives the signal using the specified transfer method. Regarding the signal that is transmitted from the second wireless control apparatus 130 through the network 2600, a higher layer apparatus for the wireless base station 100 specifies the method for transferring the signal based on the identification information that is added to the signal, and receives the signal using the specified transfer method.

In this manner, each of the wireless apparatus 110, the first wireless control apparatus 120, and the second wireless control apparatus 130 gives a signal identification information in accordance with the split point (an apparatus category) of the base station signal processing, and performs communication between apparatuses. Accordingly, although, regarding communications each of which uses a common IF processing unit (a transfer path), for example, there may exist together communications among which the transfer method such as the protocol differs, each of the communications may be performed using a suitable transfer method.

Furthermore, for example, in a case where the IF processing unit 2621 of the first wireless control apparatus 120 performs communication with any other first wireless control apparatus (the CU-U), a signal for any other first wireless control apparatus (the CU-U) is also further included in a signal that is to be transmitted by the IF processing unit 2621. In contrast, for example, the second processing unit 122 may output a destination indicating any other first wireless control apparatus (the CU-U) and identification information to the IF processing unit 2621, in a state of being added to a signal for any other first wireless control apparatus (the CU-U). This identification information, for example, is information that may specify a transfer method (for example, a protocol) in accordance with the split point of the base station signal processing, for transferring a signal that is to be transmitted from the first wireless control apparatus 120 to any other first wireless control apparatus (the CU-U).

The IF processing unit 2621 transmits a signal for any other first wireless control apparatus (the CU-U), which is output from the second processing unit 122, to any other first wireless control apparatus (the CU-U) through the network 2600. Regarding a signal that is transmitted from any other first wireless control apparatus 120 through the network 2600, any other first wireless control apparatus (the CU-U)

specifies the method for transferring the signal based on the identification information that is added to the signal, and receives the signal using the specified transfer method.

Furthermore, for example, in a case where the IF processing unit 2631 of the second wireless control apparatus 130 performs communication with any other second wireless control apparatus (the CU-C), a signal for any other second wireless control apparatus (the CU-C) is also further included in a signal that is to be transmitted by the IF processing unit 2631. In contrast, for example, the third processing unit 131 and the control unit 133 may output a destination indicating any other second wireless control apparatus (the CU-C) and identification information to the IF processing unit 2631, in a state of being added to a signal for any other second wireless control apparatus (the CU-C). This identification information, for example, is information that may specify a transfer method (for example, a protocol) in accordance with the split point of the base station signal processing, for transferring a signal that is to be transmitted from the second wireless control apparatus 130 to any other second wireless control apparatus (the CU-C).

The IF processing unit 2631 transmits a signal for any other second wireless control apparatus (the CU-C), which is output from the third processing unit 131 or the control unit 133, to any other second wireless control apparatus (the CU-C) through the network 2600. Regarding a signal that is transmitted from any other second wireless control apparatus 130 through the network 2600, any other second wireless control apparatus (the CU-C) specifies the method for transferring the signal based on the identification information that is added to the signal, and receives the signal using the specified transfer method.

In this manner, with the wireless base station 100 according to the sixth embodiment, for example, the first wireless control apparatus 120 performs control of a method for transferring each signal between a plurality of apparatuses based on the identification information in accordance with the F1 configuration in any other wireless base station. The plurality of apparatuses include the first wireless control apparatus (for example, any other CU-U) in any other wireless base station, and an apparatus (for example, the CU-C, the DU, alternatively a higher layer apparatus) that is different from the first wireless control apparatus in any other wireless base station. Accordingly, in a case where, for example, signal transfer to and from the first wireless control apparatuses (for example, to and from the CU-U) and any other signal transfer are performed via a transfer path (for example, the transfer path 2602) that is physically single, it is also possible that the first wireless control apparatus 120 performs these two signal transfer operations in a mutually identified manner.

Furthermore, the second wireless control apparatus 130 performs the control of the method for transferring each signal between the plurality of apparatuses based on the identification information in accordance with the F1 configuration in any other wireless base station. The plurality of apparatuses include the second wireless control apparatus (for example, any other CU-C) in any other wireless base station, and an apparatus (for example, the CU-U, the DU, or a higher layer apparatus) that is different from the first wireless control apparatus in any other wireless base station. Accordingly, in a case where, for example, signal transfer to and from between the second wireless control apparatus (for example, to and from the CU-C) and any other signal transfer are performed via a single transfer path (for example, the transfer path 2603) that is physically single, it is also possible that the second wireless control apparatus 130 performs these two signal transfer operations in a mutually identified manner.

Seventh Embodiment

Portions that distinguish a seventh embodiment from the first to sixth embodiments are described. In the seventh embodiment, a configuration is described in which the wireless base station 100 transmits the F1 configuration information to a higher layer apparatus.

(Notification of the F1 Configuration Information to the Higher Layer Apparatus According to the Seventh Embodiment)

Figure 27:
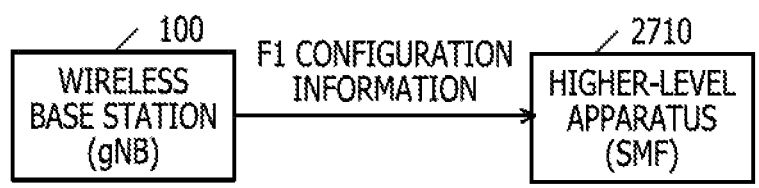
FIG. 27 is a diagram illustrating an example of notification of the F1 configuration information to a higher layer apparatus according to a seventh embodiment.

FIG. 27 is a diagram illustrating an example of notification of the F1 configuration information to the higher layer apparatus according to the seventh embodiment. A higher layer apparatus 2710 illustrated in FIG. 27 may be a higher layer apparatus for the wireless base station 100 (for example, the gNB), and, as an example, may be the SMF 1952 illustrated in FIG. 19. As illustrated in FIG. 27, the wireless base station 100 may transmit the F1 configuration information of the wireless base station 100 to the higher layer apparatus 2710. The transmission of the F1 configuration information, for example, may be performed when the wireless base station 100 sets its own F1 configuration, and may be periodically performed.

For example, as illustrated in FIG. 19, a PDU session is established for data that flows through the UPF 1940, the gNB, and the UE 1901, and thus data is transferred between the UPF 1940 and the UE 1901 via the gNB. The gNB, for example, is realized by the DU 1910, the CU-U 1920, and the CU-C 1930, which are described above.

Then, establishment of the PDU session is performed by the SMF 1952 requesting the UPF 1940, the gNB, and the UE 1901 to establish the PDU session. It is noted that a tunnel is established through the NG-U between the UPF 1940 and the gNB, and a Radio Bearer is established between the gNB and the UE 1901.

Moreover, QoS is set for flow (flow of data) that is transferred with the PDU session. That is, a data transfer rate or a maximum amount of allowance delay, and like are set by the SMF 1952, and, according to these that are set, data transfer is performed in the UPF 1940, the gNB, and the UE 1901.

Furthermore, as the reasons for the mixed presence of different F1 configuration, a difference in transfer delay due to advantages and disadvantages of the HLS and the LLS and a difference in suitable service (for example, eMBB, URLLC, and mMTC) are given.

Consequently, the F1 configuration that satisfies the QoS is desirable for every service. In other words, in order to establish the PDU section (an NG-U Tunnel and a Radio Bearer) that is to be set to be among the UPF 1940, the gNB, and the UE 1901, it is desirable for the SMF 1952 to recognize the F1 configuration.

For this reason, for example, the wireless base station 100 (for example, the gNB) may transmit the F1 configuration information of the wireless base station 100 itself to the SMF 1952. Accordingly, it is possible that the SMF 1952 determines the FI configuration of the wireless base station 100, and that sets the PDU section that is to be set to be among the UPF 1940, the gNB, and the UE 1901.

For the transmission of the F1 configuration information, for example, the IF processing unit 2011, 2021, or 2031, or any combination thereof, which is illustrated in FIG. 20, may be used. Alternatively, for the transmission of the F1 configuration information, the IF processing units 2611, 2621, or 2631, or any combination thereof, which is illustrated in FIG. 26, may be used.

The configuration is described in which the SMF 1952 sets the PDU session that is to be set to be between the gNB and the UE 1901, but, for example, a configuration may be employed in which the AMF 1951 sets the PDU session that is to be set to be between the gNB and the UE 1901. In this case, the wireless base station 100 may transmit the F1 configuration information of the wireless base station 100 itself to the AMF 1951. Accordingly, it is possible that the AMF 1951 determines the F1 configuration of the wireless base station 100, and sets the PDU section that is to be set to be among the UPF 1940, the gNB, and the UE 1901.

(Notification of CP and UP Split Implementation Information to a Higher Layer Apparatus According to the Seventh Embodiment)

Figure 28:
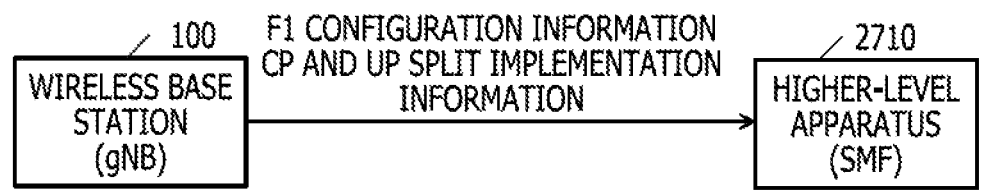
FIG. 28 is a diagram illustrating an example of notification of CP and UP split implementation information to the higher layer apparatus according to the seventh embodiment.

FIG. 28 is a diagram illustrating an example of notification of CP and UP split implementation information to the higher layer apparatus according to the seventh embodiment. In FIG. 28, a portion that is the same as the portion that is illustrated in FIG. 27 is given the same reference numeral and a description thereof is omitted. As illustrated in FIG. 28, the wireless base station 100 may transmit the CP and UP split implementation information indicating whether or not the wireless base station 100 itself performs the CP and UP split that splits the CU into the CU-U and the CU-C, as well as the F1 configuration information of the wireless base station 100, to the higher layer apparatus 2710.

For example, the SMF 1952 recognizes the gNB that employs the F1 configuration which satisfies the QoS in accordance with a service, and then performs a connection between the gNB and the UPF 1940 and setting of the QoS. At this point, in the example that is illustrated in FIG. 19, in a case where the CD is split into C-plane and U-plane, the UPF 1940 and the CU-U 1920 are connected to each other. On the other hand, in a case where the CU is not split into C-plane and U-plane, the UPF 1940 and the gNB are connected to each other. Consequently, the SMF 1952 is requested to recognize whether or not the CU is split into C-plane and U-plane. In other words, the CU-C 1930 (for example, the CU, or the gNB) is requested to notify the SMF 1952 that the CU is split into C-plane and U-plane.

For this reason, for example, the wireless base station 100 (for example, the gNB) transmits the CP and UP split implementation information indicating whether or not the C and U split (the CP and UP split) is performed by the wireless base station 100 itself, in addition to the F1 configuration information, to the SMF 1952. Accordingly, it is possible that the SMF 1952 determines whether or not the CU of the wireless base station 100 is split into C-plane and U-plane and performs the connection between the gNB and the UPF 1940 and setting of the QoS.

For the transmission of the CP and UP split implementation information, for example, the IF processing units 2011, 2021, or 2031, or any combination thereof, which is illustrated in FIG. 20, may be used. Alternatively, for the transmission of the F1 configuration information, the IF processing units 2611, 2621, or 2631, or any combination thereof, which is illustrated in FIG. 26, may be used.

The configuration is described in which the SMF 1952 performs the connection between the gNB and the UPF 1940, or the like, but a configuration may be employed in which the AMF 1951 performs the connection between the gNB and the UPF 1940, or the like. In this case, the wireless base station 100 may transmit the CP and UP split implementation information, as well as the F1 configuration information, to the AMF 1951. Accordingly, it is determined that the AMF 1951 determines whether or not the CU of the wireless base station 100 is split into C-plane and U-plane, and performs the connection between the gNB and the UPF 1940, or the like.

In this manner, with the wireless base station 100 according to the seventh embodiment, a higher layer apparatus for the wireless base station 100 may be notified of the fifth information (for example, the F1 configuration information) that includes information relating to the first signal processing, the second signal processing, or the third signal processing, or any combination thereof. Accordingly, it is possible that the higher layer apparatus for the wireless base station 100 itself determines a configuration (the F1 configuration) in accordance with the split point of the base station signal processing by the wireless base station 100 and sets the session (for example, the PDU session) in U-Plane.

Eighth Embodiment

Portions that distinguish an eighth embodiment from the first to seventh embodiments are described. In the eighth embodiment, a configuration is described in which information relating to each split point (for example, the F1 configuration) of the base station signal processing, correspondence to which is possible is transmitted and received.

(F1 Capability Information that is Transmitted and Received in Each Apparatus According to the Eighth Embodiment)

FIG. 29 is a diagram illustrating an example of F1 capability information that is transmitted and received in each apparatus according to the eighth embodiment. Each of the wireless apparatus 110, the first wireless control apparatus 120, and the second wireless control apparatus 130 according to the eighth embodiment, for example, may transmit and receive configuration information indicating a category that is defined in an F1 capability table 2900 which is illustrated in FIG. 29.

A category (F1 capability information) indicating a combination of enabled and disabled states of implementation of the HLS, the LLS, and the CPRI is defined in the F1 capability table 2900. In the F1 performance table 2900, "1" denotes that the implementation is enabled and "0" denotes that the implementation is disabled. For example, category "0" denotes that the HLS is implementation-enabled and that the LLS and the CPRI are implementation-disabled. Category "1" denotes that the HLS and the LLS are implementation-enabled, and the CPRI is implementation-disabled.

For example, in a case where the HLS is implementation-enabled and the LLS and the CPRI is implementation-disabled, the wireless apparatus 110 transmits configuration information indicating category "0" to the first wireless control apparatus 120 or the second wireless control apparatus 130. Furthermore, in a case where, in the wireless apparatus 110 itself, the HLS and the LLS are implementation-enabled and the CPRI is implementation-disabled, the wireless apparatus 110 transmits configuration information indicating category "1" to the first wireless control apparatus 120 or the second wireless control apparatus 130. The transmission of the configuration information by the wireless apparatus 110 is described, but the same is also true with the transmission of the configuration information by the first wireless control apparatus 120 and the second wireless control apparatus 130.

FIG. 30 is a diagram illustrating another example of the F1 capability information that is transmitted and received in each apparatus according to the eighth embodiment. Each of the wireless apparatus 110, the first wireless control apparatus 120, and the second wireless control apparatus 130 according to the eighth embodiment, for example, may transmit and receive configuration information indicating a category that is defined in an F1 capability table 3000 which is illustrated in FIG. 30.

A category (the F1 capability information) indicating a combination of enabled and disabled states of implementation of the eMBB, the URLLC, and the mMTC is defined in the F1 capability table 3000. In the F1 capability table 3000, "1" denotes that the implementation is enabled and "0" denotes that the implementation is disabled. For example, category "a" denotes that the eMBB is implementation-enabled and the URLLC and the mMTC are implementation-disabled. Category "b" denotes that the eMBB and the mMTC are implementation-enabled and the URLLC is implementation-disabled.

For example, in a case where the eMBB is implementation-enabled and the URLLC and the mMTC are implementation-disabled, the wireless apparatus 110 transmits configuration information indicating category "a" to the first wireless control apparatus 120 or the second wireless control apparatus 130. Furthermore, in a case where, in the wireless apparatus 110 itself, the eMBB and the mMTC are implementation-enabled and the URLLC is implementation-disabled, the wireless apparatus 110 transmits configuration information indicating category "b" to the first wireless control apparatus 120 or the second wireless control apparatus 130. The transmission of the configuration information by the wireless apparatus 110 is described, but the same is also true with the transmission of the configuration information by the first wireless control apparatus 120 and the second wireless control apparatus 130.

Furthermore, as examples of the service, the eMBB, the URLLC, and the mMTC are given, but enabled and disabled states of implementation of any other service or each of the more detailed services (automatic operation or streaming delivery) may be defined in the F1 capability table 3000. Furthermore, in a network in which a slice is set for every service, support or non-support for each slice may be defined in the F1 capability table 3000. Alternatively, the support or non-support for each communication condition, such as a maximum transfer delay or a guaranteed transfer rate, may be defined in the F1 capability table 3000. Alternatively, support or non-support for the CP/CU split may be defined in the F1 capability table 3000.

FIG. 31 is a diagram illustrating a further example of the F1 capability information that is transmitted and received in each apparatus according to the eighth embodiment. Each of the wireless apparatus 110, the first wireless control apparatus 120, and the second wireless control apparatus 130 according to the eighth embodiment, for example, may transmit and receive configuration information indicating a category that is defined in a F1 capability table 3100 which is illustrated in FIG. 31.

A category (the F1 capability information) indicating a combination of enabled and disabled states of implementation of the CP and the CU split by the CU and the CP and the CU split by the DU is defined in the F1 capability table 3100. In the F1 capability table 3100, "1" denotes that the implementation is enabled and "0" denotes that the implementation is disabled. For example, category "A" denotes that the CP/CU split by any one of the CU and the DU is implementation-disabled. Furthermore, category "B" denotes that the CP/CU split by the CU is implementation-enabled, but that the CP/CU split by the DU is implementation-disabled.

For example, in a case where the CP/CU split by the DU is implementation-enabled and the CP/CU split by the CU is implementation-disabled, the wireless apparatus 110 transmits configuration information indicating category "C" to the first wireless control apparatus 120 or the second wireless control apparatus 130. Furthermore, in a case where the CP/CU split by any one of the CU and the DU is implementation-enabled, the wireless apparatus 110 transmits configuration information indicating category "D" to the first wireless control apparatus 120 or the second wireless control apparatus 130. The transmission of the configuration information by the wireless apparatus 110 is described, but the same is also true with the transmission of the configuration information by the first wireless control apparatus 120 and the second wireless control apparatus 130.

As illustrated FIGS. 29 and 31, each of the wireless apparatus 110, the first wireless control apparatus 120, and the second wireless control apparatus 130 may transmit and receive information relating to each F1 configuration, correspondence to which is possible, without being limited to the information relating to one F1 configuration.

For example, in Network Function Virtualization (NFV), in some cases, a plurality of F1 configurations to which each of the wireless apparatus 110, the first wireless control apparatus 120, and the second wireless control apparatus 130 may correspond are present. In such a case, the wireless apparatus 110, the first wireless control apparatus 120, and the second wireless control apparatus 130 exchange pieces of configuration information indicating categories that correspond to pieces of F1 configuration to which the wireless apparatus 110, the first wireless control apparatus 120, and the second wireless control apparatus 130 themselves, respectively, may correspond, with each other and thus may realize more flexible F1 configurations that in the wireless base station 100.

In this manner, with the wireless base station 100 according to the eighth embodiment, the information relating to each split point of the base station signal processing, correspondence to which is possible is transmitted and received, and thus, it is possible that the split point of more flexible base station signal processing is realized.

Furthermore, regarding identification information on the CU or the DU, when setting F1 or E1, identification information for specifying the CU or the DU may be notified. At this time, the identification information for the CU or the DU may be set to be a global address or an address of every operator that does not depend on the cell ID. Alternatively, the identification information on the CU or the DU may be set to be a global or private IP address.

Ninth Embodiment

Portions that distinguish a ninth embodiment from the first to eighth embodiments are described. In the ninth embodiment, for example, as illustrated in FIG. 26, a signal format in a case where a plurality of signal transfers may exist together along a transfer path that is physically single is described.

(Format of a Signal to which the Identification Information According to the Ninth Embodiment is Added)

Figure 32:
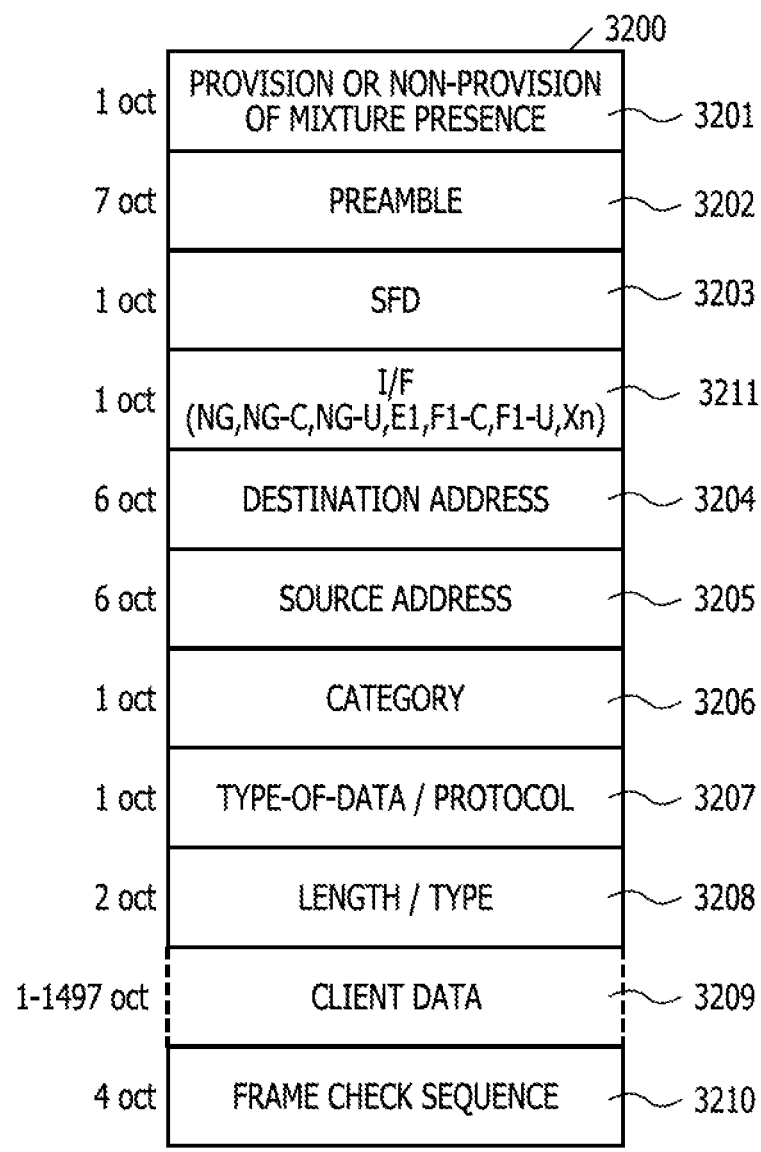
FIG. 32 is a diagram illustrating an example of a format of a signal to which identification information according to a ninth embodiment is added.

FIG. 32 is a diagram illustrating an example of a format of a signal to which identification information according to the ninth embodiment is added. For example, in the wireless base station 100 that is illustrated in FIG. 26, each of the IF processing units 2611, 2621, and 2631 transfers, for example, a signal 3200 that is illustrated in FIG. 32, through the network 2600.

The signal 3200 includes mixture presence information 3201, a preamble 3202, an SFD 3203, a destination address 3204, a source address 3205, a category 3206, and a data type/protocol information 3207. Furthermore, the signal 3200 includes a length/type information 3208, a client data 3209, and a frame check sequence 3210. SFD is short for Start Frame Delimitor. Furthermore, the signal 3200 may further include IF name information 3211. It is noted that a line of pieces of information of the signal 3200 which is illustrated in FIG. 32 is only an example, and may be voluntarily changed.

The mixture presence information 3201 is one-octet (oct) information indicating whether or not the mixture presence of communications between different apparatuses is provided. For example, in an example that is illustrated in FIG. 20, because the communications between different apparatuses may exist together, the mixture presence information 3201 is a value indicating whether or not the mixture presence is provided. However, for example, in a case where the mobile communication network is provided on the assumption that the communications between different apparatuses may exist together, the mixture presence information 3201 is omitted from the signal 3200. It is noted that the information is described as being one-octet long, but that the information may be multiple octets long and be less than one octet long (that is, less than eight bits) without being limited in an amount of information. In the same manner, the description is provided below on the assumption that no limitation is imposed in the amount of information.

The preamble 3202 is a given seven-octet pattern. The SFD 3203 is one-octet information indicating a starting point of a frame. The destination address 3204 is six-octet information indicating an identifier of a destination of the signal 3200. The source address 3205 is six-octet information indicating an identifier of a transmission source of the signal 3200. It is noted that the destination address 3204 and the source address 3205, for example, are not specified for the use of the CPRI, but that the destination address 3204 and the source address 3205, as illustrated in FIG. 32, may be used for the signal 3200.

The category 3206 is one-octet information indicating a category in accordance with the split point (the F1 configuration) of the base station signal processing that corresponds to the signal 3200. The split point of the base station signal processing that corresponds to the signal 3200, for example, is the split point of the base station signal processing to which the apparatus that transmits or receives the signal 3200 corresponds.

The data type/protocol information 3207 is one-octet information indicating at least one of a type of data of the signal 3200 at the time of the transfer along an interface between the CU and the DU, and a protocol for transferring the signal 3200 along the interface between the CU and the DU. Each of the type of data and the protocol differs with the split point of the base station signal processing, which is indicated by the category 3206. It is noted that the type of data, for example, is any one of the user data and the control information.

The length/type information 3208 is two-octet information indicating by which one of the single hop and the multi-hop the signal 3200 is transferred. The client data 3209 is data that is transferred along the interface between the CU and the DU. The type of data of the client data 3209 differs with the split point of the base station signal processing, which is indicated by the category 3206. The frame check sequence 3210 is four-octet redundant information for detecting an error in the signal 3200. It is noted that, as is the case with the above-described cascade connection, the multi-hop is a format for performing the data transfer between a transmission source and a transmission destination through a plurality of apparatuses and the single hop is a format for performing the data transfer directly between the transmission source and the transmission destination without any other apparatus in between.

The identification information described above, for example, may be realized by at least one of the category 3206 and the data type/protocol information 3207. For example, in a case where the identification information is realized by the category 3206, the data type/protocol information 3207 may be omitted from the signal 3200. Furthermore, in a case where the identification information is realized by the data type/protocol information 3207, the category 3206 may be omitted from the signal 3200.

For example, it is possible that the IF processing unit 2621 of the first wireless control apparatus 120 receives at least the category 3206 or the data type/protocol information 3207 in the signal 3200 that is input, without depending on the split point of the base station signal processing that corresponds to the signal 3200 that is input. Furthermore, based on at least one of the category 3206 and the data type/protocol information 3207, the IF processing unit 2621 determines the split point of the base station signal processing that corresponds to the signal 3200. Then, based on a result of the determination, the IF processing unit 2621 changes a method for transferring the client data 3209. The processing in which the IF processing unit 2621 changes the transfer method based on the identification information is described, but the same is also true with processing in which the IF processing units 2611 and 2631 change the transfer method based on the identification information.

Furthermore, the identification information described above, for example, may be realized by at least one of the category 3206 and the data type/protocol information 3207, and the IF name information 3211. The IF name information 3211, for example, indicates any one of the NG, NG-C, NG-U, E1, F1-C, F1-U, and Xn interfaces.

For example, the same protocol (SCTP or GTP-U) is used for each of the F1, E1, D1, and NG IFs. That is, in these interfaces, the control information is transferred using SCTP, and the user data is transferred using GTP-U. It is noted that the D1 interface is the inter-CU-C interface and the inter-CU-U interface.

Furthermore, the type of data is any one of the user data and the control information. For this reason, in some cases, only with the category 3206 and the data type/protocol information 3207, a signal in each of the communications that may exist together is difficult to identify. In contrast, the IF name information 3211 is also further used as the identification information, and thus, the signal in each of the communications may be identified more suitably.

Figure 33:
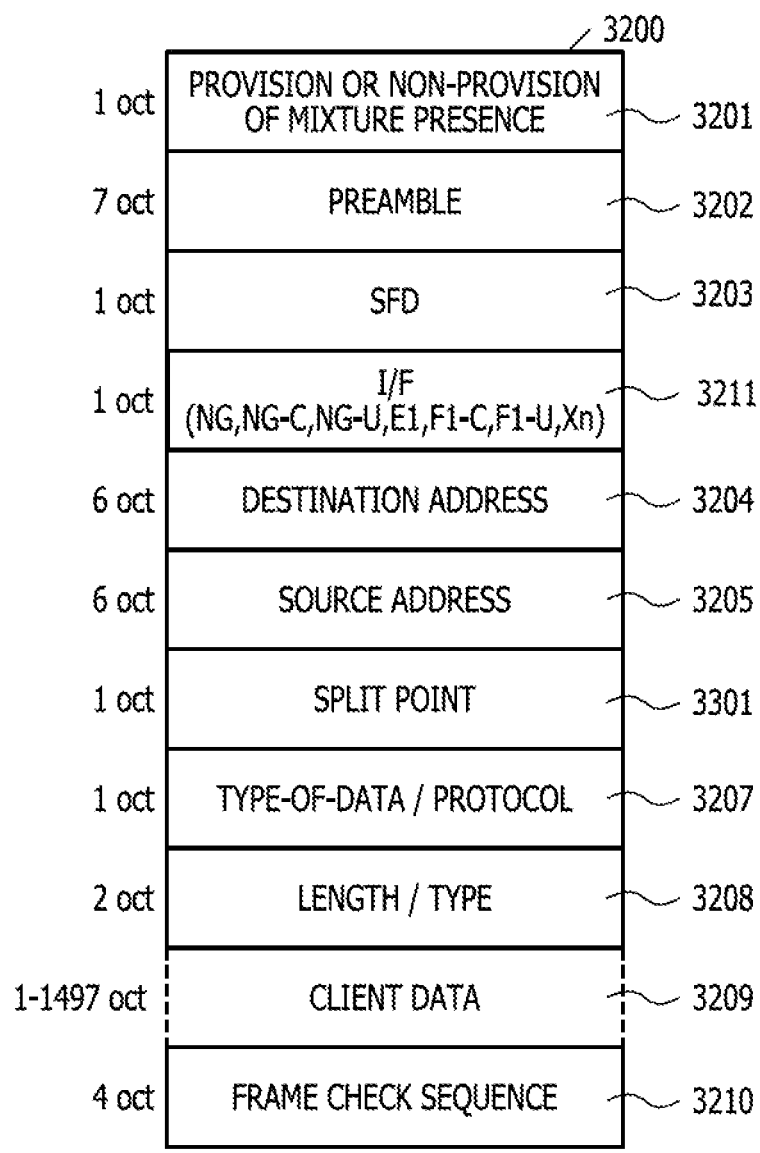
FIG. 33 is a diagram illustrating another example of the format of the signal to which the identification information according to the ninth embodiment is added.

FIG. 33 is a diagram illustrating another example of the format of the signal to which the identification information according to the ninth embodiment is added. In FIG. 33, a portion that is the same as the portion that is illustrated in FIG. 32 is given the same reference numeral and a description thereof is omitted. For example, in the wireless base station 100 that is illustrated in FIG. 26, each of the IF processing units 2611, 2621, and 2631 transfers, for example, the signal 3200 that is illustrated in FIG. 33, through the network 2600.

The signal 3200 that is illustrated in FIG. 33 includes a split point 3301 instead of the category 3206 in the signal 3200 that is illustrated in FIG. 32. The split point 3301 is one-octet information indicating the split point of the base station signal processing that corresponds to the signal 3200.

The identification information described above, for example, may be realized by at least one of the split point 3301 and the data type/protocol information 3207. For example, in a case where the identification information is realized by the split point 3301, the data type/protocol information 3207 may be omitted from the signal 3200. Furthermore, in the case where the identification information is realized by the data type/protocol information 3207, the split point 3301 may be omitted from the signal 3200. Furthermore, the identification information described above, for example, may be realized by at least one of the split point 3301 and the data type/protocol information 3207, and the IF name information 3211.

In this manner, with the wireless base station 100 according to the ninth embodiment, in a case where a plurality of signal transfers may exist together along the transfer path that is physically single, each of the signal transfers may also be performed in an identified manner.

As described above, with the wireless base station, the wireless apparatus, the wireless control apparatus, the wireless communication system, the communication method, and the wireless terminal, a plurality of split points of the signal processing in the wireless base station may be set to exist together.

For example, it is assumed that in the future, with the introduction of massive MIMO or beamforming, the number of antennas increases. In these technologies, transmission data differs from one antenna to another, and the DU is demanded for every antenna. For this reason, an amount of data that is transferred along the interface between the CU-U and the DU increases. In contrast, for example, a transfer speed of the CPRI is 24 [GHz] at a maximum, and there is a likelihood that an increase in the amount of data will not be dealt with. For this reason, a study on a new interface (a protocol) as the interface between the CU-U and the DU is demanded.

Furthermore, a configuration in which a plurality of DUs are connected in a cascade to the CU and multi-hop transfer is performed is studied. In this case, when the split point of the base station signal processing, to which the plurality of DUs correspond, differs, each signal that differs in the type of data is transferred through the interface between the CU-U and the DU. For example, as an example in which the split point of the base station signal processing, to which the plurality of DUs correspond, differs, a configuration in which a DU (for example, an RRH) in 4G and a DU (for example, an RE) in 5G is connected to the CU is considered. Therefore, the correspondence to the plurality of split points of the base station signal processing is demanded for the interface between the CU-U and the DU. RE is short for Radio Equipment (a wireless unit).

Furthermore, in a configuration in which a plurality of CUs are connected in a star-shaped manner to the CU, when the split points of the base station signal processing to which a plurality of DUs correspond differ, each signal that differs in the type of data is also transferred through the interface between the CU-U and the DU that corresponds to each DU. Therefore, specification of a method for transferring a signal that differs with the split point of the base station signal processing is demanded for the interface between the CU-U and the DU that corresponds to each DU.

Furthermore, at present, many candidates for the split point of the base station signal processing have been studied. The candidates for the split point of the base station signal processing, for example, are studied for 3GPP TR 38.801 V0.2.0 6.1.2.1 or the like. Then, it is considered that a plurality of candidates, among these candidates, are employed, and that a plurality of split points of the base station signal processing may exist together within a system or within a wireless base station.

In contrast, according to each of the embodiments described above, it is possible that a plurality of split points of the base station signal processing may exist together.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A wireless base station for wireless communication with a wireless terminal, the wireless base station comprising:
a first processing circuit configured to perform first signal processing that is a part of signal processing in the wireless communication;
a first wireless control processing circuit configured to perform a user plane (U-plane) processing of the wireless communication; and
a second wireless control processing circuit configured to perform a control plane (C-plane) processing of the wireless communication,
wherein the U-plane processing performed in the first wireless control processing circuit comprises performing packet data convergence protocol (PDCP) processing on a U-plane signal,
wherein the C-plane processing performed in the second wireless control processing circuit comprises performing the PDCP processing on a C-plane signal,
wherein the first wireless control processing circuit is configured to notify the second wireless control processing circuit of first information related to the PDCP processing on the U-Plane, and
wherein the second wireless control processing circuit is configured to notify the first wireless control processing circuit of second information to be used in the PDCP processing on the U-Plane, the second information including at least communication path setting between the wireless base station and the wireless terminal.

2. The wireless base station according to claim 1, wherein the first signal processing performed in the first processing circuit includes medium access control (MAC) processing of the wireless communication.

3. The wireless base station according to claim 1, further comprising: an interface configured to couple the first wireless control processing circuit and the second wireless control processing circuit.

4. The wireless base station according to claim 3, wherein the U-plane processing performed in the first wireless control processing circuit is controlled by the second wireless control processing circuit through the interface.

5. The wireless base station according to claim 1, wherein the U-plane part of the PDCP processing of the wireless communication is PDCP-U, and wherein the C-plane part of the PDCP processing of the wireless communication is PDCP-C.

6. The wireless base station according to claim 1, wherein the C-plane processing performed in the second wireless control processing circuit includes radio resource control (RRC) processing of the wireless communication.

7. A first wireless control apparatus to be used in a wireless base station for wireless communication with a wireless terminal, the first wireless control apparatus comprising:

a processing circuit configured to perform user plane (U-plane) processing of the wireless communication;

an interface configured to receive a signal for controlling the U-plane processing of the wireless communication from a second wireless control apparatus, the second wireless control apparatus being configured to perform a control plane (C-plane) processing of the wireless communication, wherein the U-plane processing performed in the first wireless control apparatus comprises performing packet data convergence protocol (PDCP) processing on a U-plane signal, wherein the C-plane processing performed in the second wireless control apparatus comprises performing the PDCP processing on a C-plane signal, wherein the processing circuit is configured to notify, via the interface, the second wireless control apparatus of first information related to the PDCP processing on the U-Plane, and wherein the processing circuit is configured to receive, via the interface from the second wireless control apparatus, second information to be used in the PDCP processing on the U-Plane, the second information including at least communication path setting between the wireless base station and the wireless terminal.

8. The first wireless control apparatus according to claim 7, wherein the interface is further configured to be coupled to the second wireless control apparatus.

9. The first wireless control apparatus according to claim 8, wherein the C-plane processing performed in the second wireless control apparatus includes radio resource control (RRC) processing of the wireless communication.

10. The first wireless control apparatus according to claim 7, further comprising:

a second interface configured to be coupled to a wireless apparatus, wherein the wireless apparatus is configured to perform first signal processing that is a part of signal processing in the wireless communication, wherein the first signal processing performed in the wireless apparatus includes medium access control (MAC) processing of the wireless communication.

11. The first wireless control apparatus according to claim 7, wherein the U-plane part of the PDCP processing of the wireless communication is PDCP-C, and wherein the C-plane part of the PDCP processing of the wireless communication is PDCP-C.

12. The first wireless control apparatus according to claim 7, wherein the U-plane processing performed in the first wireless control apparatus is controlled by the signal received via the interface.

13. A second wireless control apparatus to be used in a wireless base station for wireless communication with a wireless terminal, the second wireless control apparatus comprising:

a processing circuit configured to perform control plane (C-plane) processing of the wireless communication;

an interface configured to transmit, to a first wireless control apparatus, a signal for controlling user plane (U-plane) processing of the wireless communication, the first wireless control apparatus being configured to perform a user plane (U-plane) processing of the wireless communication, wherein the C-plane processing performed in the second wireless control apparatus comprises performing packet data convergence protocol (PDCP) processing on a C-plane signal wherein the processing circuit is configured to notify, via the interface, the first wireless control apparatus of second information to be used in the PDCP processing on the U-plane, the second information including at least communication path setting between the wireless base station and the wireless terminal, wherein the processing circuit is configured to receive, via the interface from the first wireless control apparatus, first information related to the PDCP processing on the U-plane.

14. The second wireless control apparatus according to claim 13, further comprising:

a second interface configured to be coupled to a wireless apparatus configured to perform first signal processing that is a part of signal processing in the wireless communication, wherein the first signal processing performed in the wireless apparatus includes medium access control (MAC) processing of the wireless communication.

15. The second wireless control apparatus according to claim 13, wherein the U-plane part of the PDCP processing of the wireless communication is PDCP-U, and wherein the C-plane part of the PDCP processing of the wireless communication is PDCP-C.

16. The second wireless control apparatus according to claim 13, wherein the C-plane processing performed in the second wireless control apparatus includes radio resource control (RRC) processing of the wireless communication.

17. The second wireless control apparatus according to claim 13, wherein the U-plane processing performed in the first wireless control apparatus is controlled by the second wireless control apparatus.

18. A wireless apparatus to be used in a wireless base station for wireless communication with a wireless terminal, the wireless apparatus comprising:

a processing circuit configured to perform first signal processing that is a part of signal processing in the wireless communication;

an interface configured to receive a first signal for user plane (U-plane) processing of the wireless communication and a second signal for control plane (C-plane) processing of the wireless communication; and a transmitter configured to wirelessly transmit a third signal generated by using at least one of the first signal and the second signal, wherein the interface is further configured to be coupled to a first wireless control apparatus and a second wireless control apparatus, the first wireless control apparatus including a processor circuit configured to perform the U-plane processing of the wireless communication, the second wireless control apparatus including a processor circuit configured to perform the C-plane processing of the wireless communication,
wherein the U-plane processing performed in the processor circuit of the first wireless control apparatus includes a U-plane part of packet data convergence protocol (PDCP) processing of the wireless communication, and
wherein the C-plane processing performed in the processor circuit of the second wireless control apparatus includes a C-plane part of the PDCP processing of the wireless communication,
wherein the transmitter is configured to transmit the third signal generated by using a signal processed by the U-plane part of PDCP,
wherein the first signal processing is performed on a signal after the second wireless control apparatus notifies the first wireless control apparatus of second information to be used in the PDCP processing on the U-plane, and after the first wireless control apparatus notifies the second wireless control processing circuit of first information related to the PDCP processing on the U-plane, and
wherein the second information includes at least communication path setting between the wireless base station and the wireless terminal.

19. The wireless apparatus according to claim 18, wherein the first signal processing performed in the wireless apparatus includes medium access control (MAC) processing of the wireless communication.

20. The wireless apparatus according to claim 18, wherein the plane part of packet data convergence protocol (PDCP) processing of the wireless communication is PDCP-U, and
wherein the C-plane part of the PDCP processing of the wireless communication is PDCP-C.

21. The wireless apparatus according to claim 18, wherein the C-plane processing performed in the second wireless control apparatus includes radio resource control (RRC) processing of the wireless communication.

* * * * *